United States Patent
Tamiya et al.

(10) Patent No.: US 10,451,401 B2
(45) Date of Patent: Oct. 22, 2019

(54) DISPLACEMENT DETECTING DEVICE WITH CONTROLLED HEAT GENERATION

(71) Applicant: DMG MORI CO., LTD., Yamato-Koriyama, Nara (JP)

(72) Inventors: Hideaki Tamiya, Isehara (JP); Kazuki Noda, Isehara (JP)

(73) Assignee: DMG MORI CO., LTD., Yamato-Koriyama (JP)

(*) Notice: Subject to any disclaimer, the term of this patent is extended or adjusted under 35 U.S.C. 154(b) by 0 days.

(21) Appl. No.: 15/979,645

(22) Filed: May 15, 2018

(65) Prior Publication Data
US 2019/0011248 A1 Jan. 10, 2019

(30) Foreign Application Priority Data

May 23, 2017 (JP) .................. 2017-101475
Aug. 25, 2017 (JP) .................. 2017-162746

(51) Int. Cl.
*G01B 9/02* (2006.01)
*G02B 27/42* (2006.01)
(Continued)

(52) U.S. Cl.
CPC ......... *G01B 9/02041* (2013.01); *G01B 9/021* (2013.01); *G01B 9/02011* (2013.01); *G01B 9/02018* (2013.01); *G01B 9/02019* (2013.01); *G01B 9/02027* (2013.01); *G02B 27/14* (2013.01); *G02B 27/283* (2013.01);
(Continued)

(58) Field of Classification Search
CPC ............... G01D 5/34746; G01D 5/347; G01D 5/34715; G01B 9/02041; G01B 9/02019; G01B 9/02018; G01B 9/021; G01B 9/02027; G01B 9/02011; G01B 2290/20;
(Continued)

(56) References Cited

U.S. PATENT DOCUMENTS

2012/0287441 A1* 11/2012 Kuroda ................. G01B 11/02
356/499
2013/0250307 A1* 9/2013 Tamiya ............. G01B 9/02015
356/498
(Continued)

FOREIGN PATENT DOCUMENTS

JP H05-089480 A 4/1993

*Primary Examiner* — Michael P LaPage
(74) *Attorney, Agent, or Firm* — Oliff PLC

(57) ABSTRACT

A displacement detecting device includes a first diffraction grating, a light source, a displacement detecting unit, and a light receiving unit. The displacement detecting unit includes a light flux dividing unit, a second diffraction grating, and a reference reflecting member. An incident angle of a first light flux to the first diffraction grating, a diffraction angle of the first diffraction grating, an incident angle of the first light flux to the second diffraction grating, and a diffraction angle of the second diffraction grating are angles at which a displacement amount in an optical path length of the first light flux from the light flux dividing unit to the first diffraction grating and a displacement amount in an optical path length of the first light flux from the first diffraction grating to the second diffraction grating become equal in a case where a measured member is displaced in a direction orthogonal to a measured surface.

18 Claims, 28 Drawing Sheets

(51) Int. Cl.
*G02B 27/28* (2006.01)
*G02B 27/14* (2006.01)
*G01B 9/021* (2006.01)

(52) U.S. Cl.
CPC ..... *G02B 27/4233* (2013.01); *G02B 27/4277* (2013.01); *G01B 2290/20* (2013.01); *G01B 2290/70* (2013.01)

(58) Field of Classification Search
CPC .................................. G01B 2290/70; G02B 27/4277; G02B 27/14; G02B 27/283; G02B 27/4233
See application file for complete search history.

(56) References Cited

U.S. PATENT DOCUMENTS

2016/0109216 A1\* 4/2016 Saendig ................ G01B 11/00
356/499
2018/0283852 A1\* 10/2018 Ser ..................... G01B 9/02025

\* cited by examiner

DISPLACEMENT DETECTING DEVICE WITH CONTROLLED HEAT GENERATION

BACKGROUND

Technical Field

The present invention relates to a displacement detecting device to detect displacement of a measured surface by a non-contact sensor using light emitted from a light source, and specifically relates to a technology of detecting displacement in a vertical direction of a measured surface.

Related Art

In related arts, a displacement detecting device using light is widely used as a device of measuring displacement or a shape of a measured surface in a non-contact manner. As a representative example, there is a method of emitting a laser beam to a measured surface and detecting a change in a position of reflection light by a PSD. However, in this method, there is a problem of being easily influenced by an inclination of a measured surface, of low sensitivity, and of a decrease in resolution of measurement during expansion of a measurement range.

On the other hand, there is a method of using a Michelson interferometer with a measured surface as a mirror. In this method, a detection range is wide and linearity is excellent. However, when a measurement range is expanded, a wavelength of a light source and a refractive index of the air are changed.

On the other hand, light emitted from a light source is collected on a measured surface by an objective lens, reflection light reflected by the measured surface is collected by an astigmatic optical element and is made to enter a light receiving element, and a focus error signal is generated by an astigmatic method. Then, a servomechanism is driven by utilization of the focus error signal, and the objective lens is displaced in such a manner that a focal position of the objective lens becomes the measured surface. Here, there is a method of detecting displacement of a measured surface by reading a linear scale integrally attached to an objective lens via a coupling member (see, for example, Japanese Patent Application Laid-Open No. 5-89480). In this method, there is an advantage that an inclination of a measured surface is not easily changed and that a wide measurement range can be measured at high resolution.

In the displacement detecting device disclosed in Japanese Patent Application Laid-Open No. 5-89480, a numerical aperture (NA) of an objective lens is large and a diameter of a beam collected on a measured surface is small in order to improve accuracy in displacement detection. For example, in a case where a diameter of a beam imaged on a measured surface is around 2 μm, detection accuracy of a linear scale becomes a several nm to one hundred and a several nm.

SUMMARY

However, in the displacement detecting device described in Japanese Patent Application Laid-Open No. 5-89480 in a related art, an objective lens is moved upward/downward in an optical axis direction thereof by a driving mechanism such as an actuator including a magnet and a coil, for example. Thus, a mechanical response frequency of the upward/downward movement of the objective lens is limited by a structure or weight of the actuator. As a result, in the displacement detecting device described in Japanese Patent Application Laid-Open No. 5-89480, measurement of a measured object vibrating at high speed has been difficult. Also, while a detection point can be narrowed down, there is a problem that a large error is generated due to an influence by a foreign object on a measured object or a small shape change close to a beam shape, and there is a limitation in a use condition thereof.

The present invention is to provide a displacement detecting device that can detect displacement in a height direction of a measured member highly accurately and that can perform stable measurement at high speed.

In order to solve the above problem and to achieve an object of the present invention, a displacement detecting device of the present invention includes a first diffraction grating and a head. The first diffraction grating is provided on a measured surface of a measured member. The head is arranged in such a manner of facing the measured surface of the measured member. The head and the measured member are relatively movable at least in one of a direction that is in parallel with the measured surface and in parallel with a grating vector direction of the first diffraction grating, and a direction orthogonal to the measured surface.

The head includes a light source that emits light, a displacement detecting unit, and a light receiving unit. The displacement detecting unit divides the light emitted from the light source to a first light flux and a second light flux, and emits the first light flux to the first diffraction grating. The light receiving unit receives the second light flux, and the first light flux that returns from the first diffraction grating through the displacement detecting unit.

The displacement detecting unit includes a light flux dividing unit, a second diffraction grating, a reference reflecting member, and a light flux combining unit. The light flux dividing unit divides light into a first light flux and a second light flux, and emits the divided first light flux to the first diffraction grating. The second diffraction grating diffracts the first light flux divided by the light flux dividing unit and diffracted by the first diffraction grating, and emits the first light flux to the first diffraction grating again. The reference reflecting member reflects the second light flux divided by the light flux dividing unit. The light flux combining unit superposes the first light flux diffracted by the first diffraction grating and the second diffraction grating and the second light flux reflected by the reference reflecting member, and performs emission thereof to the light receiving unit.

An incident angle of the first light flux to the first diffraction grating, a diffraction angle of the first diffraction grating, an incident angle of the first light flux to the second diffraction grating, and a diffraction angle of the second diffraction grating are angles at which a displacement amount in an optical path length of the first light flux from the light flux dividing unit to the first diffraction grating and a displacement amount in an optical path length of the first light flux from the first diffraction grating to the second diffraction grating become equal in a case where at least one of the head and the measured member is displaced in the direction orthogonal to the measured surface.

Also, a displacement detecting device of the present invention includes a first diffraction grating and a head. The first diffraction grating is provided on a measured surface of a measured member. The head is arranged in such a manner of facing the measured surface of the measured member. The head and the measured member are relatively movable at least in one of a direction that is in parallel with the measured surface and in parallel with a grating vector direction of the first diffraction grating, and a direction orthogonal to the measured surface.

The head includes a light source that emits light, a displacement detecting unit, and a light receiving unit. The displacement detecting unit divides the light emitted from the light source to a first light flux and a second light flux, and emits the first light flux to the first diffraction grating. The light receiving unit receives the second light flux, and the first light flux that returns from the first diffraction grating through the displacement detecting unit.

The displacement detecting unit includes a light flux dividing unit, a second diffraction grating, a light flux parallel branch unit, a reference light reflecting member, and a light flux combining unit. The light flux dividing unit divides light into a first light flux and a second light flux, and emits the divided first light flux to the first diffraction grating. The second diffraction grating diffracts the first light flux divided by the light flux dividing unit and diffracted by the first diffraction grating, and emits the first light flux to the first diffraction grating again. The light flux parallel branch unit is arranged between the first diffraction grating and the second diffraction grating and makes the first light flux enter a position different from a first emission position on the first diffraction grating when making the first light flux diffracted by the second diffraction grating enter the first diffraction grating again. The reference light reflecting member reflects the second light flux divided by the light flux dividing unit. The light flux combining unit superposes the first light flux diffracted by the first diffraction grating and the second diffraction grating and the second light flux reflected by the reference light reflecting member, and performs emission thereof to the light receiving unit.

The head makes light emitted from the light source enter the first diffraction grating vertically.

The light flux parallel branch unit moves an optical path of the first light flux, which path is from the light flux parallel branch unit to the first diffraction grating, in parallel with an optical path of the first light flux from the first diffraction grating to the light flux parallel branch unit.

A diffraction angle of the first diffraction grating, an incident angle of the first light flux to the second diffraction grating, and a diffraction angle of the second diffraction grating are angles at which a displacement amount in an optical path length of the first light flux from the light flux dividing unit to the first diffraction grating and a displacement amount in an optical path length of the first light flux from the first diffraction grating to the second diffraction grating become equal in a case where at least one of the head and the measured member is displaced in the direction orthogonal to the measured surface.

According to a displacement detecting device of the present invention, a driving mechanism in a related art is not necessary. Thus, heat generated in use can be controlled. Moreover, since it is not necessary to drive a driving mechanism, it is possible to solve a problem such as a response frequency and to widen a use condition.

DETAILED DESCRIPTION

Figure 1:
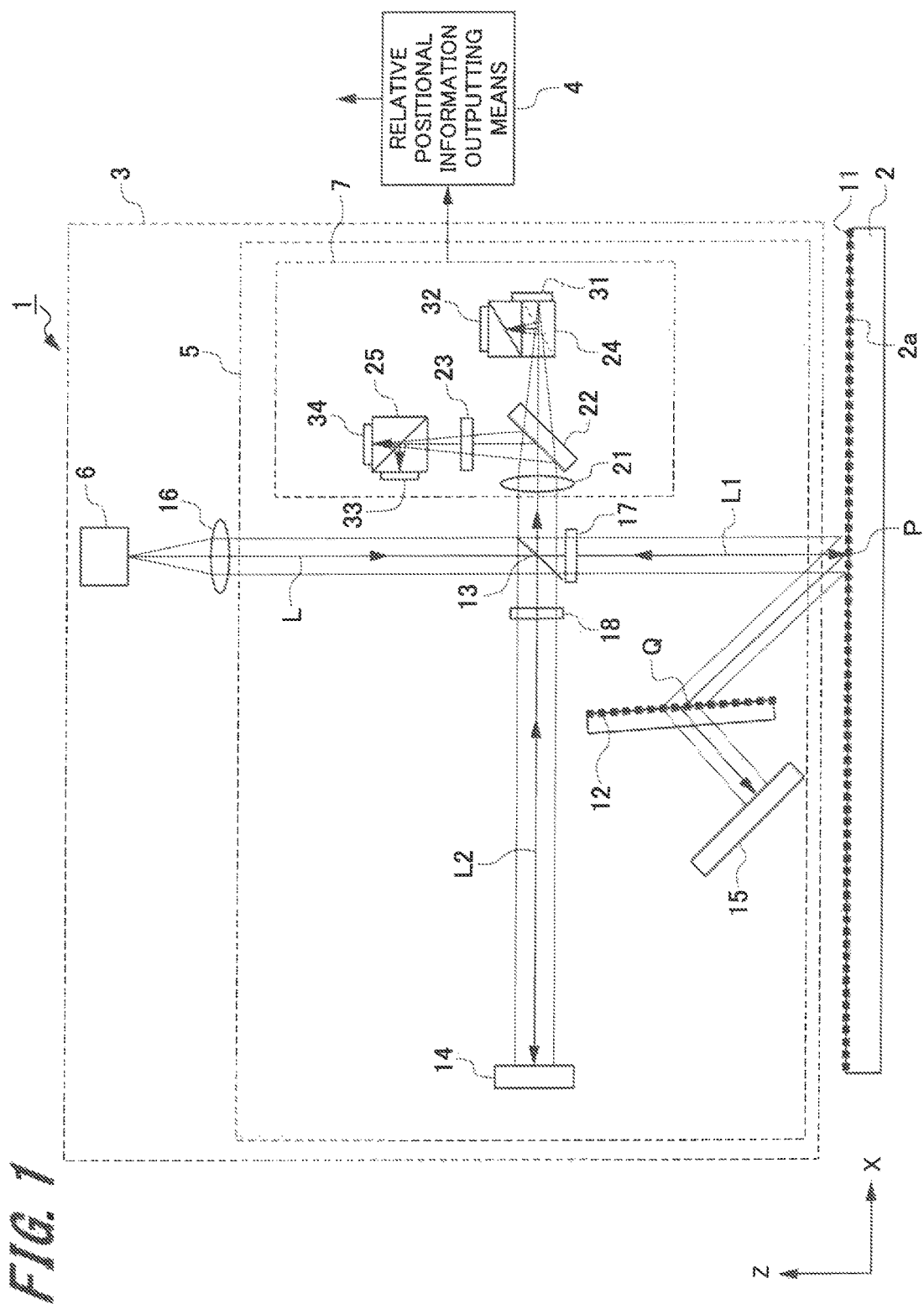
FIG. 1 is a schematic configuration view illustrating a configuration of a displacement detecting device according to a first embodiment of the present invention.

In the following, embodiments of a displacement detecting device of the present invention will be described with reference to FIG. 1 to FIG. 31. Note that the same sign is assigned to common members in the drawings. Also, the present invention is not limited to the following embodiments.

Also, each of various lenses described in the following description may be a single lens or a lens group.

1. First Embodiment of Displacement Detecting Device

First, the first embodiment (hereinafter, referred to as "present embodiment") of the displacement detecting device of the present invention will be described with reference to FIG. 1 to FIG. 3.

1-1. Configuration Example of Displacement Detecting Device

FIG. 1 is a schematic configuration view illustrating a configuration of the displacement detecting device. FIG. 2 is a perspective view illustrating a measured member in which a first diffraction grating is provided in the displacement detecting device.

A displacement detecting device 1 of the present embodiment is a displacement detecting device that detects displacement (movement amount) of when at least one of a head and a measured member is moved.

As illustrated in FIG. 1, the displacement detecting device 1 includes a first diffraction grating 11 provided on a measured surface 2a of a measured member 2, a head 3, and a relative positional information outputting means 4. Note that the relative positional information outputting means 4 may be housed in the head 3, or arranged in a mobile information processing terminal or a personal computer (PC) mobile terminal provided outside the head 3.

The head 3 and the measured member 2 are arranged in a manner relatively movable in a direction in parallel with the measured surface 2a and in parallel with a grating vector direction S1 (see FIG. 2) of the first diffraction grating 11, or in a direction vertical to the measured surface 2a. That is, at least one of the head 3 and the measured member 2 is arranged in a manner movable in at least one of the direction in parallel with the measured surface 2a and the direction vertical to the measured surface 2a.

In the following, it is assumed that a direction in parallel with the measured surface 2a and in parallel with the grating vector direction S1 (see FIG. 2) of the first diffraction grating 11 is a first direction X. Also, it is assumed that a direction that is in parallel with the measured surface 2a and that is orthogonal to the first direction X is a second direction Y. Then, it is assumed that a direction orthogonal to the measured surface 2a, that is, a direction orthogonal to the first direction X and the second direction Y is a third direction Z.

Figure 2:
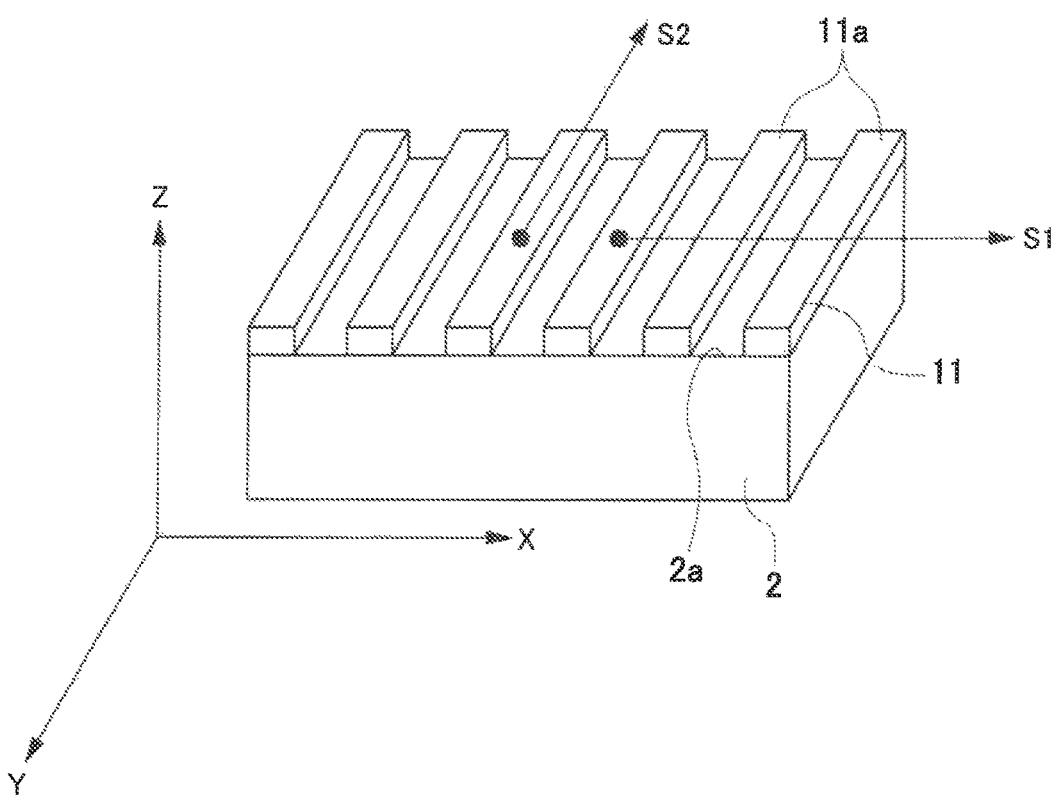
FIG. 2 is a perspective view illustrating a measured member and a first diffraction grating of the displacement detecting device according to the first embodiment of the present invention.

As illustrated in FIG. 2, the measured member 2 is formed in a tabular manner. The first diffraction grating 11 is provided in the measured surface 2a, which faces the head 3, in the measured member 2. The first diffraction grating 11 is a reflection-type diffraction grating.

The first diffraction grating 11 includes a plurality of projections 11a projected from the measured surface 2a. The plurality of projections 11a is arranged at predetermined intervals in the first direction X. An interval between two adjacent projections 11a in the plurality of projections 11a is a grating pitch $d_R$ of the first diffraction grating 11.

Then, a grating vector direction S1 of this plurality of projections 11a is arranged in parallel with the first direction X. Also, a direction in which the projections 11a are extended (grating line direction) S2 is in parallel with the second direction Y in the measured surface 2a. Note that the grating vector direction S1 and the grating line direction S2 are on a plane in parallel with the measured surface 2a. Then, the grating vector direction S1 is not necessarily in parallel with the first direction X, and the grating line direction S2 is not necessarily in parallel with the second direction Y.

Note that in the present embodiment, an example in which the first diffraction grating 11 includes the plurality of projections 11a projected from the measured surface 2a has been described. However, this is not the limitation and a first diffraction grating 11 may include a plurality of grooves formed in the measured surface 2a of the measured member 2, for example.

Also, the first diffraction grating 11 is formed in the measured member 2 including a glass or silicon substrate, for example. Then, the plurality of projections 11a included in the first diffraction grating 11 is formed by evaporation of a material having high reflectivity such as gold or aluminum on the measured surface 2a of the measured member 2. Note that a grating pitch $d_R$ and a diffraction angle θ of the first diffraction grating 11 will be described later.

This first diffraction grating 11 provided in the measured member 2 diffracts light emitted from the head 3 and returns the light at a predetermined diffraction angle to the head 3 again.

The head 3 includes a displacement detecting unit 5, a light source 6, and a light receiving unit 7 provided in the displacement detecting unit 5. Note that the light receiving unit 7 may be arranged in the displacement detecting unit 5 or arranged outside the displacement detecting unit 5. As the light source 6, for example, there is a semiconductor laser diode, a super luminescent diode, a gas laser, a solid-state laser, or a light-emitting diode.

When a light source with a long coherence distance is used as the light source 6, it is less likely to be influenced by an optical path length difference between object light and reference light due to a tilt or the like of the measured surface 2a of the measured member 2 and an acceptable range of a tilt becomes wider. Also, as the coherence distance of the light source 6 becomes short, it becomes possible to prevent a noise due to interference of unnecessary stray light and to perform highly accurate measurement.

Moreover, when a single-mode laser is used as the light source 6, it is preferable to control a temperature of the light source 6 in order to stabilize a wavelength. Also, high frequency superposition or the like may be performed with respect to a beam of the single-mode laser and coherence of the beam may be decreased. Moreover, in a case where a multi-mode laser is used, it becomes also possible to prevent a noise due to interference of unnecessary stray light and to perform more stable measurement by controlling a temperature of the light source 6 by a Peltier element or the like.

Note that the number of light sources 6 is not limited to one. A plurality of light sources 6 may be arranged and a light quantity may be increased by superposition of pieces of light thereof.

Light L emitted from the light source 6 enters the displacement detecting unit 5. Note that a lens 16 including a collimating lens or the like is arranged between the light source 6 and the displacement detecting unit 5. The lens 16 collimates the light L emitted from the light source 6 into parallel light. Thus, the light L collimated into the parallel light by the lens 16 enters the displacement detecting unit 5.

The displacement detecting unit 5 emits the light L, which is emitted from the light source 6, toward the first diffraction grating 11 of the measured member 2 and guides the light L returned from the measured member 2 to the light receiving unit 7. The displacement detecting unit 5 includes a second diffraction grating 12, a light flux dividing unit 13, a reference mirror 14 indicating an example of a reference light reflecting member, an object mirror 15 indicating an example of an object light reflecting member, a first phase plate 17, and a second phase plate 18.

The light flux dividing unit 13 includes, for example, a polarization beam splitter. Then, the light flux dividing unit 13 reflects s-polarized light and transmits p-polarized light. The light L emitted from the light source 6 and collimated into the parallel light by the lens 16 enters the light flux dividing unit 13. Then, the light flux dividing unit 13 divides the light L into two light fluxes that are a first light flux L1 as object light and a second light flux L2 as reference light. In the present embodiment, the p-polarized light transmitted through the light flux dividing unit 13 becomes the first light flux L1 and the s-polarized light reflected by the light flux dividing unit 13 becomes the second light flux L2. The first light flux L1 advances toward the first diffraction grating 11, and the second light flux L2 advances toward the reference mirror 14.

The light flux dividing unit 13 divides the light L into the first light flux L1 and the second light flux L2, and a light quantity ratio thereof is preferably a ratio in which a light quantity on a side of the first diffraction grating 11 and that on a side of the reference mirror 14 become the same in entrance to the light receiving unit 7 described later.

Moreover, a polarizing plate may be provided between the light source 6 and the light flux dividing unit 13. Accordingly, it is possible to remove leakage light that exists slightly as a polarization component orthogonal to the s-polarized light and the p-polarized light, and a noise.

Also, although an example of using a polarization beam splitter as the light flux dividing unit 13 has been described, this is not the limitation. As a light flux dividing unit 13, for example, a semitransparent mirror and a phase plate may be combined.

The first phase plate 17 is arranged between the light flux dividing unit 13 and the measured surface 2a of the measured member 2, that is, the first diffraction grating 11. The second phase plate 18 is arranged between the light flux dividing unit 13 and the reference mirror 14.

Each of the first phase plate 17 and the second phase plate 18 changes a polarization direction of passing light and includes, for example, a quarter wavelength plate. Thus, in a case where passing light is p-polarized light, each of the first phase plate 17 and the second phase plate 18 changes the light into circularly polarized light that rotates in a first direction with an advancing direction as a center axis. Also, in a case of being circularly polarized light that rotates in the first direction, passing light is changed into s-polarized light. Moreover, in a case of being s-polarized light, passing light is changed into circularly polarized light that rotates in a second direction opposite to the first direction with an advancing direction as a center axis. Then, in a case of being circularly polarized light that rotates in the second direction, passing light is changed into p-polarized light.

Also, the light source 6, the lens 16, the light flux dividing unit 13, and the first phase plate 17 are arranged in such a manner that an advancing direction of light transmitted through the light flux dividing unit 13, that is, the first light flux L1 is in parallel with the third direction Z. Thus, the first light flux L1 that is transmitted through the light flux dividing unit 13 and that passes through the first phase plate 17 vertically enters the measured surface 2a of the measured member 2, that is, the first diffraction grating 11. Accordingly, even when the measured member 2 is displaced in the third direction Z, a position of an incident point P of the first light flux L1 that enters the first diffraction grating 11 is not changed on the first diffraction grating 11.

The second diffraction grating 12 is arranged in a position where the first light flux L1 that is diffracted by the first diffraction grating 11 and that returns to the displacement detecting unit 5 enters. The second diffraction grating 12 is arranged in such a manner that a plane thereof is inclined in the third direction Z. The second diffraction grating 12 is a transmission-type diffraction grating that transmits light and diffracts the transmitted light. Note that a grating pitch $d_T$ and a diffraction angle φ of the second diffraction grating 12 will be described later.

The object mirror 15 is arranged in a direction, in which the first light flux L1 incident from the first diffraction grating 11 is transmitted, in the second diffraction grating 12. Also, the object mirror 15 is arranged in a position where the first light flux L1 transmitted through the second diffraction grating 12 enters a reflection surface thereof vertically. Then, since the first light flux L1 vertically enters the object mirror 15, the object mirror 15 reflects the first light flux L1 in such a manner that an optical path in the entrance and an optical path after the reflection become identical.

The first light flux L1 reflected by the object mirror 15 passes through an optical path that is the same with an outgoing optical path, passes through the second diffraction grating 12, the first diffraction grating 11, and the first phase plate 17 in this order, and enters the light flux dividing unit 13 again. That is, an optical path of the first light flux L1 from the light flux dividing unit 13 to the object mirror 15 (hereinafter, referred to as "outgoing optical path") and an optical path thereof from the object mirror 15 to the light flux dividing unit 13 (hereinafter, referred to as "incoming optical path") are identical. Thus, a of entering the first diffraction grating 11 again in the incoming optical path is the same with an emission point P in the outgoing optical path.

Moreover, the first light flux L1 is diffracted twice by each of the first diffraction grating 11 and the second diffraction grating 12 in the outgoing optical path and the incoming optical path.

The reference mirror 14 is arranged in an advancing direction of the second light flux L2 divided by the light flux dividing unit 13. The reference mirror 14 is arranged in such a manner that a reflection surface thereof is in parallel with a surface, from which the second light flux L2 is emitted, of the light flux dividing unit 13. That is, the reference mirror 14 is arranged in a position where the second light flux L2 vertically enters the reflection surface thereof. Then, since the second light flux L2 enters the reference mirror 14 vertically, the reference mirror 14 reflects the second light flux L2 in such a manner that an optical path in the entrance and an optical path after the reflection become identical.

The second light flux L2 reflected by the reference mirror 14 passes through an optical path that is the same with an outgoing optical path, passes through the second phase plate 18, and enters the light flux dividing unit 13 again. The reference mirror 14 and the object mirror 15 are arranged in such a manner that a length of an optical path in which the first light flux L1 is from the light flux dividing unit 13, is reflected by the object mirror 15, and returns to the light flux dividing unit 13 again, and a length of an optical path in which the second light flux L2 is from the light flux dividing unit 13, is reflected by the reference mirror 14, and returns to the light flux dividing unit 13 become equal.

Accordingly, even in a case where there is a wavelength variation in the light source 6 due to a variation in atmospheric pressure, humidity, or temperature, it is possible to make an influence on the first light flux L1 and that on the second light flux L2 equal. As a result, it is possible to perform stable measurement regardless of a surrounding environment without performing an atmospheric pressure correction, a humidity correction, or a temperature correction. Moreover, it becomes easier to adjust an optical path length of the first light flux L1, and an optical path length or an optical axis angle of the second light flux L2 in production of the displacement detecting device 1.

Also, the light flux dividing unit 13 superposes the returned first light flux L1 reflected by the object mirror 15 and the returned second light flux L2 reflected by the reference mirror 14. Then, the light flux dividing unit 13 emits the superposed first light flux L1 and second light flux L2 to the light receiving unit 7. That is, the light flux dividing unit 13 in the present embodiment has a function as a light flux dividing unit that divides a light flux and a function as a light flux combining unit that superposes the first light flux L1 and the second light flux L2.

The light receiving unit 7 includes a condenser lens 21, a semitransparent mirror 22, a first polarization beam splitter 24, and a second polarization beam splitter 25. Also, for example, a light receiving-side phase plate 23 including a quarter wavelength plate or the like is arranged in an optical path between the semitransparent mirror 22 and the second polarization beam splitter 25.

The condenser lens 21 collects the incident first light flux L1 and second light flux L2 from the light flux dividing unit 13. Also, the condenser lens 21 collects light in such a manner that a beam diameter becomes an appropriate size on a first light receiving element 31, a second light receiving element 32, a third light receiving element 33, and a fourth light receiving element 34 (described later). The semitransparent mirror 22 divides light. The light divided by the semitransparent mirror 22 enters the second polarization beam splitter 25 through the first polarization beam splitter 24 or the light receiving-side phase plate 23.

The first polarization beam splitter 24 is arranged in such a manner that a polarization direction of an incident light flux is inclined at 45 degrees with respect to an incident surface. The first light receiving element 31 and the second light receiving element 32 are provided on a light emitting opening side in this first polarization beam splitter 24. Also, the third light receiving element 33 and the fourth light receiving element 34 are provided on a light emitting opening side in the second polarization beam splitter 25.

Each of these first polarization beam splitter 24 and second polarization beam splitter 25 divides light by reflecting interference light having an s polarization component and by transmitting interference light having a p polarization component.

Each of the first light receiving element 31, the second light receiving element 32, the third light receiving element 33, and the fourth light receiving element 34 receives light and acquires an interference signal. Then, the relative positional information outputting means 4 is connected to the light receiving unit 7. The light receiving unit 7 outputs the interference signals acquired by the first light receiving element 31, the second light receiving element 32, the third light receiving element 33, and the fourth light receiving element 34 to the relative positional information outputting means 4.

1-2. Relationship Between First Diffraction Grating and Second Diffraction Grating Next, a relationship between the first diffraction grating 11 and the second diffraction grating 12 including the above described configurations will be described with reference to FIG. 3.

Figure 3:
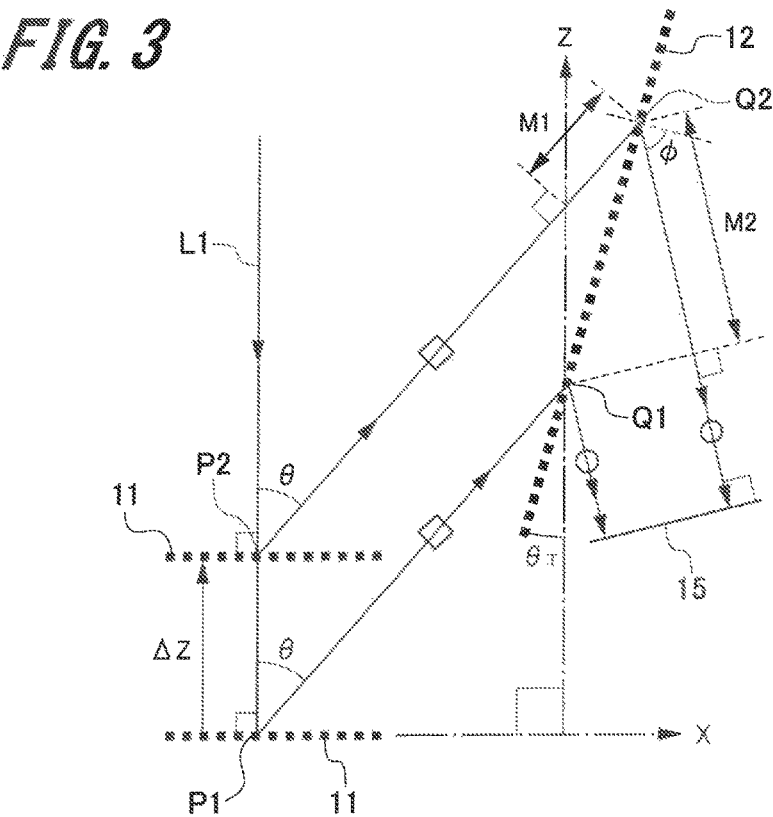
FIG. 3 is a view for describing a relationship between diffraction angles of the first diffraction grating and a second diffraction grating in the displacement detecting device according to the first embodiment of the present invention.

FIG. 3 is a view for describing a relationship between diffraction angles of the first diffraction grating 11 and the second diffraction grating 12.

As illustrated in FIG. 3, the first light flux L1 enters the first diffraction grating 11 vertically in the third direction Z. Note that the grating vector direction S1 of the first diffraction grating 11 is in parallel with the first direction X as illustrated in FIG. 2. Then, the first diffraction grating 11 performs diffraction at the diffraction angle θ. Here, when it is assumed that a wavelength of first light flux L1 is λ and a grating pitch of the first diffraction grating 11 is $d_R$, the diffraction angle θ of the first diffraction grating 11 can be calculated by the following expressions 1 and 2.

$$\sin θ = λ/d_R \quad \text{[Expression 1]}$$

$$θ = \sin^{-1}(λ/d_R) \quad \text{[Expression 2]}$$

The first light flux L1 diffracted by the first diffraction grating 11 enters the second diffraction grating 12 and is diffracted by the second diffraction grating 12. A grating vector direction of the second diffraction grating 12 in this case is on a plane formed by the first direction X and the third direction Z. Also, the grating vector direction of the second diffraction grating 12 is inclined at an angle $θ_T$ with respect to an incident angle of the first light flux L1 to the first diffraction grating 11. That is, the grating vector direction of the second diffraction grating 12 is inclined at the angle $θ_T$ with respect to the third direction Z.

In a case where the first light flux L1 enters the second diffraction grating 12 at an angle φ, the second diffraction grating 12 performs diffraction at the diffraction angle φ when the second diffraction grating 12 satisfies the Bragg condition. Thus, the grating pitch $d_T$ or the diffraction angle φ of the second diffraction grating 12 is set in such a manner as to satisfy the following expressions 3 and 4 that are the Bragg condition. Note that λ is a wavelength of the first light flux L1.

$$\sin φ + \sin φ = λ/d_T \quad \text{[Expression 3]}$$

$$φ = \sin^{-1}(λ/2d_T) \quad \text{[Expression 4]}$$

When the second diffraction grating 12 satisfies the Bragg condition, it is possible to acquire extremely high diffraction efficiency, for example, by using a second diffraction grating 12M of a transmission-type volume hologram (described later) (see FIG. 5A). However, there is limitation in designing of the incident angle φ to the second diffraction grating 12, and the grating pitch $d_T$. Thus, a thin transmission-type diffraction grating may be used as the second diffraction grating 12 instead of the volume hologram. By using a thin transmission-type diffraction grating, it is possible to leave a degree of freedom in selection of an incident angle and a diffraction angle.

In a case where the second diffraction grating 12 satisfies the Bragg condition, the first light flux L1 diffracted for the second time by the second diffraction grating 12 (first diffraction is by first diffraction grating 11) is reflected by the object mirror 15 and enters the second diffraction grating 12 again. Note that as illustrated in FIG. 1 and FIG. 3, in a case where the measured member 2 is not displaced in the third direction Z, a position of an incident point Q at which the first light flux L1 enters the second diffraction grating 12 is not changed. Also, even when the measured member 2 is displaced in the first direction X or the second direction Y, a position of the incident point Q at which the first light flux L1 enters the second diffraction grating 12 is not changed. Then, the first light flux L1 diffracted for the third time by the second diffraction grating 12 enters the first diffraction grating 11 and is diffracted for the fourth time by the first diffraction grating 11.

Here, an example in which the measured member 2, that is, the first diffraction grating 11 is moved for a length ΔZ in the third direction Z will be described.

As illustrated in FIG. 3, when the first diffraction grating 11 is moved for the length ΔZ to an upper side in the third direction Z, that is, a direction of getting closer to the head 3, an optical path length of the first light flux L1 becomes shorter for the length ΔZ at a time point of entrance to an incident point P2 on the first diffraction grating 11. Note that the first light flux L1 vertically enters the measured surface 2a of the measured member 2, that is, the first diffraction grating 11. Thus, even when the measured member 2 is displaced in the third direction Z, positions of the incident points P1 and P2 of the first light flux L1 that enters the first diffraction grating 11 are not changed on the first diffraction grating 11.

When the first diffraction grating 11 is moved for the length ΔZ to the upper side in the third direction Z, that is, the direction of getting closer to the head 3, a position where the first light flux L1 enters the second diffraction grating 12 is changed from an incident point Q1 to an incident point Q2. Then, an optical path length from the incident point P2 on the first diffraction grating 11 to the incident point Q2 on the second diffraction grating 12 becomes longer for a length M1 than an optical path length from the incident point P1 on the first diffraction grating 11 to the incident point Q1 of the second diffraction grating 12 of when the first diffraction grating 11 is not moved in the third direction Z. Moreover, a distance from the incident point Q2 on the second diffraction grating 12 to the object mirror 15 becomes longer for a length M2 than an optical path length from the incident point Q1 on the second diffraction grating 12 to the object mirror 15 of when the first diffraction grating 11 is not moved in the third direction Z.

Thus, when ΔZ=M1+M2 is satisfied, an optical path length of the first light flux L1 becomes constant even in a case where the first diffraction grating 11 is moved in the third direction Z. Also, a condition satisfying ΔZ=M1+M2 is expressed by the following expression 5 from the diffraction angle θ of the first diffraction grating 11 and the diffraction angle φ of the second diffraction grating 12.

$$-\cos(φ+θ)/\cos φ + \{\sin(φ+θ) - \cos(φ+θ)\tan φ\} \sin φ = 1 \quad \text{[Expression 5]}$$

Thus, the diffraction angle θ of the first diffraction grating 11 and the diffraction angle φ of the second diffraction grating 12 satisfy the above expression 5. Accordingly, it is possible to make the optical path length of the first light flux L1 constant even when the first diffraction grating 11 is moved in the third direction Z. Note that application to an optical path in which the first light flux L1 is reflected by the object mirror 15 and returns to the light flux dividing unit 13 is also possible. Thus, it is possible to constantly make an optical path length of an incoming optical path of the first light flux L1 constant.

As described above, even when the measured member 2 is displaced in the first direction X or the second direction Y, a position of the incident point Q at which the first light flux L1 enters the second diffraction grating 12 is not changed. Thus, it is possible to keep the optical path length of the first light flux L1 constant. As a result, since the optical path length of the first light flux L1 is not changed even when the first diffraction grating 11 is moved in the first direction X, the second direction Y, and the third direction Z, it is possible to constantly keep the optical path length of the first light flux L1 and the optical path length of the second light flux L2 constant.

For example, in a case where the wavelength λ of the light source 6 is 790 nm, the grating pitch $d_R$ of the first diffraction grating 11 is 1 μm, the incident angle of the first light flux L1 to the first diffraction grating 11 is 0 degrees, and the grating pitch of the second diffraction grating 12 is $d_T$, the diffraction angle θ of the first diffraction grating 11≈52.2° and the diffraction angle φ of the second diffraction grating 12≈45.9°.

1-3. Configuration Example of Relative Positional Information Outputting Means

Next, a configuration example of the relative positional information outputting means 4 will be described with reference to FIG. 4.

Figure 4:
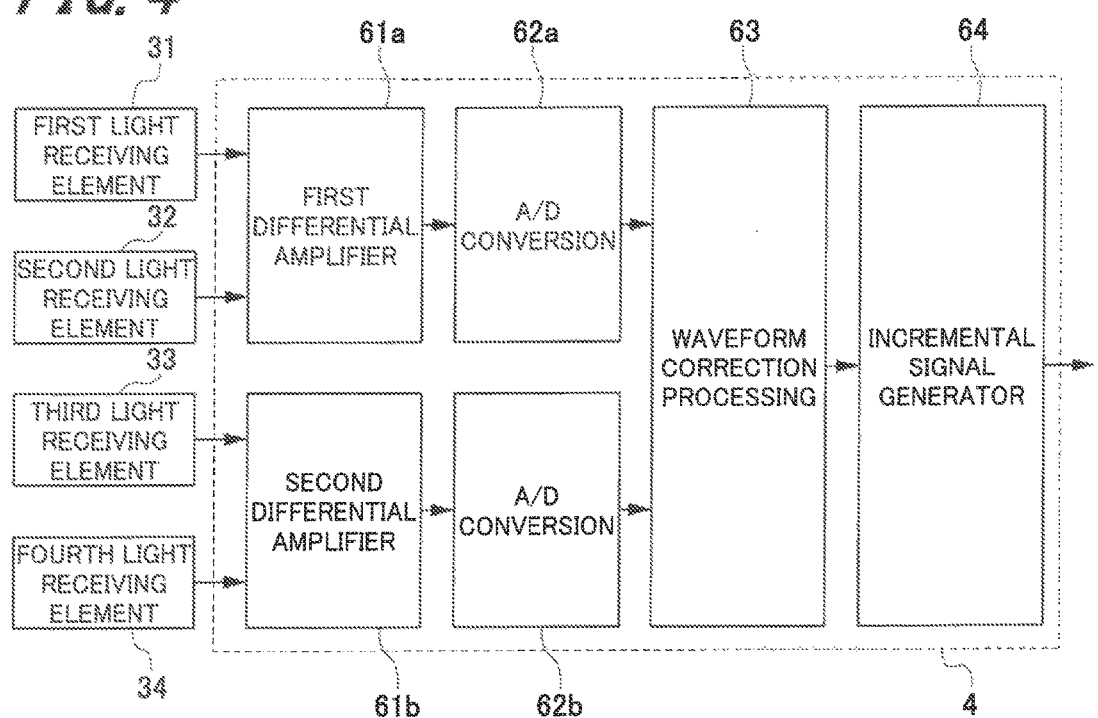
FIG. 4 is a block diagram illustrating a relative positional information outputting means in the displacement detecting device according to the first embodiment of the present invention.

FIG. 4 is a block diagram illustrating the relative positional information outputting means 4 of the present embodiment.

As illustrated in FIG. 4, the relative positional information outputting means 4 includes a first differential amplifier 61*a*, a second differential amplifier 61*b*, a first A/D converter 62*a*, a second A/D converter 62*b*, a waveform correction processing unit 63, and an incremental signal generator 64.

The first light receiving element 31 and the second light receiving element 32 are connected to the first differential amplifier 61*a* and the third light receiving element 33 and the fourth light receiving element 34 are connected to the second differential amplifier 61*b*. Also, the first A/D converter 62*a* is connected to the first differential amplifier 61*a* and the second A/D converter 62*b* is connected to the second differential amplifier 61*b*. Then, the first A/D converter 62*a* and the second A/D converter 62*b* are connected to the waveform correction processing unit 63. Also, the waveform correction processing unit 63 is connected to the incremental signal generator 64.

The first differential amplifier 61*a* receives interference signals from the first light receiving element 31 and the second light receiving element 32, and the second differential amplifier 61*b* receives interference signals from the third light receiving element 33 and the fourth light receiving element 34. Each of the first differential amplifier 61*a* and the second differential amplifier 61*b* performs differential amplification of a received interference signal and cancels a DC component of the interference signal.

A/D conversion of the signal on which the differential amplification is performed by the first differential amplifier 61*a* is performed by the first A/D converter 62*a*, and signal amplitude, an offset, and a phase thereof are corrected by the waveform correction processing unit 63. This signal is calculated, for example, as an A-phase incremental signal in the incremental signal generator 64.

Also, similarly, A/D conversion of the signal on which the differential amplification is performed by the second differential amplifier 61*b* is performed by the second A/D converter 62*b*. Then, signal amplitude, an offset, and a phase are corrected by the waveform correction processing unit 63, and this signal is output from the incremental signal generator 64 as a B-phase incremental signal a phase of which is different from the A-phase by 90 degrees.

It is determined by a pulse discriminator circuit or the like (not illustrated) whether the two-phase incremental signals acquired in such a manner are positive/negative, whereby it is possible to detect whether a relative displacement amount in the first direction X or the third direction Z of the head 3 and the measured member 2 is in a positive direction or a negative direction.

Also, the number of pulses of the incremental signals is counted by a counter (not illustrated), whereby it is possible to measure for how many cycles described above interference light intensity in the first light flux L1 and the second light flux L2 is changed. Thus, the displacement detecting device 1 detects a relative displacement amount (movement amount) of the measured member 2 and the head 3.

Note that relative positional information output from the relative positional information outputting means 4 of the present embodiment may be the above-described incremental signals in two phases, or may be a signal including a displacement amount and a displacement direction calculated therefrom.

1-4. Operation Example of Displacement Detecting Device

Next, an operation example of the displacement detecting device 1 having the above-described configuration will be described with reference to FIG. 1, FIG. 3, and FIG. 4.

As illustrated in FIG. 1, light L emitted from the light source 6 is collimated by the lens 16 and becomes parallel light. The parallel light L collimated by the lens 16 enters the light flux dividing unit 13. The light that enters the light flux dividing unit 13 is divided into a first light flux L1 and a second light flux L2. As described above, the light flux dividing unit 13 reflects s-polarized light and transmits p-polarized light in the light. Thus, the first light flux L1 that is the p-polarized light transmitted through the light flux dividing unit 13 is emitted to the first phase plate 17. Also, the second light flux L2 that is the s-polarized light reflected by the light flux dividing unit 13 is emitted to the second phase plate 18.

Since a polarization direction of the first light flux L1 is p-polarized, the first light flux L1 is changed into circularly polarized light that rotates in a first direction with an advancing direction as a center axis when passing through the first phase plate 17. Also, since a polarization direction of the second light flux L2 is s-polarized, the second light flux L2 is changed into circularly polarized light that rotates in a second direction with an advancing direction as a center axis when passing through the second phase plate 18.

The first light flux L1 passing through the first phase plate 17 vertically enters the measured surface 2*a* of the measured member 2, that is, the emission point P on the first diffraction grating 11. Then, as illustrated in FIG. 3, the first light flux L1 is diffracted at the diffraction angle θ by the first diffraction grating 11. The first light flux L1 that is diffracted for the first time enters the emission point Q on the second diffraction grating 12 at the incident angle φ (see FIG. 1). As described above, since the second diffraction grating 12 satisfies the Bragg condition, the first light flux L1 is diffracted at the diffraction angle φ by the second diffraction grating 12.

The first light flux L1 diffracted by the second diffraction grating 12 vertically enters the object mirror 15. Then, the first light flux L1 is reflected by the object mirror 15 toward the second diffraction grating 12 again. The first light flux L1 enters the second diffraction grating 12 at the incident angle cp. Here, the first light flux L1 enters the emission point Q on the second diffraction grating 12 which point is the same with that in the outgoing optical path. Then, the third diffraction is performed by the second diffraction grating 12, and the first light flux L1 enters the emission point P on the first diffraction grating 11 at the incident angle θ which point is the same with that in the outgoing optical path.

In such a manner, by making the emission point P in the outgoing optical path and the emission point P in the incoming optical path with respect to the first diffraction grating 11 the same one point, it is possible to reduce an influence generated when the first diffraction grating 11 is tilted. Also, it is possible to acquire a similar effect by making the emission point Q in the outgoing optical path and the emission point Q in the incoming optical path with respect to the second diffraction grating 12 the same one point. Moreover, it is possible to improve detection accuracy compared to a displacement detecting device in a related art which device performs detection with two center points as virtual measurement points.

Next, the fourth diffraction is performed by the first diffraction grating 11, and the first light flux L1 is emitted to the first phase plate 17. A polarization direction of the first light flux L1 here is circularly polarized light rotating in the first direction with the advancing direction as the center axis. Thus, the first light flux L1 is changed by the first phase plate 17 into the s-polarized light orthogonal to the p-polarized light that is an outgoing polarization direction.

On the other hand, the second light flux L2 emitted to the reference mirror 14 is reflected by the reference mirror 14 and emitted again to the second phase plate 18. A polarization direction of the second light flux L2 here is circular polarized light rotating in the second direction with the advancing direction as the center axis. Thus, the second light flux L2 is changed by the second phase plate 18 into the p-polarized light orthogonal to the s-polarized light that is an outgoing polarization direction.

The first light flux L1 passing through the first phase plate 17 enters the light flux dividing unit 13 again, and the second light flux L2 passing through the second phase plate 18 enters the light flux dividing unit 13 again. Here, the first light flux L1 is reflected by the light flux dividing unit 13 and emitted to the light receiving unit 7 since the polarization direction thereof is s-polarized. Also, the second light flux L2 is transmitted through the light flux dividing unit 13 and emitted to the light receiving unit 7 since the polarization direction thereof is p-polarized. Thus, a light flux in which the first light flux L1 and the second light flux L2 that are pieces of linearly-polarized light orthogonal to each other are superposed enters the light receiving unit 7.

The light flux is collected by the condenser lens 21 and emitted to the semitransparent mirror 22. The semitransparent mirror 22 divides the light flux into two pieces of light. A light flux transmitted through the semitransparent mirror 22 enters the first polarization beam splitter 24.

Here, the first polarization beam splitter 24 is arranged in an inclined manner in such a manner that the polarization directions of the first light flux L1 and the second light flux L2 polarization directions of which are different from each other by 90 degrees are inclined by 45 degrees with respect to an incident surface of the first polarization beam splitter 24. Accordingly, the first light flux L1 and the second light flux L2 respectively have a p polarization component and an s polarization component with respect to the first polarization beam splitter 24. Thus, in the first light flux L1 and the second light flux L2 transmitted through the first polarization beam splitter 24, pieces of polarized light having the same polarization direction interfere with each other. Thus, it is possible to make the first light flux L1 and the second light flux L2 interfere with each other by the first polarization beam splitter 24.

Similarly, in the first light flux L1 and the second light flux L2 reflected by the first polarization beam splitter 24, pieces of polarized light having the same polarization direction with respect to the first polarization beam splitter 24 interfere with each other. Thus, it is possible to make these light fluxes interfere with each other by the first polarization beam splitter 24.

The interference light between the first light flux L1 and the second light flux L2 transmitted through the first polarization beam splitter 24 is received by the first light receiving element 31. Also, the interference light between the first light flux L1 and the second light flux L2 reflected by the first polarization beam splitter 24 is received by the second light receiving element 32. Here, interference signals photoelectrically converted by the first light receiving element 31 and the second light receiving element 32 become signals with phases different from each other by 180 degrees.

Then, as the interference signals acquired by the first light receiving element 31 and the second light receiving element 32, interference signals of $A \times \cos(2 \times K1x + 2 \times B \times K2z + \delta)$ are acquired. Here, A is amplitude of interference, and K1 is a wave number of the first diffraction grating 11 which number is expressed by $2\pi/d_R$. Also, x indicates a movement amount of the first diffraction grating 11, that is, a relative displacement amount in the first direction X of the head 3 and the measured member 2. On the other hand, K2 is a wave number of the second diffraction grating 12 which number is expressed by $2\pi/d_T$. z indicates a movement amount, in a grating vector direction of the second diffraction grating 12, in the first light flux L1 that enters the second diffraction grating 12. Note that $d_R$ is a grating pitch of the first diffraction grating 11, and $d_T$ is a grating pitch of the second diffraction grating 12. Also, δ indicates an initial phase.

Moreover, B is a coefficient associated with inclination of the grating vector direction of the second diffraction grating 12 at an inclination angle $\theta_T$ in the third direction Z. Then, in a case where an incident angle to the second diffraction grating 12 (diffraction angle is the same in Bragg condition) is φ, B can be expressed by $B = \cos \theta_T + \sin \theta_T \times \tan \varphi$.

Here, when the head 3 and the measured member 2 are relatively moved for x/2 in the first direction X, an emission point of the first light flux L1 emitted to the first diffraction grating 11 is moved for x/2 in the first direction X. That is, the first light flux L1 is moved for x/2 in the first direction X on the first diffraction grating 11. Thus, a phase of K1x is added to the first light flux L1, and interference light in which lightness/darkness of light in one cycle is generated is received by the first light receiving element 31 and the second light receiving element 32.

Note that even when the head 3 and the measured member 2 are relatively moved in the first direction X, an emission point of the first light flux L1 on the second diffraction grating 12 is not changed. Thus, only a phase diffracted by the first diffraction grating 11 is added to the first light flux L1.

Also, when the head 3 and the measured member 2 are relatively moved for Z/(2×B) in the third direction Z, the emission point of the first light flux L1 emitted to the second diffraction grating 12 is moved for Z/2 in the grating vector direction on the second diffraction grating 12. That is, the first light flux L1 is moved for Z/2 in the grating vector direction on the second diffraction grating 12. Thus, a phase of K2z is added to the first light flux L1, and interference light in which lightness/darkness of light in one cycle is generated is received by the first light receiving element 31 and the second light receiving element 32.

Note that as described above, the first light flux L1 enters the first diffraction grating 11 in parallel with the third direction Z. Thus, the first light flux L1 vertically enters the first diffraction grating 11. Thus, even when the head 3 and the measured member 2 are relatively moved in the third direction Z, the emission point of the first light flux L1 on the first diffraction grating 11 is not changed. Thus, only a phase diffracted by the second diffraction grating 12 is added to the first light flux L1.

Moreover, the diffraction angle θ of the first diffraction grating 11 and the diffraction angle φ of the second diffraction grating 12 satisfy the above expression 5. Thus, even when the head 3 and the measured member 2 are relatively moved for ΔZ in the third direction Z, ΔZ and the sum of M1+M2 illustrated in FIG. 3 constantly become 0. As a result, an optical path length of the first light flux L1 is not changed. Even when the head 3 and the measured member 2 are relatively moved for ΔZ in the third direction Z, only an incident position of the first light flux L1 on the second diffraction grating 12 is changed.

Here, as described above, the interference signals acquired by the first light receiving element 31 and the second light receiving element 32 do not have a component related to a wavelength of the light source 6. Thus, even when a wavelength of the light source varies due to a variation in atmospheric pressure, humidity, or temperature, interference intensity is not influenced.

On the other hand, as illustrated in FIG. 1, a light flux reflected by the semitransparent mirror 22 enters the light receiving-side phase plate 23. By being transmitted through the light receiving-side phase plate 23, a light flux including the first light flux L1 and second light flux L2 that are linearly polarized light polarization directions of which are different from each other by 90 degrees becomes pieces of circularly polarized light that rotate reversely. Then, since being on the same optical path, the pieces of circularly polarized light rotating reversely are superposed with each other, become linearly polarized light, and enter the second polarization beam splitter 25.

An s polarization component of this linearly polarized light is reflected by the second polarization beam splitter 25 and received by the third light receiving element 33. Also, a p polarization component is transmitted through the second polarization beam splitter 25 and received by the fourth light receiving element 34.

As described above, the linearly polarized light that enters the second polarization beam splitter 25 is generated by superposition of the pieces of circularly polarized light rotating reversely. Then, a polarization direction of the linearly polarized light that enters the second polarization beam splitter 25 is rotated for ½ when the head 3 and the measured member 2 are relatively moved for $d_R/2$ in the first direction X. Also, when the head 3 and the measured member 2 are relatively moved for $d_T/(2 \times B)$ in the first direction X, the polarization direction of the linearly polarized light that enters the second polarization beam splitter 25 is rotated for ½.

Thus, similarly to the first light receiving element 31 and the second light receiving element 32, interference signals of $A \times \cos(2 \times K1x + 2 \times B \times K2z + \delta')$ are acquired in the third light receiving element 33 and the fourth light receiving element 34. δ' is an initial phase.

Also, the signals photoelectrically converted in the third light receiving element 33 and the fourth light receiving element 34 have phases different from each other by 180 degrees.

Note that in the present embodiment, the second polarization beam splitter 25 that divides light fluxes received by the third light receiving element 33 and the fourth light receiving element 34 is arranged in such a manner as to be inclined by 45 degrees with respect to the first polarization beam splitter 24. Thus, signals acquired in the third light receiving element 33 and the fourth light receiving element 34 have phases deviated by 90 degrees from those of the signals acquired in the first light receiving element 31 and the second light receiving element 32.

Thus, for example, it is possible to acquire a Lissajous signal by using the signals acquired in the first light receiving element 31 and the second light receiving element 32 as sin signals and the signals acquired in the third light receiving element 33 and the fourth light receiving element 34 as cos signals.

The signals acquired by these light receiving elements are calculated by the relative positional information outputting means 4, and a relative displacement amount of the head 3 and the measured member 2 is counted. Accordingly, it is possible to detect a relative displacement amount of the head 3 and the measured member 2.

In the displacement detecting device 1 of the present embodiment, an interference signal acquired in the light receiving unit 7 of the displacement detecting unit 5 includes displacement information in the first direction X and the third direction Z. Thus, application to a device that detects relative displacement in the first direction X of the head 3 and the measured member 2 of a case where the head 3 and the measured member 2 are relatively moved only in the first direction X is possible. Also, application to a device that detects relative displacement in the third direction Z of the head 3 or the measured member 2 of a case where the head 3 and the measured member 2 are relatively moved only in the third direction Z is possible. That is, the displacement detecting device 1 of the present embodiment has two usages in one device.

1-5. Modification Example of Second Diffraction Grating

Next, a modification example of a diffraction grating will be described with reference to FIG. 5A and FIG. 5B.

Figure 5A:
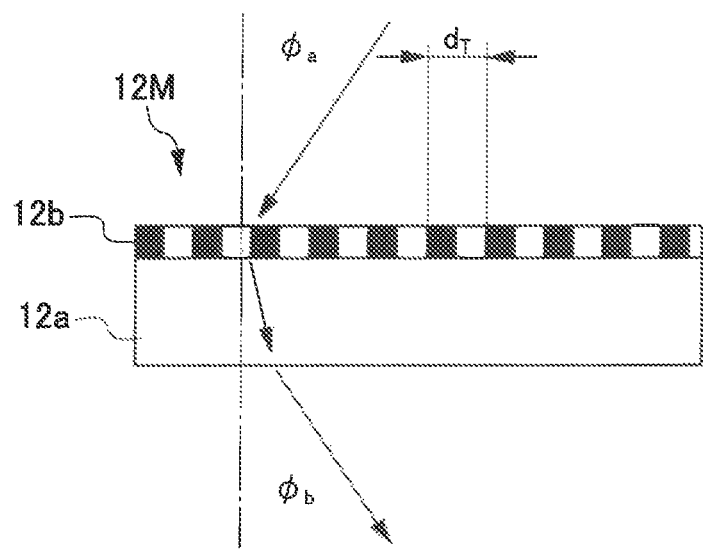
FIGS. 5A and 5B are views illustrating a modification example of the second diffraction grating in the displacement detecting device according to the first embodiment of the present invention, FIG. 5A being a sectional view illustrating a modification example of the second diffraction grating and FIG. 5B being a sectional view illustrating a different modification example of the second diffraction grating.
Figure 5B:
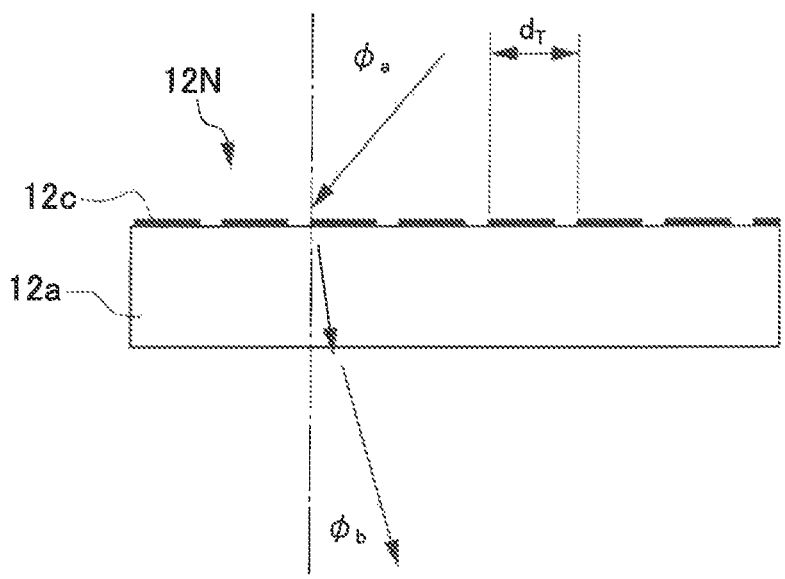

FIG. 5A is a sectional view illustrating a modification example of the second diffraction grating, and FIG. 5B is a sectional view illustrating a different modification example of the second diffraction grating.

A second diffraction grating 12M illustrated in FIG. 5A is a so-called volume hologram using a photographic plate. An absorption hologram may be used. However, here, a phase hologram will be described. A grating unit 12b in this second diffraction grating 12M is formed, for example, in the following manner. First, a silver salt emulsion sensitive to light is applied to one surface of a glass substrate 12a, an interference fringe is exposed, and bleaching is performed after developing. Accordingly, a part where a silver particle remains and a part where no silver particle remains are formed in the grating unit 12b.

Here, the part where a silver particle remains has a high refractive index and the part where no silver particle remains has a low refractive index. That is, this is a phase hologram. Also, a hologram recording photopolymer may be used as a material instead of a photographic plate.

In a second diffraction grating 12N illustrated in FIG. 5B, a grating unit 12c having, for example, chromium (Cr) is formed on one surface of a subsequently-transparent glass substrate 12a. Generally, since the grating unit 12c is formed by vacuum evaporation of a thin film of chromium or the like on one surface of the glass substrate 12a, a thickness thereof is 1 μm or less.

Also, in a case where an incident angle is φa and a diffraction angle is φb, when the Bragg condition in the following expression 6 is satisfied, φa=φb in the second diffraction grating 12M illustrated in FIG. 5A and the second diffraction grating 12N illustrated in FIG. 5B. Note that n is an integer number.

$$\sin \varphi a + \sin \varphi b = n\lambda/d_T \qquad \text{[Expression 6]}$$

Also, in a case of the second diffraction grating 12M illustrated in FIG. 5A, when the Bragg condition is satisfied, it is possible to make an output of diffracted light diffracted by the second diffraction grating 12M maximum. That is, it is possible to prevent a decrease in a quantity of the diffracted light diffracted by the second diffraction grating 12M.

2. Second Embodiment

Next, a displacement detecting device according to the second embodiment will be described with reference to FIG. 6 and FIG. 7.

Figure 6:
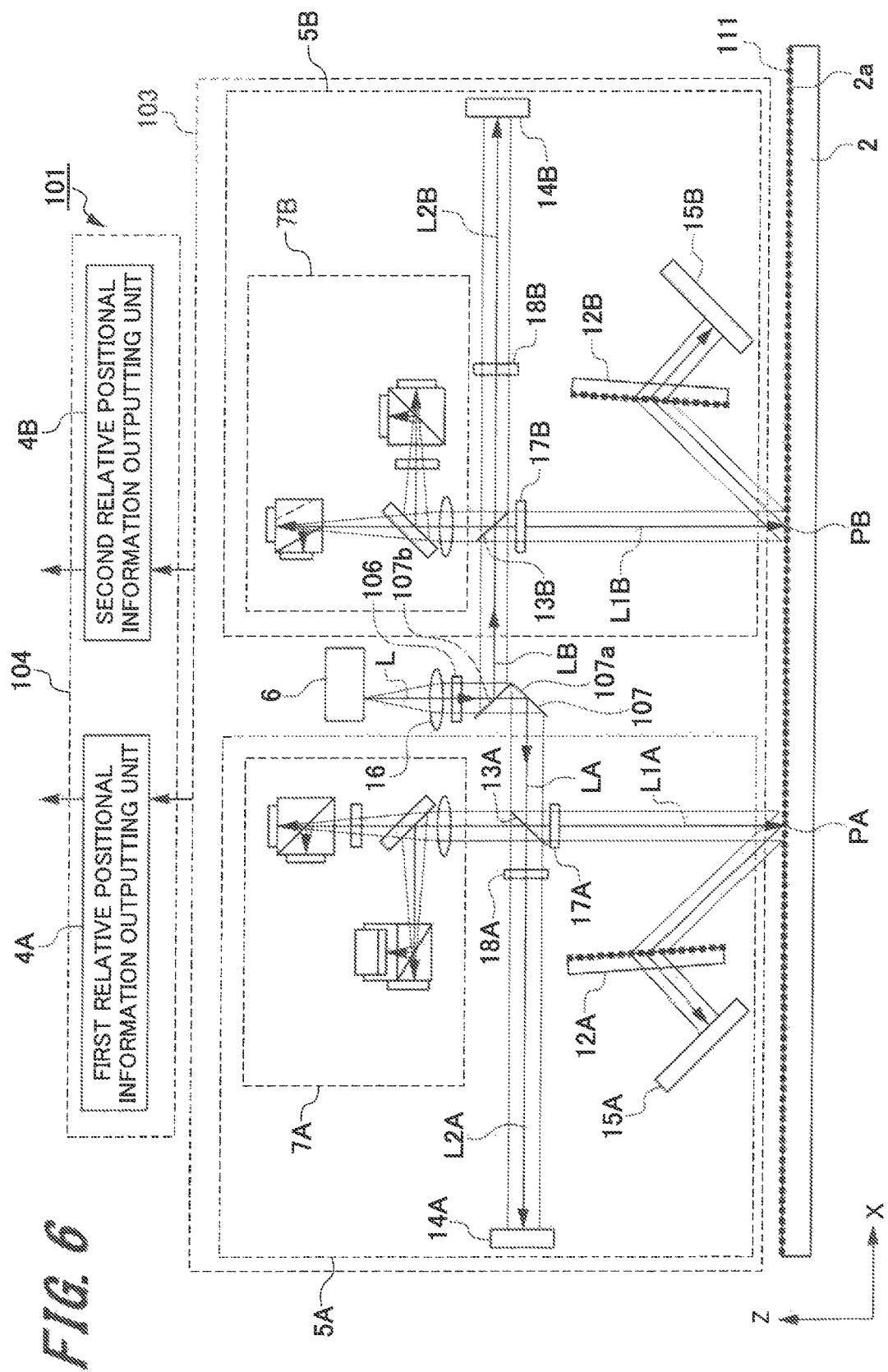
FIG. 6 is a schematic configuration view illustrating a configuration of a displacement detecting device according to a second embodiment of the present invention.
Figure 7:
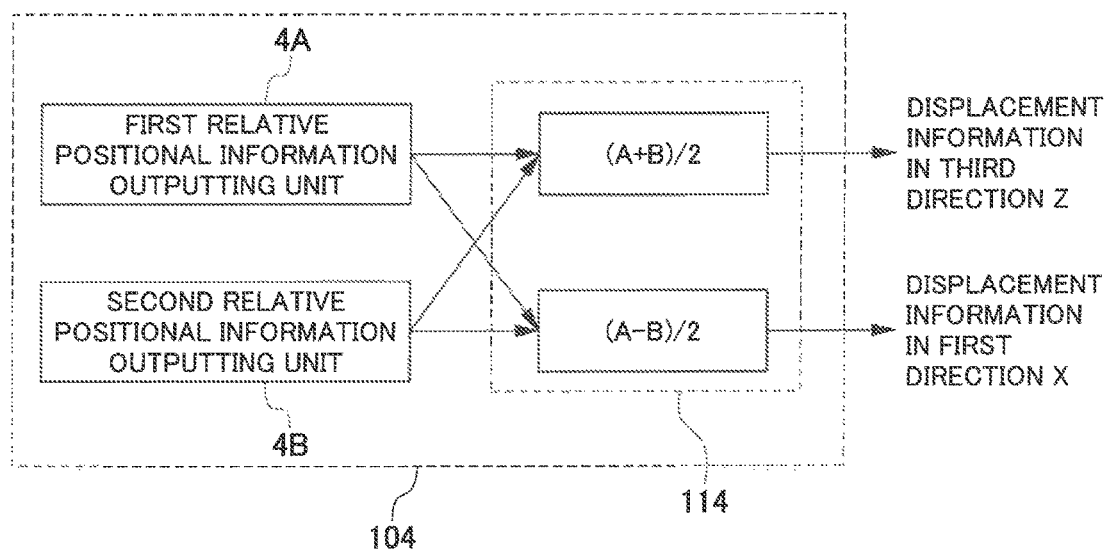
FIG. 7 is a block diagram illustrating a relative positional information outputting means in the displacement detecting device according to the second embodiment of the present invention.

FIG. 6 is a schematic configuration view illustrating a configuration of the displacement detecting device according to the second embodiment, and FIG. 7 is a block diagram illustrating a relative positional information outputting means in the displacement detecting device according to the second embodiment.

A displacement detecting device 101 according to the second embodiment is a displacement detecting device that can output two-dimensional displacement information in a first direction X and a third direction Z. Thus, here, the same sign is assigned to a common part with the displacement detecting device 1 according to the first embodiment, and an overlapped description is omitted.

As illustrated in FIG. 6, a displacement detecting device 101 includes a measured member 2 in which a first diffraction grating 111 is provided, a head 103, and a relative positional information outputting means 104. The head 103 and the measured member 2 are configured in a manner relatively movable in two directions that are the first direction X and the third direction Z.

In the first diffraction grating 111, a direction of diffracted light faces one side in the first direction X on a side of a first displacement detecting unit 5A of the head 103 (described later). Also, in the first diffraction grating 111, a direction of diffracted light faces the other side in the first direction X on a side of a second displacement detecting unit 5B of the head 103. Thus, a blazed grating is preferably used as the first diffraction grating 111.

The head 103 includes the first displacement detecting unit 5A, the second displacement detecting unit 5B, a light source 6, a lens 16, a light source-side phase plate 106, and an optical distributor 107. The first displacement detecting unit 5A is arranged on one side in the first direction X of the head 103 and the second displacement detecting unit 5B is arranged on the other side in the first direction X of the head 103.

Then, the light source 6, the lens 16, the light source-side phase plate 106, and the optical distributor 107 are arranged in the first direction X between the first displacement detecting unit 5A and the second displacement detecting unit 5B. The light source-side phase plate 106 adjusts a polarizing axis of light L emitted from the light source 6 and, for example, adjusts the light to circularly polarized light inclined by 45° with respect to an optical axis.

The light L passing through the light source-side phase plate 106 is emitted to the optical distributor 107. The optical distributor 107 includes, for example, a mirror 107a and a semitransparent mirror 107b. The semitransparent mirror 107b is arranged on a light source 6 side of the mirror 107a.

Reflectivity to the other side in the first direction X on the semitransparent mirror 107b is set to 50%. Thus, the semitransparent mirror 107b equally distributes the light L passing through the light source-side phase plate 106 to a mirror 107a side in the third direction Z and the other side in the first direction X. Then, light LB reflected by the semitransparent mirror 107b is emitted toward a light flux dividing unit 13B of the second displacement detecting unit 5B.

Light LA transmitted through the semitransparent mirror 107b enters the mirror 107a. The mirror 107a reflects the incident light LA toward a light flux dividing unit 13A of the first displacement detecting unit 5A.

Similarly to the displacement detecting unit 5 according to the first embodiment, the first displacement detecting unit 5A includes a light receiving unit 7A, a second diffraction grating 12A, the light flux dividing unit 13A, a reference mirror 14A, an object mirror 15A, a first phase plate 17A, and a second phase plate 18A. The light receiving unit 7A is connected to a first relative positional information outputting unit 4A of the relative positional information outputting means 104. Then, the light receiving unit 7A transmits an acquired interference signal to the first relative positional information outputting unit 4A.

The light receiving unit 7A of the first displacement detecting unit 5A acquires an interference signal expressed in the following expression 7. Here, A1 is amplitude of interference.

$$A1 \times \cos(2K1x + 2 \times B \times K2z + \delta) \quad \text{[Expression 7]}$$

Similarly to the displacement detecting unit 5 according to the first embodiment, the second displacement detecting unit 5B includes a light receiving unit 7B, a second diffraction grating 12B, the light flux dividing unit 13B, a reference mirror 14B, an object mirror 15B, a first phase plate 17B, and a second phase plate 18B. The light receiving unit 7B is connected to a second relative positional information outputting unit 4B of the relative positional information outputting means 104. Then, the light receiving unit 7B transmits an acquired interference signal to the second relative positional information outputting unit 4B.

Also, the second diffraction grating 12B, the light flux dividing unit 13B, the reference mirror 14B, the object mirror 15B, the first phase plate 17B, and the second phase plate 18B included in the second displacement detecting unit 5B are arranged in a manner reversed in the first direction X from those of the first displacement detecting unit 5A.

The light receiving unit 7B of the second displacement detecting unit 5B acquires an interference signal expressed in the following expression 8. Here, A2 is amplitude of interference.

$$A2 \times \cos(-2K1x + 2 \times B \times K2z + \delta) \quad \text{[Expression 8]}$$

As expressed in the above expression 7 and expression 8, a positive/negative of displacement information in the first direction X in the interference signals acquired by the light receiving unit 7A of the first displacement detecting unit 5A and the light receiving unit 7B of the second displacement detecting unit 5B is different.

As illustrated in FIG. 7, the relative positional information outputting means 104 includes the first relative positional information outputting unit 4A, the second relative positional information outputting unit 4B, and an arithmetic unit 114. As described above, a positive/negative of displacement information in the first direction X in the interference signals acquired by the light receiving unit 7A of the first displacement detecting unit 5A and the light receiving unit 7B of the second displacement detecting unit 5B is different.

Thus, by adding displacement information A from the first relative positional information outputting unit 4A and displacement information B from the second relative positional information outputting unit 4B, it is possible to extract only displacement information in the third direction Z. Also, by subtracting the displacement information B of the second relative positional information outputting unit 4B from the displacement information A of the first relative positional information outputting unit 4A, it is possible to extract only displacement information in the first direction X.

Then, by adding the displacement information A from the first relative positional information outputting unit 4A and the displacement information B from the second relative positional information outputting unit 4B and dividing this by two, the arithmetic unit 114 calculates displacement information of a relative position in the third direction Z of the head 103 and the measured member 2. Also, by subtracting the displacement information B of the second relative positional information outputting unit 4B from the displacement information A of the first relative positional information outputting unit 4A and dividing this by two, the arithmetic unit 114 calculates displacement information in the first direction X of the head 103 and the measured member 2.

Thus, according to the displacement detecting device 101 of the second embodiment, it is possible to output two-dimensional displacement information in the first direction X and the third direction Z.

Since the other configurations are similar to those of the displacement detecting device 1 according to the first embodiment, a description thereof is omitted. According to the displacement detecting device 101 having such a configuration, it is also possible to acquire an effect similar to that of the displacement detecting device 1 according to the first embodiment described above.

3. Third Embodiment

Next, a displacement detecting device according to the third embodiment will be described with reference to FIG. 8 to FIG. 12B.

Figure 8:
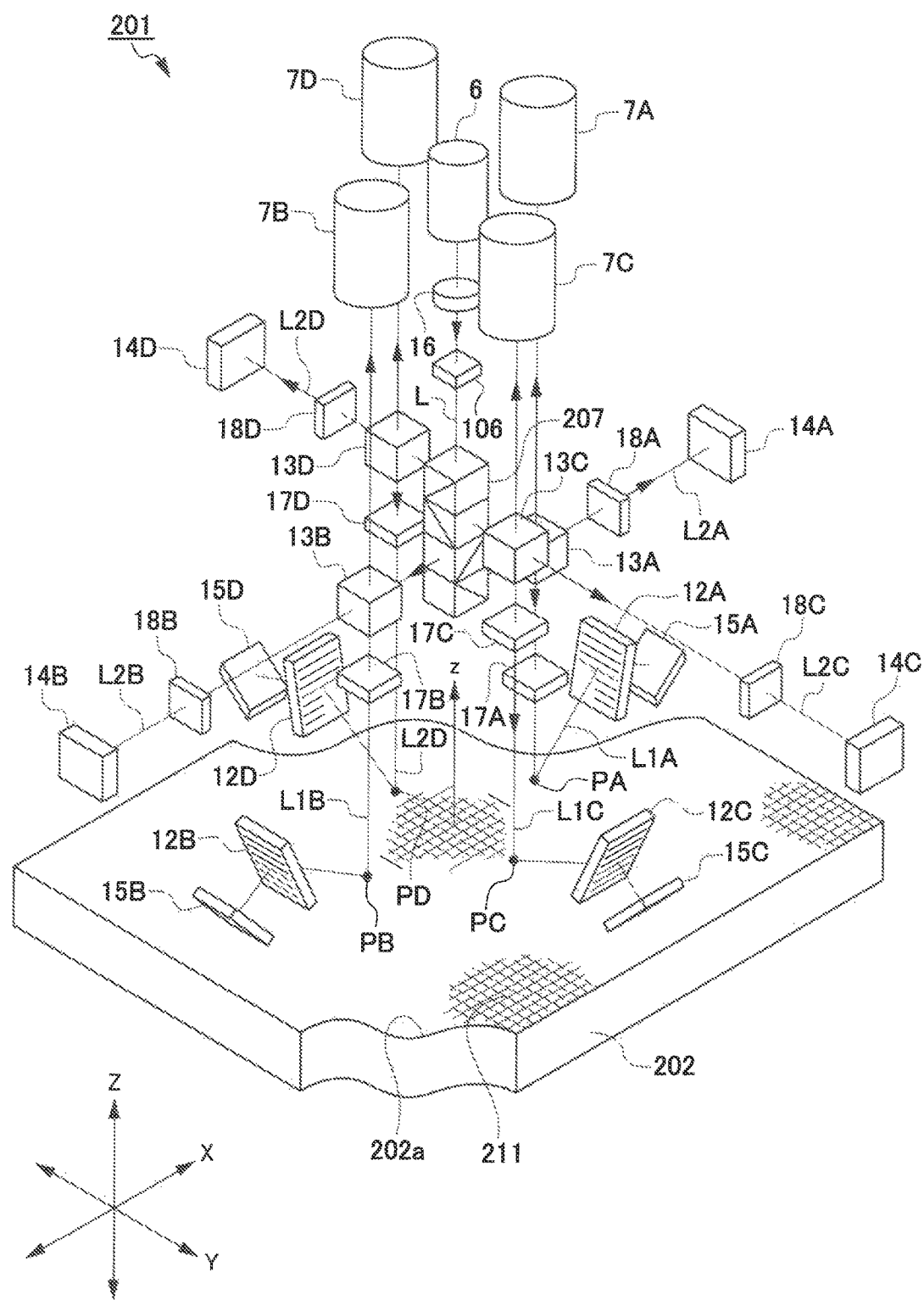
FIG. 8 is a schematic configuration view illustrating a configuration of a displacement detecting device according to a third embodiment of the present invention.
Figure 9:
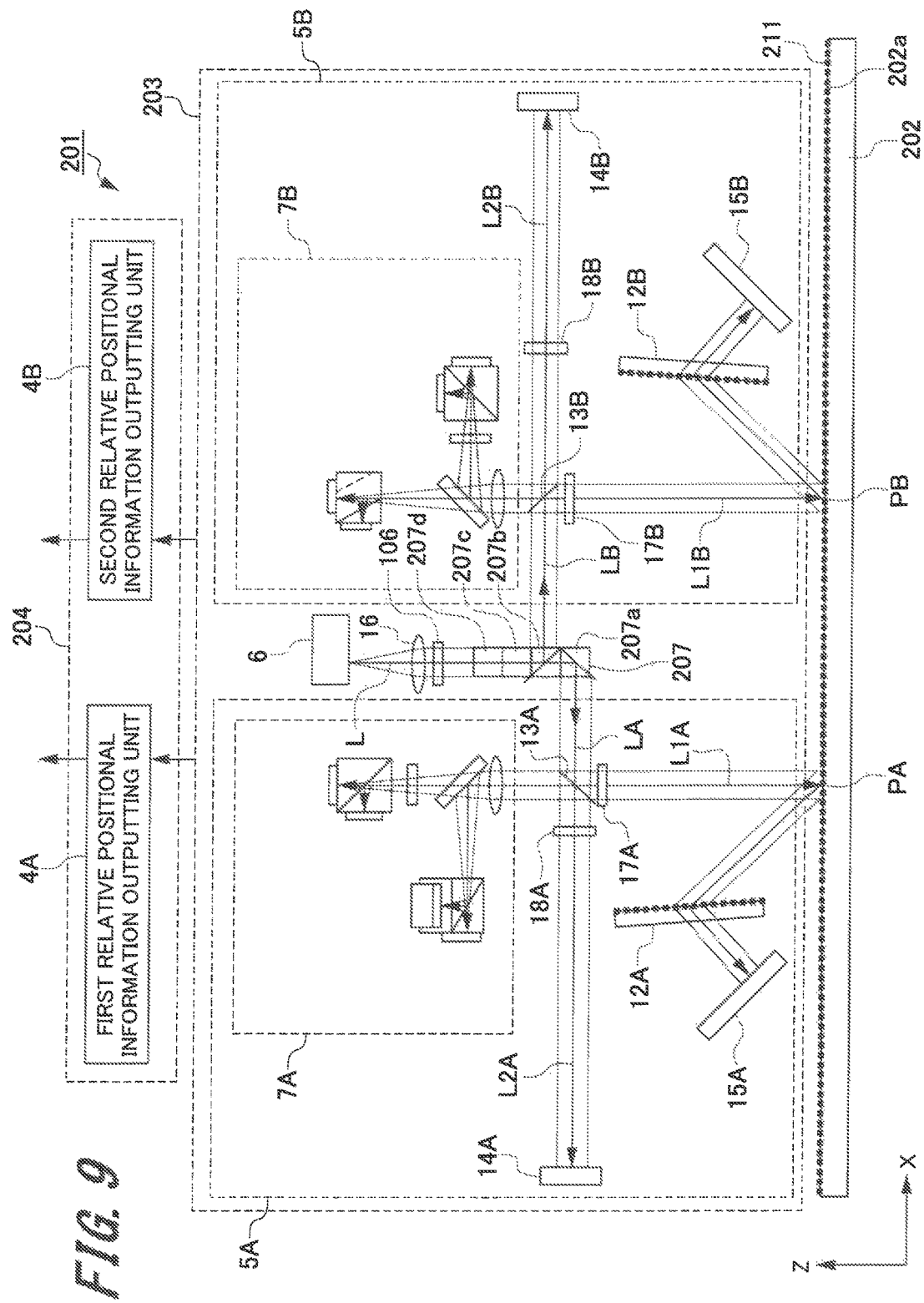
FIG. 9 is a schematic configuration view illustrating a configuration of a first displacement detecting unit and a second displacement detecting unit in the displacement detecting device according to the third embodiment of the present invention.
Figure 10:
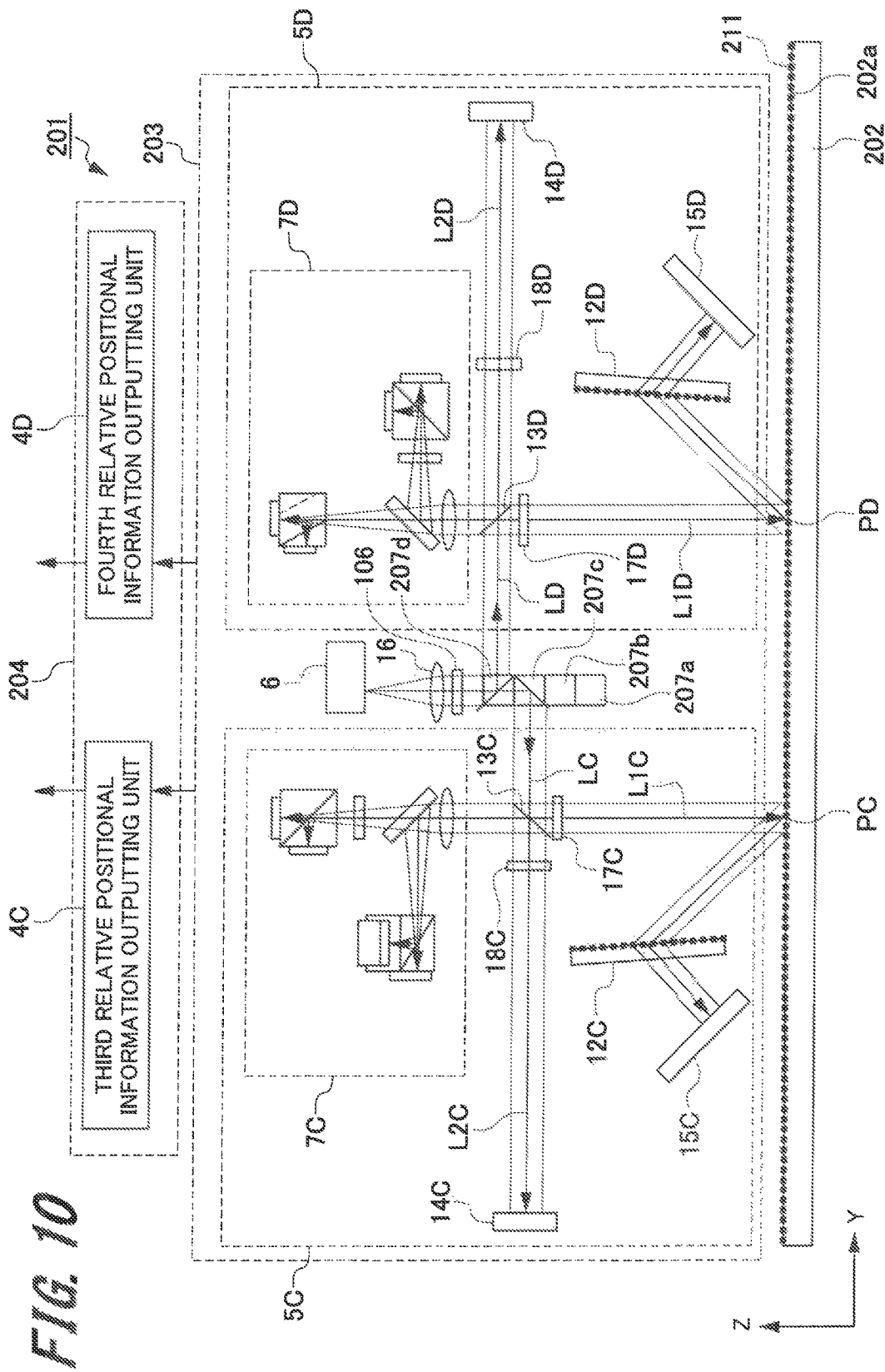
FIG. 10 is a schematic configuration view illustrating a configuration of a third displacement detecting unit and a fourth displacement detecting unit in the displacement detecting device according to the third embodiment of the present invention.
Figure 11:
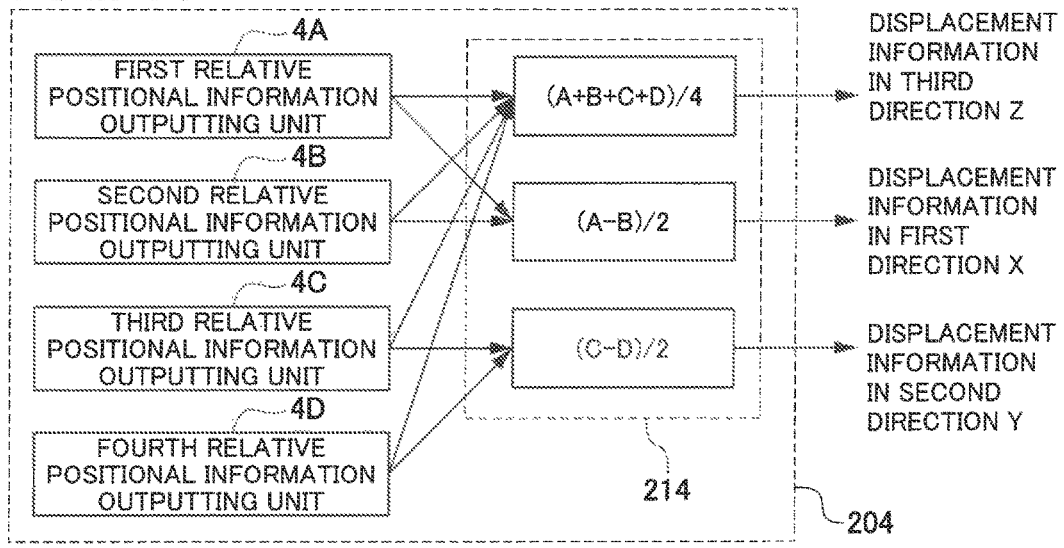
FIG. 11 is a block diagram illustrating a relative positional information outputting means in the displacement detecting device according to the third embodiment of the present invention.
Figure 12A:
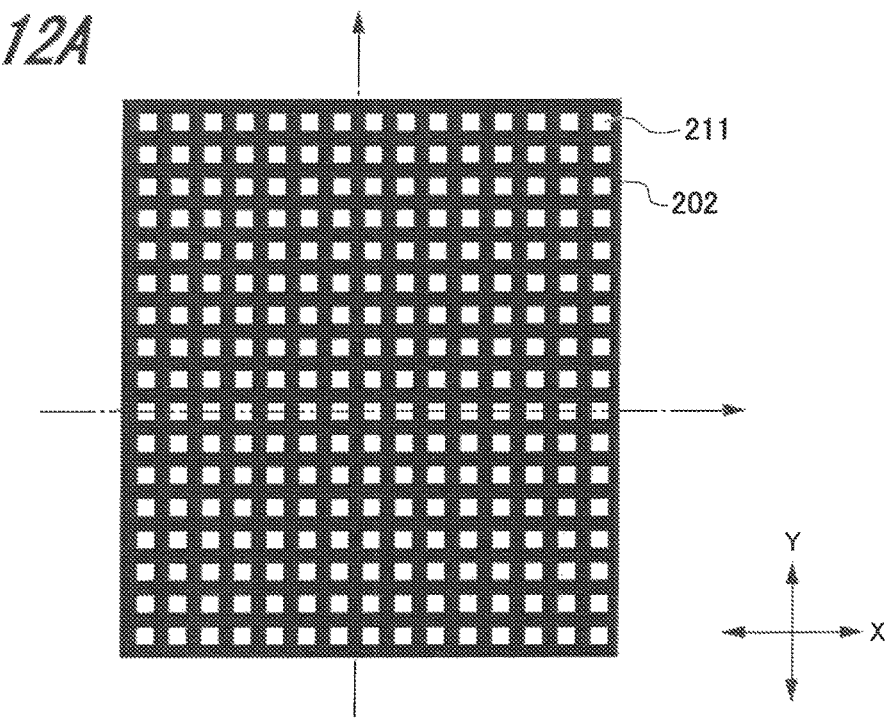
FIGS. 12A and 12B are views illustrating a measured member and a first diffraction grating in the displacement detecting device according to the third embodiment of the present invention, FIG. 12A being a plan view illustrating the first diffraction grating and FIG. 12B being a sectional view illustrating the first diffraction grating.
Figure 12B:
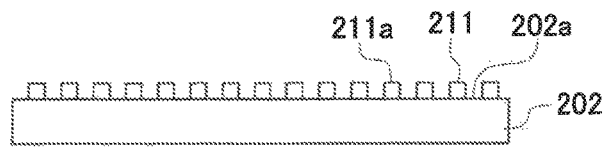

FIG. 8 is a schematic configuration view illustrating a configuration of the displacement detecting device according to the third embodiment. FIG. 9 is a schematic configuration view illustrating a configuration of a first displacement detecting unit and a second displacement detecting unit in the displacement detecting device according to the third embodiment. FIG. 10 is a schematic view illustrating a configuration of a third displacement detecting unit and a fourth displacement detecting unit in the displacement detecting device according to the third embodiment. FIG. 11 is a block diagram illustrating a relative positional information outputting means in the displacement detecting device according to the third embodiment. FIG. 12A and FIG. 12B are views illustrating a first diffraction grating in the displacement detecting device according to the third embodiment.

A displacement detecting device 201 according to the third embodiment is a displacement detecting device that can output three-dimensional displacement information in a first direction X, a third direction Z, and a second direction Y orthogonal to the first direction X and the third direction Z. Thus, here, the same sign is assigned to a common part with the displacement detecting device 1 according to the first embodiment, and an overlapped description is omitted.

As illustrated in FIG. 8, FIG. 9, and FIG. 10, the displacement detecting device 201 includes a measured member 202 in which a first diffraction grating 211 is provided, a head 203, and a relative positional information outputting means 204. The head 203 and the measured member 202 are configured in a manner relatively movable in three directions that are the first direction X, the second direction Y, and the third direction Z.

As illustrated in FIG. 12A and FIG. 12B, the measured member 202 is formed in a tabular manner. The first diffraction grating 211 is provided in a measured surface 202a of the measured member 202. The first diffraction grating 211 has a first grating vector direction in parallel with the first direction X, and a second grating vector direction in parallel with the second direction Y.

Also, the first diffraction grating 211 includes a plurality of projections 211a. The plurality of projections 211a is projected in the third direction Z from the measured surface 202a. The plurality of projections 211a is arranged in a grid-like manner at intervals in the first grating vector direction in parallel with the first direction X and the second grating vector direction in parallel with the second direction Y.

Note that an example in which the first diffraction grating 211 according to the third embodiment includes the plurality of projections 211a has been described. However, this is not the limitation and, for example, a first diffraction grating 211 may include a plurality of recessed parts formed in the measured surface 202a of the measured member 202.

As illustrated in FIG. 8, FIG. 9, and FIG. 10, the head 203 includes a first displacement detecting unit 5A, a second displacement detecting unit 5B, a third displacement detecting unit 5C, a fourth displacement detecting unit 5D, a light source 6, a lens 16, a light source-side phase plate 106, and an optical distributor 207. The first displacement detecting unit 5A is arranged on one side in the first direction X of the head 203 and the second displacement detecting unit 5B is arranged on the other side in the first direction X of the head 203. Also, the third displacement detecting unit 5C is arranged on one side in the second direction Y of the head 203 and the fourth displacement detecting unit 5D is arranged on the other side in the second direction Y of the head 203.

The light source 6, the lens 16, the light source-side phase plate 106, and the optical distributor 207 are arranged between the first displacement detecting unit 5A, the second displacement detecting unit 5B, the third displacement detecting unit 5C, and the fourth displacement detecting unit 5D. That is, the light source 6, the lens 16, the light source-side phase plate 106, and the optical distributor 207 are arranged in a center part in the first direction X and the second direction Y in the head 203.

The optical distributor 207 includes a mirror 207a, a first semitransparent mirror 207b, a second semitransparent mirror 207c, and a third semitransparent mirror 207d. In the optical distributor 207, the mirror 207a, the first semitransparent mirror 207b, the second semitransparent mirror 207c, and the third semitransparent mirror 207d are arranged in this order in the third direction Z from a side of the measured member 202 in the third direction Z. That is, the third semitransparent mirror 207d is arranged on a side of the light source 6.

Reflectivity to the other side in the second direction Y on the third semitransparent mirror 207d is set to 25%. Reflectivity to one side in the second direction Y on the second semitransparent mirror 207c is set to 33.3%. Then, reflectivity to the other side in the first direction X on the first semitransparent mirror 207b is set to 50%.

Light LD reflected by the third semitransparent mirror 207d is emitted toward the light flux dividing unit 13D of the fourth displacement detecting unit 5D. Light LC transmitted through the third semitransparent mirror 207d and reflected by the second semitransparent mirror 207c is emitted toward the light flux dividing unit 13C of the third displacement detecting unit 5C. Light LB transmitted through the third semitransparent mirror 207d and the second semitransparent mirror 207c and reflected by the first semitransparent mirror 207b is emitted toward the light flux dividing unit 13B of the second displacement detecting unit 5B. Then, light LA transmitted through the third semitransparent mirror 207d, the second semitransparent mirror 207c, and the first semitransparent mirror 207b is reflected by the mirror 207a toward the light flux dividing unit 13A of the first displacement detecting unit 5A.

Note that in a case where the optical distributor 207 has a non-polarization characteristic, it becomes unnecessary to provide a phase plate or the like, which adjusts a polarizing axis of light, in a space from the optical distributor 207 to the light flux dividing units 13A, 13B, 13C, and 13D of the displacement detecting units 5A, 5B, 5C, and 5D. Thus, it is possible to simplify a configuration of the displacement detecting device 201.

Note that since the first displacement detecting unit 5A and the second displacement detecting unit 5B respectively have configurations similar to those of the first displacement detecting unit 5A and the second displacement detecting unit 5B according to the second embodiment, a description thereof is omitted.

Note that a light receiving unit 7A of the first displacement detecting unit 5A acquires an interference signal expressed in the following expression 9. Here, A1 is amplitude of interference.

$$A1 \times \cos(2K1x + 2 \times B \times K2z + \delta) \qquad \text{[Expression 9]}$$

Also, a light receiving unit 7B of the second displacement detecting unit 5B acquires an interference signal expressed in the following expression 10. Here, A2 is amplitude of interference.

$$A2 \times \cos(-2K1x + 2 \times B \times K2z + \delta) \qquad \text{[Expression 10]}$$

Similarly to the displacement detecting unit 5 according to the first embodiment, the third displacement detecting unit 5C includes a light receiving unit 7C, a second diffraction grating 12C, a light flux dividing unit 13C, a reference mirror 14C, an object mirror 15C, a first phase plate 17C, and a second phase plate 18C. Also, a grating vector direction of the second diffraction grating 12C is on a plane formed by the second direction Y and the third direction Z. The light receiving unit 7C is connected to a third relative positional information outputting unit 4C of the relative positional information outputting means 204. Then, the light receiving unit 7C transmits an acquired interference signal to the third relative positional information outputting unit 4C.

The light receiving unit 7C of the third displacement detecting unit 5C acquires an interference signal expressed in the following expression 11. Here, A3 is amplitude of interference. y indicates a movement amount of the first diffraction grating 211, that is, a relative displacement amount in the second direction Y of the head 203 and the measured member 202.

$$A3 \times \cos(2K1y + 2 \times B \times K2z + \delta) \qquad \text{[Expression 11]}$$

Similarly to the displacement detecting unit 5 according to the first embodiment, the fourth displacement detecting unit 5D includes a light receiving unit 7D, a second diffraction grating 12D, a light flux dividing unit 13D, a reference mirror 14D, an object mirror 15D, a first phase plate 17D, and a second phase plate 18D. Also, a grating vector direction of the second diffraction grating 12C is on a plane formed by the second direction Y and the third direction Z. The light receiving unit 7D is connected to a fourth relative positional information outputting unit 4D of the relative positional information outputting means 204. Then, the light receiving unit 7D transmits an acquired interference signal to the fourth relative positional information outputting unit 4D.

Also, the second diffraction grating 12D, the light flux dividing unit 13D, the reference mirror 14D, the object mirror 15D, the first phase plate 17D, and the second phase plate 18D included in the fourth displacement detecting unit 5D are arranged in a manner reversed in the second direction Y from those of the first displacement detecting unit 5A.

The light receiving unit 7D of the fourth displacement detecting unit 5D acquires an interference signal expressed in the following expression 12. Here, A4 is amplitude of interference.

$$A4 \times \cos(-2K1y + 2 \times B \times K2z + \delta) \qquad \text{[Expression 12]}$$

As illustrated in FIG. 11, the relative positional information outputting means 204 includes a first relative positional information outputting unit 4A, a second relative positional information outputting unit 4B, a third relative positional information outputting unit 4C, a fourth relative positional information outputting unit 4D, and an arithmetic unit 214.

As described above, a positive/negative of displacement information in the first direction X in the interference signals acquired by the light receiving unit 7A of the first displacement detecting unit 5A and the light receiving unit 7B of the second displacement detecting unit 5B is different. Also, a positive/negative of displacement information in the second direction Y in the interference signals acquired by the light receiving unit 7C of the third displacement detecting unit 5C and the light receiving unit 7D of the fourth displacement detecting unit 5D is different.

Thus, by subtracting displacement information B of the second relative positional information outputting unit 4B from displacement information A of the first relative positional information outputting unit 4A, it is possible to extract only displacement information in the first direction X. Also, by subtracting displacement information D of the fourth relative positional information outputting unit 4D from displacement information C of the third relative positional information outputting unit 4C, it is possible to extract only displacement information in the second direction Y. Then, by adding the displacement information A, B, C, and D of all of the first relative positional information outputting unit 4A, the second relative positional information outputting unit 4B, the third relative positional information outputting unit 4C, and the fourth relative positional information outputting unit 4D, it is possible to extract only displacement information in the third direction Z.

Then, by adding the displacement information A, B, C, and D of all of the first relative positional information outputting unit 4A, the second relative positional information outputting unit 4B, the third relative positional information outputting unit 4C, and the fourth relative positional information outputting unit 4D and dividing this by four, the arithmetic unit 214 calculates displacement information of a relative position in the third direction Z of the head 203 and the measured member 202.

Also, by subtracting the displacement information B of the second relative positional information outputting unit 4B from the displacement information A of the first relative positional information outputting unit 4A and dividing this by two, the arithmetic unit 214 calculates displacement information in the first direction X of the head 203 and the measured member 202. By subtracting the displacement information D of the fourth relative positional information outputting unit 4D from the displacement information C of the third relative positional information outputting unit 4C and dividing this by two, the arithmetic unit 214 calculates displacement information in the second direction Y of the head 203 and the measured member 202.

Thus, according to the displacement detecting device 201 of the third embodiment, it is possible to output three-dimensional displacement information in the first direction X, the second direction Y, and the third direction Z.

Since the other configurations are similar to those of the displacement detecting device 1 according to the first embodiment, a description thereof is omitted. According to the displacement detecting device 201 having such a configuration, it is also possible to acquire an effect similar to that of the displacement detecting device 1 according to the first embodiment described above.

Also, in the third embodiment, an example in which the first grating vector direction and the second grating vector direction of the first diffraction grating 211 are orthogonal to each other has been described. However, this is not the limitation. A first grating vector direction and a second grating vector direction may not be orthogonal to each other and only need to intersect with each other on the measured surface 202a of the measured member 202. Then, the first displacement detecting unit 5A and the second displacement detecting unit 5B are arranged in the first grating vector direction, and the third displacement detecting unit 5C and the fourth displacement detecting unit 5D are arranged in the second grating vector direction.

4. Fourth Embodiment

Next, a displacement detecting device according to the fourth embodiment will be described with reference to FIG. 13 and FIG. 14.

Figure 13:
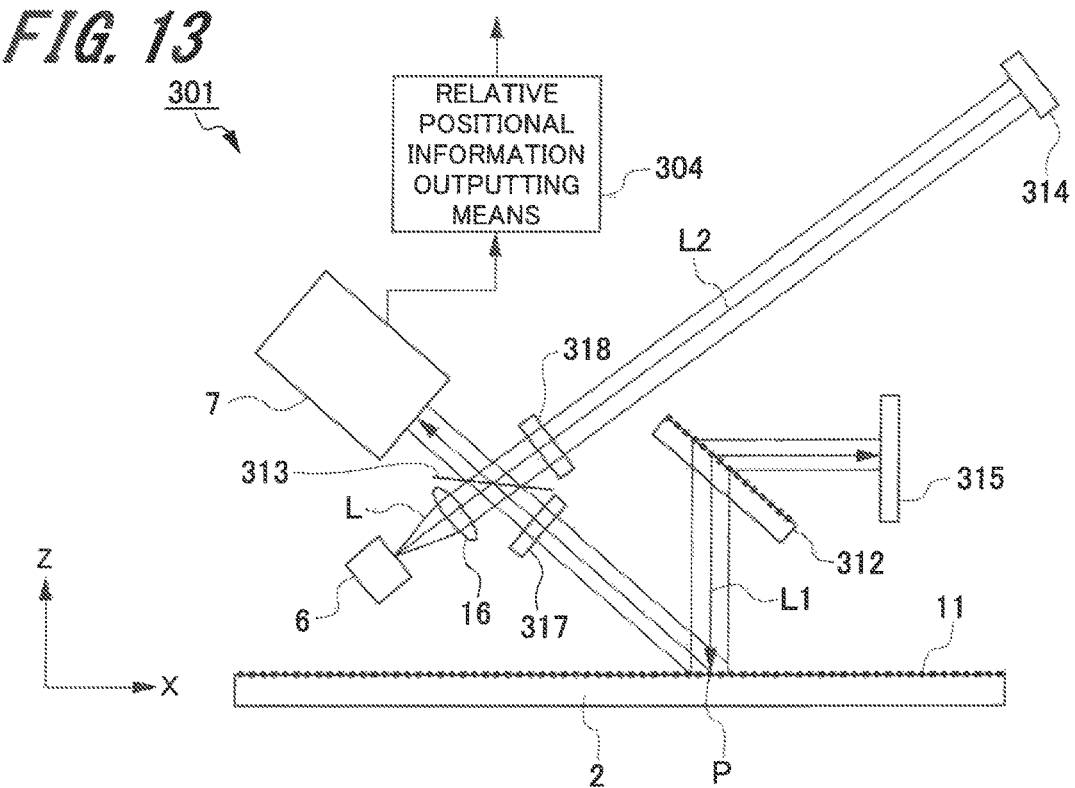
FIG. 13 is a schematic configuration view illustrating a configuration of a displacement detecting device according to a fourth embodiment of the present invention.
Figure 14:
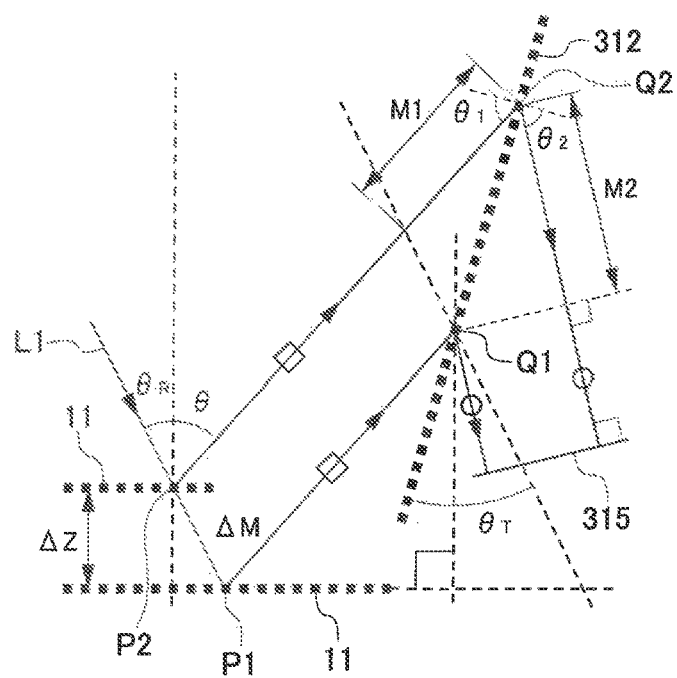
FIG. 14 is a view for describing a relationship between incident angles and diffraction angles of a first diffraction grating and a second diffraction grating in the displacement detecting device according to the fourth embodiment of the present invention.

FIG. 13 is a schematic configuration view illustrating a configuration of the displacement detecting device according to the fourth embodiment, and FIG. 14 is a view for describing a relationship between incident angles and diffraction angles of a first diffraction grating and a second diffraction grating in the displacement detecting device according to the fourth embodiment.

A displacement detecting device 301 according to the fourth embodiment is different from the displacement detecting device 1 according to the first embodiment in a point that a first light flux L1 does not vertically enter a first diffraction grating and a point that a second diffraction grating does not satisfy the Bragg condition. Thus, here, the same sign is assigned to a common part with the displacement detecting device 1 according to the first embodiment, and an overlapped description is omitted.

As illustrated in FIG. 13, the displacement detecting device 301 includes a head (not illustrated), a first diffraction grating 11 provided in a measured member 2, and a relative positional information outputting means 304. Also, a light source 6, a light receiving unit 7, a lens 16, a light flux dividing unit 313, a second diffraction grating 312, a reference mirror 314, an object mirror 315, a first phase plate 317, and a second phase plate 318 are arranged in the head.

In the displacement detecting device 301 according to the fourth embodiment, the first light flux L1 does not vertically enter the first diffraction grating. Thus, the light source 6, the lens 16, the light flux dividing unit 313, the second diffraction grating 312, the reference mirror 314, the object mirror 315, the first phase plate 317, and the second phase plate 318 are arranged in positions different from those in the displacement detecting device 1 according to the first embodiment.

Note that the reference mirror 314 is arranged in a position where an optical path length of a second light flux L2 becomes the same with an optical path length of a first light flux L1. Also, the reference mirror 314 is arranged in a position where the second light flux L2 emitted from the light flux dividing unit 313 enters vertically. Moreover, the object mirror 315 is arranged in a position where the first light flux L1 diffracted by the second diffraction grating 312 enters vertically.

Next, a relationship between an incident angle $\theta_R$ and a diffraction angle $\theta$ of the first diffraction grating 11 and an incident angle $\theta_1$ and a diffraction angle $\theta_2$ of the second diffraction grating 12 will be described with reference to FIG. 14.

As illustrated in FIG. 14, when the first diffraction grating 11 is moved for a length $\Delta Z$ to an upper side in a third direction Z, that is, in a direction of getting closer to the head, a position where the first light flux L1 enters the first diffraction grating 11 is changed from an incident point P1 to an incident point P2. Thus, at a time point at which the first light flux L1 enters the first diffraction grating 11, an optical path length of the first light flux L1 becomes short for a length $\Delta M$.

Also, when the first diffraction grating 11 is moved for the length $\Delta Z$ to the upper side in the third direction Z, that is, in the direction of getting closer to the head, a position where the first light flux L1 enters the second diffraction grating 312 is changed from an incident point Q1 to an incident point Q2. Then, an optical path length from the incident point P2 on the first diffraction grating 11 to the incident point Q2 on the second diffraction grating 312 becomes longer for a length M1 than an optical path length from the incident point P1 on the first diffraction grating 11 to the incident point Q1 on the second diffraction grating 312 of when the first diffraction grating 11 is not moved in the third direction Z. Moreover, a distance from the incident point Q2 on the second diffraction grating 312 to the object mirror 315 becomes longer for a length M2 than an optical path length from the incident point Q1 on the second diffraction grating 312 to the object mirror 315 of when the first diffraction grating 11 is not moved in the third direction Z.

Thus, when $\Delta Z$=M1+M2 is satisfied, an optical path length of the first light flux L1 becomes constant even in a case where the first diffraction grating 11 is moved in the third direction Z. Also, a condition satisfying $\Delta Z$=M1+M2 can be expressed by the following expression 13 from the incident angle $\theta_R$ to the first diffraction grating 11, the diffraction angle $\theta$ of the first diffraction grating 11, the incident angle $\theta_1$ to the second diffraction grating 312, and the diffraction angle $\theta_2$ of the second diffraction grating 312.

$$-\cos(\theta_1+\theta+\theta_R)/\cos\theta_1+\{\sin(\theta_1+\theta+\theta_R)-\cos(\theta_1+\theta+\theta_R)\tan\theta_1\}\sin\theta_2=1 \quad \text{[Expression 13]}$$

Thus, the diffraction angle $\theta$ of the first diffraction grating 11 and the diffraction angle $\theta_2$ of the second diffraction grating 312 satisfy the above expression 13. Accordingly, it is possible to make the optical path length of the first light flux L1 constant even when the first diffraction grating 11 is moved in the third direction Z. Note that application to an optical path in which the first light flux L1 is reflected by the object mirror 315 and returns to the light flux dividing unit 313 is also possible. Thus, it is possible to constantly make an optical path length of an incoming optical path of the first light flux L1 constant.

Note that in a case where the first light flux L1 vertically enters the first diffraction grating 11, $\theta_R=0°$. When the second diffraction grating 312 satisfies the Bragg condition, $\theta_1=\theta_2=\varphi$. As a result, the above expression 13 is transformed into the above expression 5.

Also, a light receiving element of the light receiving unit 7 acquires an interference signal expressed, for example, in the following expression 14.

$A\times\cos(2K_1X+2K_1Z\tan\theta_R+2K_2BZ+\delta)$ $B=\{\sin(\theta_1+\theta+\theta_R)-\cos(\theta_1+\theta+\theta_R)\tan\theta_1\}/\cos\theta_R$  [Expression 14]

K1 is a wave number of the first diffraction grating 11 which number is expressed by $2\pi/d_R$. Also, x indicates a movement amount of the first diffraction grating 11, that is, a relative displacement amount in the first direction X of the head 3 and the measured member 2. On the other hand, K2 is a wave number of the second diffraction grating 312 which number is expressed by $2\pi/d_T$. z indicates a movement amount, in a grating vector direction of the second diffraction grating 312, in the first light flux L1 that enters the second diffraction grating 312. Note that $d_R$ is a grating pitch of the first diffraction grating 11, and $d_T$ is a grating pitch of the second diffraction grating 312. Also, δ indicates an initial phase.

Moreover, B is a coefficient associated with inclination of the grating vector direction of the second diffraction grating 312 at an inclination angle $\theta_T$ in a direction in which the first light flux L1 enters the first diffraction grating 11. A relationship between this inclination angle $\theta_T$ and the incident angle $\theta_R$ to the first diffraction grating 11, the diffraction angle θ of the first diffraction grating 11, and the incident angle $\theta_1$ to the second diffraction grating 312 is $\theta_T=\theta_1+\theta+\theta_R-90°$.

In such a manner, even in a case where the first light flux L1 does not vertically enter the first diffraction grating 11 and the second diffraction grating 312 does not satisfy the Bragg condition, the optical path length of the first light flux L1 is not changed when the diffraction angle θ of the first diffraction grating 11 and the diffraction angle $\theta_2$ of the second diffraction grating 312 satisfy the above expression 13.

Since the other configurations are similar to those of the displacement detecting device 1 according to the first embodiment, a description thereof is omitted. According to the displacement detecting device 301 having such a configuration, it is also possible to acquire an effect similar to that of the displacement detecting device 1 according to the first embodiment described above.

5. Fifth Embodiment

Figure 15:
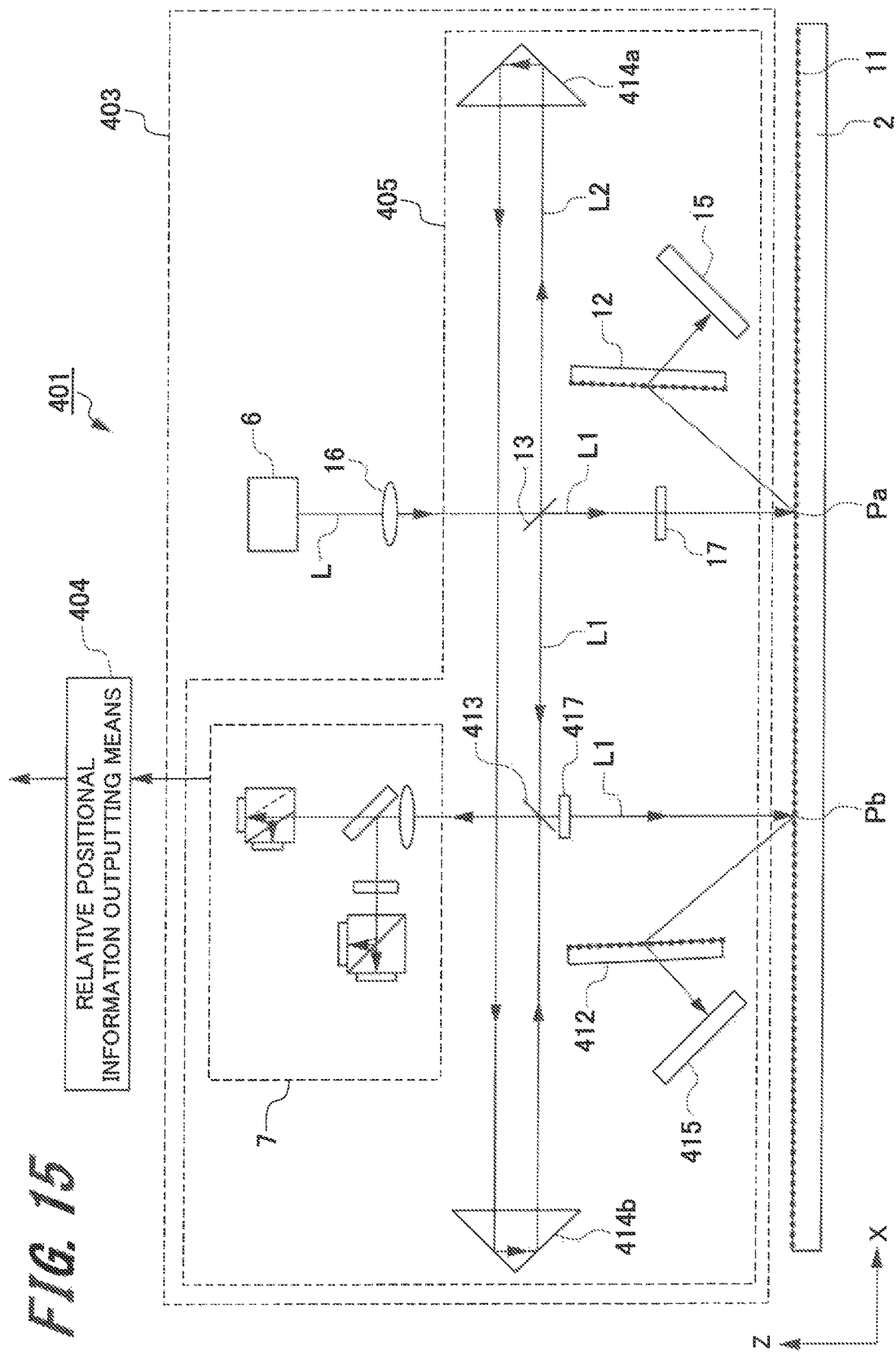
FIG. 15 is a schematic configuration view illustrating a configuration of a displacement detecting device according to a fifth embodiment of the present invention.

Next, a displacement detecting device according to the fifth embodiment will be described with reference to FIG. 15. FIG. 15 is a schematic configuration view illustrating a configuration of the displacement detecting device according to the fifth embodiment.

A displacement detecting device 401 according to the fifth embodiment detects relative displacement in a third direction Z in a head 3 or a measured member 2. Thus, here, the same sign is assigned to a common part with the displacement detecting device 1 according to the first embodiment, and an overlapped description is omitted.

As illustrated in FIG. 15, the displacement detecting device 401 includes a first diffraction grating 11 provided in a measured member 2, a head 403, and a relative positional information outputting means 404.

The head 403 includes a displacement detecting unit 405, a light source 6, and a light receiving unit 7 provided in the displacement detecting unit 405. Also, the displacement detecting unit 405 includes a second diffraction grating 12, a light flux dividing unit 13, an object mirror 15, and a first phase plate 17. Note that since the second diffraction grating 12, the object mirror 15, and the first phase plate 17 have configurations similar to those of the displacement detecting device 1 according to the first embodiment, a description thereof is omitted.

Also, the head 403 includes a light flux combining unit 413, a third diffraction grating 412, a first reference reflecting member 414a, a second reference reflecting member 414b, a second object mirror 415, and a third phase plate 417. The first reference reflecting member 414a and the second reference reflecting member 414b are arranged in positions facing each other on both sides in a first direction X in the head 3. Each of the first reference reflecting member 414a and the second reference reflecting member 414b includes a triangle prism. As described, a reference reflecting member is not limited to a mirror, and various different optical components such as a prism can be applied thereto.

A second light flux L2 that is reference light reflected by the light flux dividing unit 13 is emitted toward the first reference reflecting member 414a. Then, the first reference reflecting member 414a reflects the incident second light flux L2 toward the second reference reflecting member 414b. Then, the second reference reflecting member 414b reflects the incident second light flux L2 toward the light flux combining unit 413.

The light flux combining unit 413, the third diffraction grating 412, the second object mirror 415, and the third phase plate 417 are arranged on one side in the first direction X of the light flux dividing unit 13, the second diffraction grating 12, the object mirror 15, and the first phase plate 17. More specifically, the light flux combining unit 413, the third diffraction grating 412, the second object mirror 415, and the third phase plate 417 are respectively arranged in positions reversed in the first direction X from the light flux dividing unit 13, the second diffraction grating 12, the object mirror 15, and the first phase plate 17.

A first light flux L1 that enters a first emission point PA on the first diffraction grating 11, that is diffracted twice by each of the first diffraction grating 11 and the second diffraction grating 12, and that returns to the light flux dividing unit 13 again is reflected by the light flux dividing unit 13 and emitted toward the light flux combining unit 413. The light flux combining unit 413 reflects the incident first light flux L1 toward the first diffraction grating 11 of the measured member 2 again. That is, the light flux combining unit 413 has a function as a re-reflection unit.

The first light flux L1 reflected by the light flux combining unit 413 passes through the third phase plate 417, and a polarization direction thereof is changed to circularly polarized light. Then, the first light flux L1 passing through the third phase plate 417 enters a second emission point PB on the first diffraction grating 11. The first light flux L1 is diffracted by the first diffraction grating 11. Note that a diffraction direction at the second emission point PB faces the opposite side in the first direction X of a diffraction direction at the first emission point PA. That is, the diffraction direction at the second emission point PB is reversed from the diffraction direction at the first emission point PA.

The first light flux L1 diffracted by the first diffraction grating 11 enters the third diffraction grating 412. Then, the first light flux L1 is diffracted by the third diffraction grating 412 and enters the second object mirror 415. The first light flux L1 is reflected by the second object mirror 415 and enters the third diffraction grating 412 again. Then, the first light flux L1 is diffracted again by the third diffraction grating 412 and enters the first diffraction grating 11.

Note that a grating pitch or a diffraction angle of the third diffraction grating 412 is the same with the grating pitch $d_T$ or the diffraction angle φ of the second diffraction grating 12. Also, a positional relationship between the third diffraction grating 412 and the second object mirror 415 is reversed in the first direction X from a positional relationship between the second diffraction grating 12 and the object mirror 15, and positional relationships in the third direction Z thereof are the same. Thus, a description of these is omitted.

Then, the first light flux L1 that enters the first diffraction grating 11 is diffracted by the first diffraction grating 11 and emitted toward the third phase plate 417 and the light flux combining unit 413. Note that the first light flux L1 is diffracted for four times only by the first diffraction grating 11, and diffraction directions in two times among these are reversed. Thus, a phase in the first light flux L1 which phase is diffracted by the first diffraction grating 11 is canceled.

The first light flux L1 that enters the light flux combining unit 413 is transmitted through the light flux combining unit 413. Also, the second light flux L2 that enters the light flux combining unit 413 is reflected by the light flux combining unit 413. Thus, the first light flux L1 and the second light flux L2 are superposed by the light flux combining unit 413. Then, the first light flux L1 and the second light flux L2 are superposed as s-polarized light and p-polarized light orthogonal to each other and are emitted to the light receiving unit 7.

Optical path lengths from the light flux dividing unit 13 to the light flux combining unit 413 in the first light flux L1 and the second light flux L2 divided by the light flux dividing unit 13 are set to be equal.

Since the light receiving unit 7 has a configuration similar to that of the light receiving unit 7 according to the first embodiment, a description thereof is omitted. Note that an interference signal of A×cos (4×B×K2z+δ) is acquired in the light receiving unit 7. Here, A is amplitude of interference, and K2 is a wave number of the second diffraction grating 12 which number is expressed by $2π/d_T$. z indicates a movement amount, in a grating vector direction of the second diffraction grating 12, in the first light flux L1 that enters the second diffraction grating 12. Note that $d_R$ is a grating pitch of the first diffraction grating 11, and $d_T$ is a grating pitch of the second diffraction grating 12. Also, δ indicates an initial phase.

Moreover, B is a coefficient associated with inclination of the grating vector direction of the second diffraction grating 12 at an inclination angle $θ_T$ in the third direction Z. Then, in a case where an incident angle to the second diffraction grating 12 (diffraction angle is the same in Bragg condition) is φ, B can be expressed by B=cos $θ_T$+sin $θ_T$×tan φ.

In such a manner, only displacement information in the third direction Z is in the interference signal acquired in the light receiving unit 7. Thus, according to the displacement detecting device 401 of the fifth embodiment, it is possible to detect relative displacement only in the third direction Z in the head 3 or the measured member 2.

Since the other configurations are similar to those of the displacement detecting device 1 according to the first embodiment, a description thereof is omitted. According to the displacement detecting device 401 having such a configuration, it is also possible to acquire an effect similar to that of the displacement detecting device 1 according to the first embodiment described above.

6. Sixth Embodiment

Next, a displacement detecting device according to the sixth embodiment will be described with reference to FIG. 16 and FIG. 17.

Figure 16:
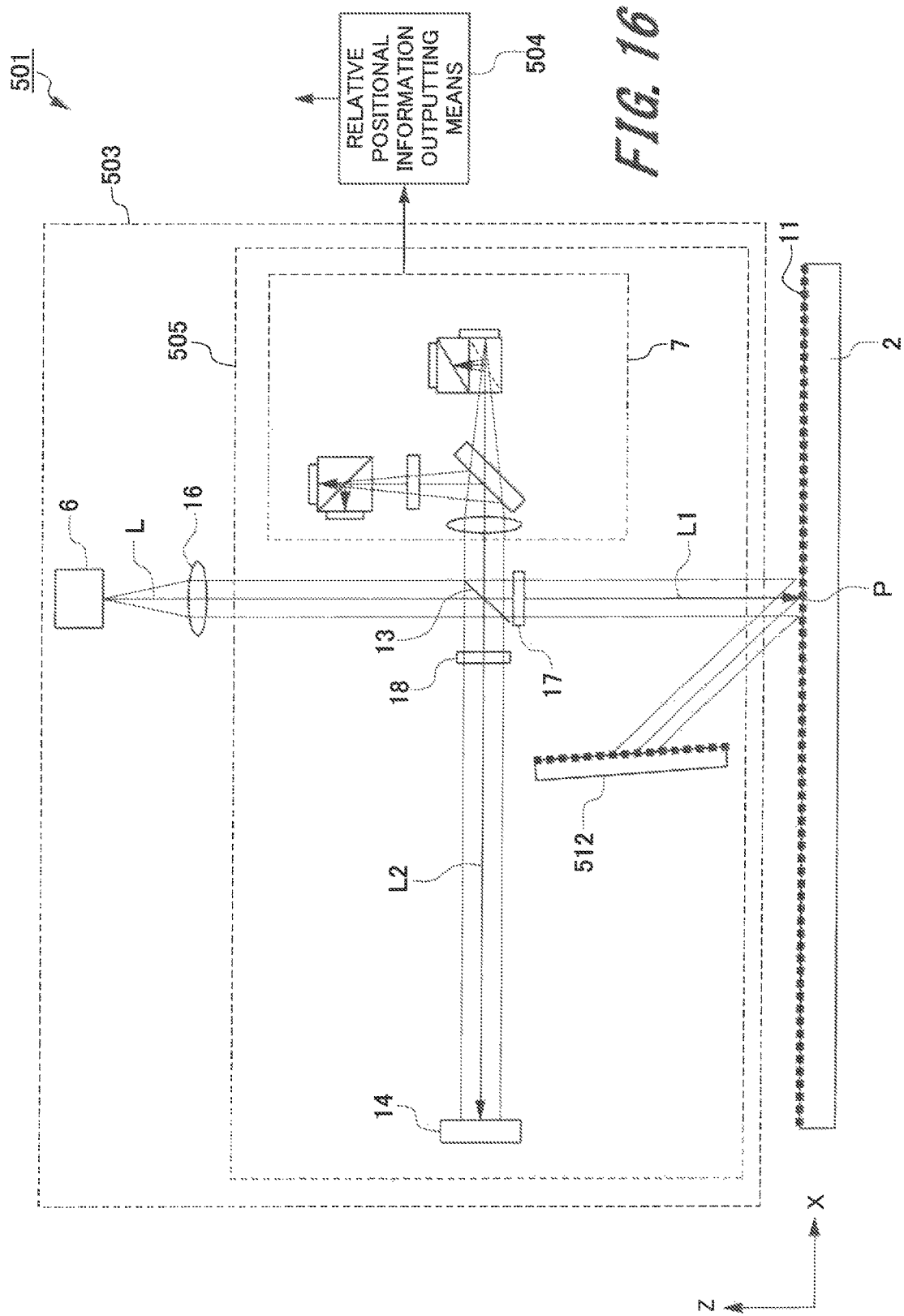
FIG. 16 is a schematic configuration view illustrating a configuration of a displacement detecting device according to a sixth embodiment of the present invention.
Figure 17:
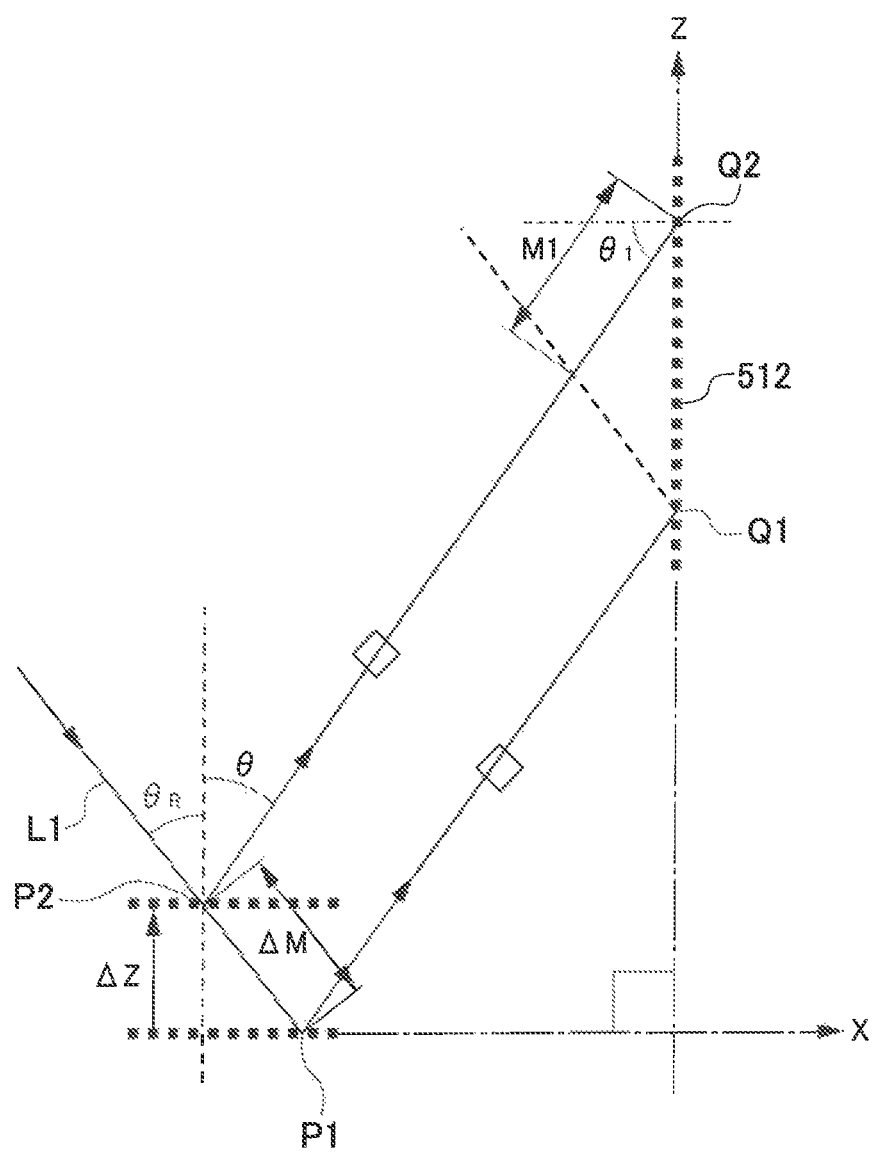
FIG. 17 is a view for describing a relationship between incident angles and diffraction angles of a first diffraction grating and a second diffraction grating in the displacement detecting device according to the sixth embodiment of the present invention.

FIG. 16 is a schematic configuration view illustrating a configuration of the displacement detecting device according to the sixth embodiment, and FIG. 17 is a view for describing a relationship between incident angles and diffraction angles of a first diffraction grating and a second diffraction grating in the displacement detecting device according to the sixth embodiment.

A displacement detecting device 501 according to the sixth embodiment is different from the displacement detecting device 1 according to the first embodiment in a point that a reflection-type diffraction grating is used as a second diffraction grating. Thus, here, the same sign is assigned to a common part with the displacement detecting device 1 according to the first embodiment, and an overlapped description is omitted.

As illustrated in FIG. 16, the displacement detecting device 501 includes a head 503, a measured member 2 in which a first diffraction grating 11 is provided, and a relative positional information outputting means 504. The head 503 includes a displacement detecting unit 505, a light source 6, and a light receiving unit 7 provided in the displacement detecting unit 505.

Also, the displacement detecting unit 505 includes a second diffraction grating 512, a light flux dividing unit 13, a first phase plate 17, a second phase plate 18, and a reference mirror 14. Note that since the light flux dividing unit 13, the reference mirror 14, the first phase plate 17, and the second phase plate 18 have configurations similar to those of the displacement detecting device 1 according to the first embodiment, a description thereof is omitted.

The second diffraction grating 512 is a reflection-type diffraction grating that reflects and diffracts an incident first light flux L1. Then, the second diffraction grating 512 reflects and diffracts the first light flux L1, which is diffracted by the first diffraction grating 11, toward the first diffraction grating 11 again. Thus, in the displacement detecting device 501 according to the sixth embodiment, the second diffraction grating 512 has a function as an object reflecting member. As a result, it becomes unnecessary to newly provide a mirror, a prism, or the like as an object reflecting member and it is possible to reduce the number of components.

Next, a relationship between an incident angle $θ_R$ and a diffraction angle θ of the first diffraction grating 11 and an incident angle $θ_1$ and a diffraction angle $θ_2$ of the second diffraction grating 512 will be described with reference to FIG. 17.

As illustrated in FIG. 17, when the first diffraction grating 11 is moved for a length ΔZ to an upper side in a third direction Z, that is, in a direction of getting closer to the head, a position where the first light flux L1 enters the first diffraction grating 11 is changed from an incident point P1 to an incident point P2. Thus, at a time point at which the first light flux L1 enters the first diffraction grating 11, an optical path length of the first light flux L1 becomes short for a length ΔM.

Also, when the first diffraction grating 11 is moved for the length ΔZ to the upper side in the third direction Z, that is, in the direction of getting closer to the head, a position where the first light flux L1 enters the second diffraction grating 512 is changed from an incident point Q1 to an incident point Q2. Then, an optical path length from the incident point P2 on the first diffraction grating 11 to the incident point Q2 on the second diffraction grating 512 becomes longer for a length M1 than an optical path length from the incident point P1 on the first diffraction grating 11 to the incident point Q1 on the second diffraction grating 512 of when the first diffraction grating 11 is not moved in the third direction Z.

Thus, when ΔM=M1 is satisfied, an optical path length of the first light flux L1 becomes constant even in a case where the first diffraction grating 11 is moved in the third direction Z. Also, a condition satisfying ΔZ=M1 is $\theta=\theta_R$ and can be expressed by $\theta_1+\theta=90°$ in a case of an incident angle $\theta_R$ to the first diffraction grating 11, a diffraction angle θ of the first diffraction grating 11, and an incident angle (diffraction angle)$\theta_1$ of the second diffraction grating 512.

Thus, the incident angle $\theta_R$ to the first diffraction grating 11, the diffraction angle θ of the first diffraction grating 11, and the incident angle (diffraction angle) $\theta_1$ to the second diffraction grating 512 satisfy $\theta=\theta_R$ and $\theta_1+\theta=90°$. Accordingly, it is possible to make the optical path length of the first light flux L1 constant even when the first diffraction grating 11 is moved in the third direction Z.

Since the other configurations are similar to those of the displacement detecting device 1 according to the first embodiment, a description thereof is omitted. According to the displacement detecting device 501 having such a configuration, it is also possible to acquire an effect similar to that of the displacement detecting device 1 according to the first embodiment described above.

7. Seventh Embodiment

Next, a displacement detecting device according to the seventh embodiment will be described with reference to FIG. 18 and FIG. 19.

Figure 18:
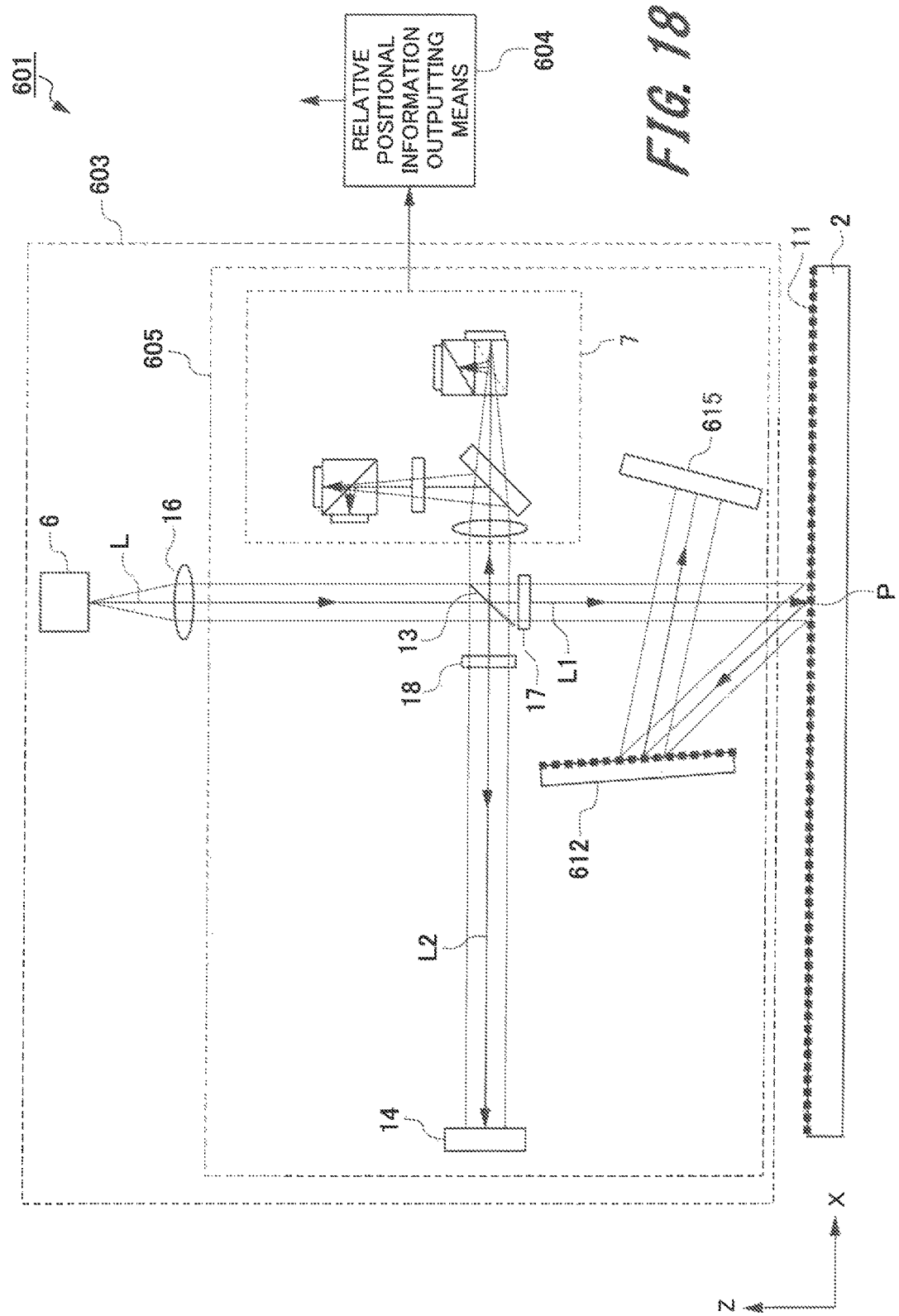
FIG. 18 is a schematic configuration view illustrating a configuration of a displacement detecting device according to a seventh embodiment of the present invention.
Figure 19:
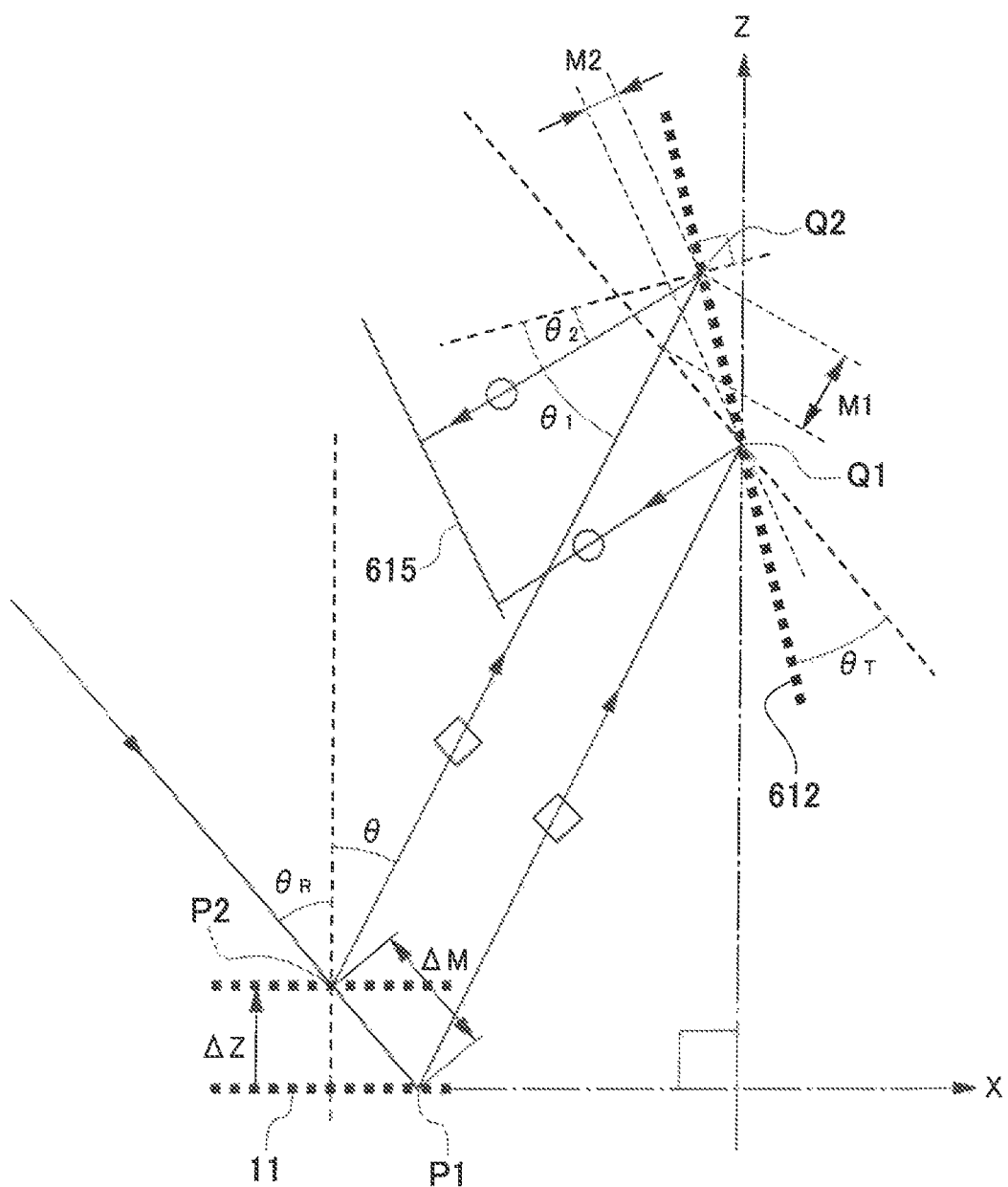
FIG. 19 is a view for describing a relationship between incident angles and diffraction angles of a first diffraction grating and a second diffraction grating in the displacement detecting device according to the seventh embodiment of the present invention.

FIG. 18 is a schematic configuration view illustrating a configuration of the displacement detecting device according to the seventh embodiment, and FIG. 19 is a view for describing a relationship between incident angles and diffraction angles of a first diffraction grating and a second diffraction grating in the displacement detecting device according to the seventh embodiment.

Similarly to the displacement detecting device 501 according to the sixth embodiment, a reflection-type diffraction grating is used as a second diffraction grating in a displacement detecting device 601 according to the seventh embodiment. Thus, here, the same sign is assigned to a common part with the displacement detecting device 1 according to the first embodiment, and an overlapped description is omitted.

As illustrated in FIG. 18, the displacement detecting device 601 includes a head 603, a measured member 2 in which a first diffraction grating 11 is provided, and a relative positional information outputting means 604. The head 603 includes a displacement detecting unit 605, a light source 6, and a light receiving unit 7 provided in the displacement detecting unit 605.

Also, the displacement detecting unit 605 includes a second diffraction grating 612, a light flux dividing unit 13, a first phase plate 17, a second phase plate 18, a reference mirror 14, and an object mirror 615. Note that since the light flux dividing unit 13, the reference mirror 14, the first phase plate 17, and the second phase plate 18 have configurations similar to those of the displacement detecting device 1 according to the first embodiment, a description thereof is omitted.

The second diffraction grating 612 is a reflection-type diffraction grating that reflects and diffracts an incident first light flux L1. Then, the second diffraction grating 612 reflects and diffracts the first light flux L1, which is diffracted by the first diffraction grating 11, toward the object mirror 615. The object mirror 615 reflects the incident first light flux L1 toward the second diffraction grating 612 again.

In the displacement detecting device 601 according to the seventh embodiment, the object mirror 615 is added to the displacement detecting device 501 according to the sixth embodiment. However, by providing the object mirror 615, it is possible to easily perform operation of making an optical path length of the first light flux L1 and an optical path length of a second light flux L2 identical.

Next, a relationship between an incident angle $\theta_R$ and a diffraction angle θ of the first diffraction grating 11 and an incident angle $\theta_1$ and a diffraction angle $\theta_2$ of the second diffraction grating 612 will be described with reference to FIG. 19.

As illustrated in FIG. 19, when the first diffraction grating 11 is moved for a length ΔZ to an upper side in a third direction Z, that is, in a direction of getting closer to the head, a position where the first light flux L1 enters the first diffraction grating 11 is changed from an incident point P1 to an incident point P2. Thus, at a time point at which the first light flux L1 enters the first diffraction grating 11, an optical path length of the first light flux L1 becomes short for a length ΔM.

Also, when the first diffraction grating 11 is moved for the length ΔZ to the upper side in the third direction Z, that is, in the direction of getting closer to the head, a position where the first light flux L1 enters the second diffraction grating 612 is changed from an incident point Q1 to an incident point Q2. Then, an optical path length from the incident point P2 on the first diffraction grating 11 to the incident point Q2 on the second diffraction grating 612 becomes longer for a length M1 than an optical path length from the incident point P1 on the first diffraction grating 11 to the incident point Q1 on the second diffraction grating 612 of when the first diffraction grating 11 is not moved in the third direction Z. Moreover, a distance from the incident point Q2 on the second diffraction grating 612 to the object mirror 615 becomes longer for a length M2 than an optical path length from the incident point Q1 on the second diffraction grating 612 to the object mirror 615 of when the first diffraction grating 11 is not moved in the third direction Z.

Thus, when ΔZ=M1+M2 is satisfied, an optical path length of the first light flux L1 becomes constant even in a case where the first diffraction grating 11 is moved in the third direction Z. Also, a condition satisfying ΔZ=M1+M2 can be expressed by the above expression 13 from the incident angle $\theta_R$ to the first diffraction grating 11, the diffraction angle θ of the first diffraction grating 11, the incident angle $\theta_1$ to the second diffraction grating 612, and the diffraction angle $\theta_2$ of the second diffraction grating 612.

Thus, the diffraction angle θ of the first diffraction grating 11 and the diffraction angle $\theta_2$ of the second diffraction grating 612 satisfy the above expression 13. Accordingly, it is possible to make the optical path length of the first light flux L1 constant even when the first diffraction grating 11 is moved in the third direction Z.

Note that as each of the second diffraction grating 512 according to the sixth embodiment and the second diffraction grating 612 according to the seventh embodiment, for example, a so-called blazed grating in which a sectional shape of a groove is formed in a serrated shape is preferably used. With this arrangement, it is possible to improve diffraction efficiency with respect to a specific wavelength.

Since the other configurations are similar to those of the displacement detecting device 1 according to the first embodiment, a description thereof is omitted. According to the displacement detecting device 601 having such a configuration, it is also possible to acquire an effect similar to that of the displacement detecting device 1 according to the first embodiment described above.

8. Eighth Embodiment

Next, a displacement detecting device according to the eighth embodiment will be described with reference to FIG. 20 and FIG. 21.

Figure 20:
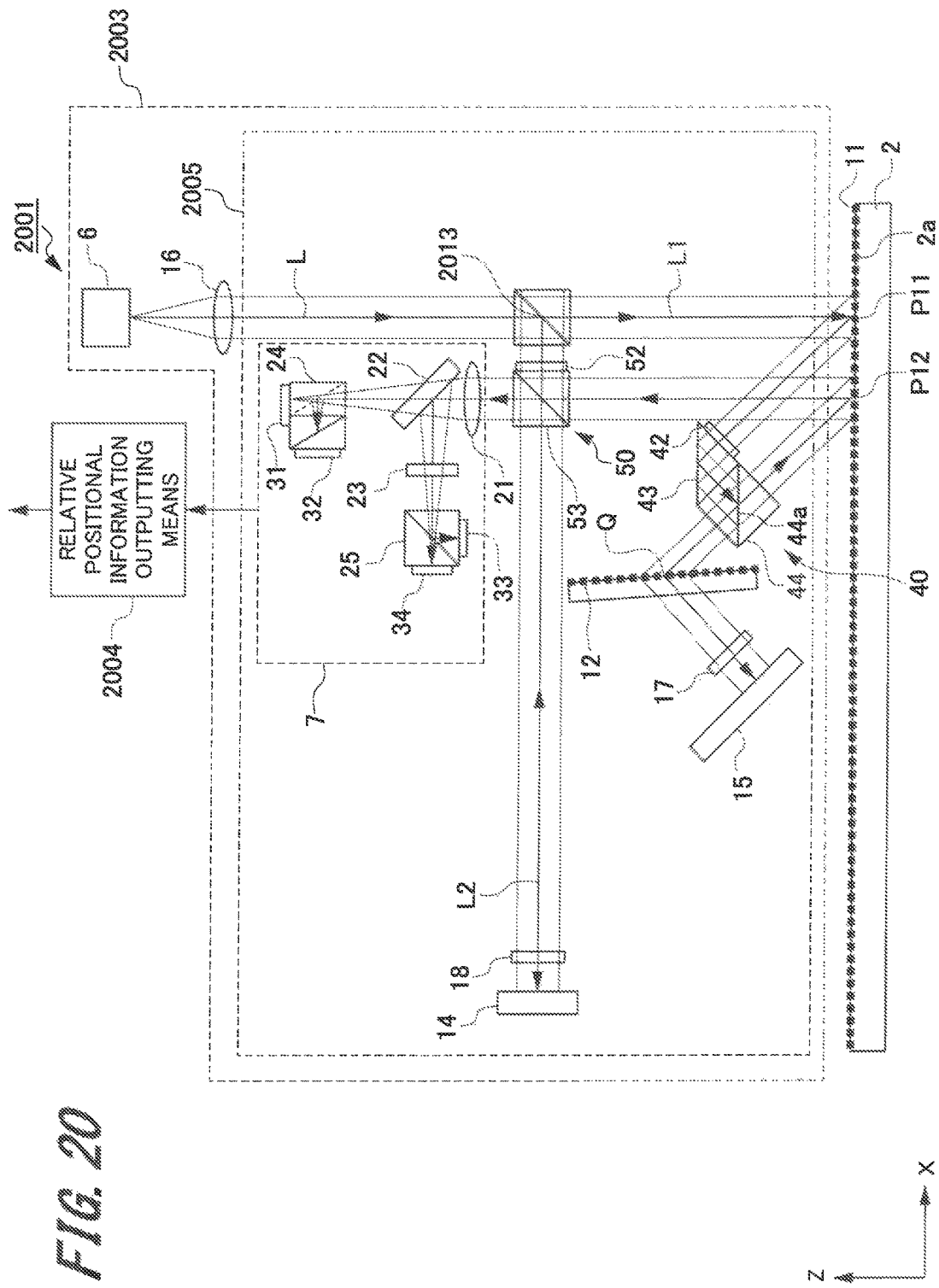
FIG. 20 is a schematic configuration view illustrating a configuration of a displacement detecting device according to an eighth embodiment of the present invention.
Figure 21:
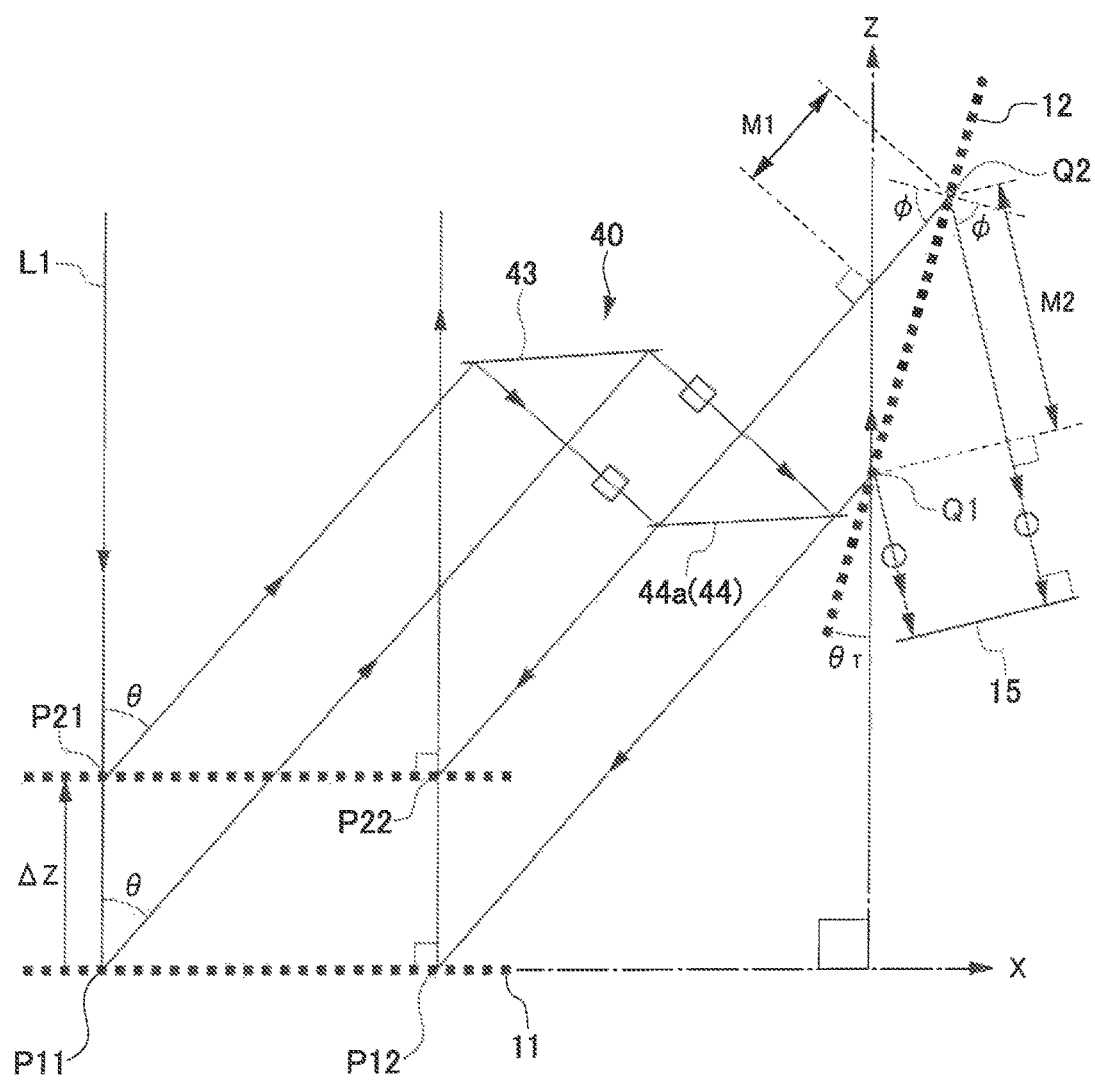
FIG. 21 is a view for describing a relationship between diffraction angles of a first diffraction grating and a second diffraction grating in the displacement detecting device according to the eighth embodiment of the present invention.

FIG. 20 is a schematic configuration view illustrating a configuration of the displacement detecting device according to the eighth embodiment, and FIG. 21 is a view for describing a relationship between diffraction angles of a first diffraction grating and a second diffraction grating.

A displacement detecting device 2001 according to the eighth embodiment is different from the displacement detecting device 1 according to the first embodiment in a point that first and second emission positions on a measured surface 2a of a measured member 2 are different. Thus, here, the same sign is assigned to a common part with the displacement detecting device 1 according to the first embodiment, and an overlapped description is omitted.

The displacement detecting device 2001 illustrated in FIG. 20 is a displacement detecting device that detects displacement (movement amount) of when at least one of a head and a measured member is moved.

As illustrated in FIG. 20, the displacement detecting device 2001 includes a first diffraction grating 11 provided on a measured surface 2a of a measured member 2, a head 2003, and a relative positional information outputting means 2004. Note that the relative positional information outputting means 2004 may be housed in the head 2003 or arranged in a mobile information processing terminal or a personal computer (PC) provided outside the head 2003. Also, since the relative positional information outputting means 2004 has a configuration similar to that of the relative positional information outputting means 4 according to the first embodiment, a description thereof is omitted here. Moreover, since the measured member 2 has a configuration similar to that of the measured member 2 according to the first embodiment, a description thereof is omitted here.

The first diffraction grating 11 provided in this measured member 2 diffracts light emitted from the head 2003 and returns the light at a predetermined diffraction angle to the head 2003 again.

The head 2003 includes a displacement detecting unit 2005, a light source 6, and a light receiving unit 7 provided in the displacement detecting unit 2005. Note that the light receiving unit 7 may be arranged in the displacement detecting unit 2005 or arranged outside the displacement detecting unit 2005. Since the light source 6 has a configuration similar to that of the light source 6 according to the first embodiment, a description thereof is omitted here. Also, for example, the light source 6 emits circularly polarized light that rotates around an optical axis.

Light L emitted from the light source 6 enters the displacement detecting unit 2005. Note that a lens 16 including a collimating lens or the like is arranged between the light source 6 and the displacement detecting unit 2005. The lens 16 collimates the light L emitted from the light source 6 into parallel light. Thus, the light L collimated into the parallel light by the lens 16 enters the displacement detecting unit 2005.

The displacement detecting unit 2005 emits the light L, which is emitted from the light source 6, toward the first diffraction grating 11 of the measured member 2 and guides the light L returned from the measured member 2 to the light receiving unit 7. The displacement detecting unit 2005 includes a second diffraction grating 12, a light flux dividing unit 2013, a light flux parallel branch unit 40, a light flux combining unit 50, a reference mirror 14 indicating an example of a reference light reflecting member, an object mirror 15 indicating an example of an object light reflecting member, a first phase plate 17, and a second phase plate 18.

The light flux dividing unit 2013 includes, for example, a semitransparent mirror or a beam splitter. The light L emitted from the light source and collimated into the parallel light by the lens 16 enters the light flux dividing unit 2013.

The light flux dividing unit 2013 divides the light L into two light fluxes that are a first light flux L1 as object light and a second light flux L2 as reference light. The light L transmitted through the light flux dividing unit 2013 becomes the first light flux L1, and the light L reflected by the light flux dividing unit 2013 becomes the second light flux L2. The first light flux L1 transmitted through the light flux dividing unit 2013 advances toward the first diffraction grating 11, and the second light flux L2 reflected by the light flux dividing unit 2013 advances toward the reference mirror 14 through the light flux combining unit 50.

The light flux dividing unit 2013 divides the light L into the first light flux L1 and the second light flux L2, and a light quantity ratio thereof is preferably a ratio in which a light quantity on a side of the first diffraction grating 11 and that on a side of the reference mirror 14 become the same in entrance to the light receiving unit 7 described later.

Moreover, a polarizing plate may be provided between the light source 6 and the light flux dividing unit 2013. Accordingly, it is possible to remove leakage light that exists slightly as a polarization component orthogonal to the s-polarized light and the p-polarized light, and a noise.

Also, although an example of using a semitransparent mirror or a beam splitter as the light flux dividing unit 2013 has been described, this is not the limitation. For example, a polarization beam splitter may be used as the light flux dividing unit 2013.

Also, the light source 6, the lens 16, and the light flux dividing unit 2013 are arranged in such a manner that an advancing direction of the light transmitted through the light flux dividing unit 2013, that is, the first light flux L1 becomes in parallel with a third direction Z. Thus, the first light flux L1 transmitted through the light flux dividing unit 2013 vertically enters the measured surface 2a of the measured member 2, that is, the first diffraction grating 11. Accordingly, even when the measured member 2 is displaced in the third direction Z, a position of an incident point P11 of the first light flux L1 that enters the first diffraction grating 11 is not changed on the first diffraction grating 11.

The light flux parallel branch unit 40 is arranged in a position where the first light flux L1 that is diffracted by the first diffraction grating 11 and that returns to the displacement detecting unit 5 again enters. The light flux parallel branch unit 40 includes a polarization adjustment phase plate 42, a reflection mirror 43 including a triangular prism, and a polarization beam splitter 44.

The polarization adjustment phase plate 42 changes a polarization direction of passing light and changes a polarization state of the incident first light flux L1 into s-polarized light. The reflection mirror 43 is arranged on a light emission side of the polarization adjustment phase plate 42. The reflection mirror 43 reflects the first light flux L1, which passes through the polarization adjustment phase plate 42, toward the polarization beam splitter 44.

The polarization beam splitter 44 reflects s-polarized light and transmits p-polarized light. A reflection/transmission surface 44a, which reflects and transmits light, of the polarization beam splitter 44 and a reflection surface of the reflection mirror 43 are arranged in parallel. Here, a polarization state of the first light flux L1 reflected by the reflection mirror 43 is adjusted to s-polarized light by the polarization adjustment phase plate 42. Thus, the polarization beam splitter 44 reflects the first light flux L1, which is reflected by the reflection mirror 43, toward the second diffraction grating 12.

Also, the first light flux L1 transmitted through the second diffraction grating 12 and the first phase plate 17 and reflected by the object mirror 15 enters the polarization beam splitter 44 of the light flux parallel branch unit 40 again. Note that a polarization direction of the first light flux L1 that enters the light flux parallel branch unit 40 again is changed to p-polarized light. Thus, the light flux parallel branch unit 40 transmits the first light flux L1 that enters the polarization beam splitter 44 again. Then, the first light flux L1 transmitted through the light flux parallel branch unit 40 enters the first diffraction grating 11 again.

Here, the light flux parallel branch unit 40 sets, as an outgoing optical path, an optical path in which the first light flux L1 is diffracted by the first diffraction grating 11 and enters the light flux parallel branch unit 40. Then, an optical path in which the first light flux L1 diffracted by the second diffraction grating 12 is transmitted through the light flux parallel branch unit 40 and enters the first diffraction grating 11 is set as an incoming optical path. The light flux parallel branch unit 40 moves the outgoing optical path and the incoming optical path in parallel in such a manner that the outgoing optical path and the incoming optical path of the first light flux L1 do not become identical. Thus, a position where the first light flux L1 enters the first diffraction grating 11 becomes an incident point P12 different from the incident point P11 in the outgoing optical path.

The second diffraction grating 12 is arranged in a position where the first light flux L1 passing through the light flux parallel branch unit 40 enters. The second diffraction grating 12 is arranged in such a manner that a plane thereof is inclined in the third direction Z. The second diffraction grating 12 is a transmission-type diffraction grating that transmits light and diffracts the transmitted light. Note that a grating pitch $d_T$ and a diffraction angle $\varphi$ of the second diffraction grating 12 will be described later.

The object mirror 15 is arranged in a direction, in which the first light flux L1 incident from the first diffraction grating 11 is transmitted, in the second diffraction grating 12. Moreover, the first phase plate 17 is arranged between the second diffraction grating 12 and the object mirror 15.

The first phase plate 17 changes a polarization direction of passing light and includes, for example, a quarter wavelength plate. Thus, in a case where passing light is p-polarized light, the first phase plate 17 changes the light into circularly polarized light that rotates in a first direction with an advancing direction as a center axis. Also, in a case of being circularly polarized light that rotates in the first direction, passing light is changed into s-polarized light. Moreover, in a case of being s-polarized light, passing light is changed into circularly polarized light that rotates in a second direction opposite to the first direction with an advancing direction as a center axis. Then, in a case of being circularly polarized light that rotates in the second direction, passing light is changed into p-polarized light.

The first light flux L1 transmitted through the first phase plate 17 enters the object mirror 15 with a polarization direction thereof being changed by the first phase plate 17. The object mirror 15 is arranged in a position where the first light flux L1 transmitted through the second diffraction grating 12 and the first phase plate 17 enters a reflection surface thereof vertically. Then, since the first light flux L1 vertically enters the object mirror 15, the object mirror 15 reflects the first light flux L1 in such a manner that an optical path thereof in incidence after transmission through the second diffraction grating 12 and an optical path thereof in incidence to the second diffraction grating 12 again after reflection become identical.

The first light flux L1 reflected by the object mirror 15 is transmitted through the first phase plate 17 and the second diffraction grating 12 and enters the light flux parallel branch unit 40 again. The first light flux L1 passing through the light flux parallel branch unit 40 enters the first diffraction grating 11 again.

Here, a polarization direction of the first light flux L1 that enters the light flux parallel branch unit 40 again is changed to p-polarized light by the first phase plate 17. Thus, the light flux parallel branch unit 40 transmits the first light flux L1 that enters the polarization beam splitter 44 again. Then, the first light flux L1 transmitted through the light flux parallel branch unit 40 enters the first diffraction grating 11 again.

Here, the light flux parallel branch unit 40 sets, as an outgoing optical path, an optical path in which the first light flux L1 is diffracted by the first diffraction grating 11 and enters the light flux parallel branch unit 40. Also, an optical path in which the first light flux L1 diffracted by the second diffraction grating 12 is transmitted through the light flux parallel branch unit 40 and enters the first diffraction grating 11 is set as an incoming optical path.

The light flux parallel branch unit 40 moves the outgoing optical path and the incoming optical path in parallel in such a manner that the outgoing optical path and the incoming optical path of the first light flux L1 do not become identical. Thus, a position where the first light flux L1 enters the first diffraction grating 11 becomes an incident point P12 different from the incident point P11 in the outgoing optical path.

Moreover, the first light flux L1 is diffracted twice by each of the first diffraction grating 11 and the second diffraction grating 12 in the outgoing optical path and the incoming optical path. Then, the first light flux L1 is diffracted again by the first diffraction grating 11 and enters the light flux combining unit 50.

The light flux combining unit 50 is arranged between the light flux dividing unit 2013 and the reference mirror 14. The light flux combining unit 50 includes, for example, a polarization adjustment phase plate 52 and a polarization beam splitter 53.

The polarization adjustment phase plate 52 is arranged between the polarization beam splitter 53 and the light flux dividing unit 2013. The polarization adjustment phase plate 52 changes a polarization direction of passing light and changes a polarization state of the incident second light flux L2 into p-polarized light.

Similarly to the polarization beam splitter 44 of the light flux parallel branch unit 40, the polarization beam splitter 53 reflects s-polarized light and transmits p-polarized light. Then, the polarization beam splitter 53 transmits a p-polarized second light flux L2 passing through the polarization adjustment phase plate 52. The second light flux L2 transmitted through the polarization beam splitter 53 of the light flux combining unit 50 advances toward the reference mirror 14.

The reference mirror 14 is arranged in an advancing direction of the second light flux L2 divided by the light flux dividing unit 2013 and transmitted through the light flux combining unit 50. The reference mirror 14 is arranged in such a manner that a reflection surface thereof is in parallel with a surface, which emits the second light flux L2, of the light flux dividing unit 2013 and a reflection/transmission surface, which reflects and transmits light, of the polarization beam splitter 53 of the light flux combining unit 50. That is, the reference mirror 14 is arranged in a position where the second light flux L2 vertically enters the reflection surface thereof. Then, since the second light flux L2 enters the reference mirror 14 vertically, the reference mirror 14 reflects the second light flux L2 in such a manner that an optical path in the entrance and an optical path after the reflection become identical.

Also, the second phase plate 18 is arranged between the light flux combining unit 50 and the reference mirror 14. Similarly to the first phase plate 17, the second phase plate 18 changes a polarization direction of passing light and includes, for example, a quarter wavelength plate. Thus, in a case where passing light is p-polarized light, the second phase plate 18 changes the light into circularly polarized light that rotates in a first direction with an advancing direction as a center axis. Also, in a case of being circularly polarized light that rotates in the first direction, passing light is changed into s-polarized light. Moreover, in a case of being s-polarized light, passing light is changed into circularly polarized light that rotates in a second direction opposite to the first direction with an advancing direction as a center axis. Then, in a case of being circularly polarized light that rotates in the second direction, passing light is changed into p-polarized light.

The reference mirror 14 and the object mirror 15 are arranged in such a manner that a length of an optical path in which the first light flux L1 from the light flux dividing unit 2013 is reflected by the object mirror 15 and enters the light flux combining unit 50, and a length of an optical path in which the second light flux L2 from the light flux dividing unit 2013 is reflected by the reference mirror 14 and enters the light flux combining unit 50 become the same.

Accordingly, even in a case where there is a wavelength variation in the light source 6 due to a variation in atmospheric pressure, humidity, or temperature, it is possible to make an influence on the first light flux L1 and that on the second light flux L2 equal. As a result, it is possible to perform stable measurement regardless of a surrounding environment without performing an atmospheric pressure correction, a humidity correction, or a temperature correction. Moreover, it becomes easier to adjust an optical path length of the first light flux L1, and an optical path length or an optical axis angle of the second light flux L2 in production of the displacement detecting device 2001.

The second light flux L2 reflected by the reference mirror 14 passes through an optical path that is the same with an outgoing optical path, passes through the second phase plate 18, and enters the light flux combining unit 50 again. Here, the second light flux L2 is changed from p-polarized light into s-polarized light by passing through the second phase plate 18 twice. Also, the first light flux L1 is changed from s-polarized light into p-polarized light by passing through the first phase plate 17 twice.

Thus, the light flux combining unit 50 transmits the p-polarized first light flux L1 toward the light receiving unit 7 and reflects the s-polarized second light flux L2 toward the light receiving unit 7. Accordingly, it is possible to superpose the first light flux L1 and the second light flux L2 by the light flux combining unit 50. Then, the first light flux L1 and the second light flux L2 superposed by the light flux combining unit 50 are emitted toward the light receiving unit 7.

Since the light receiving unit 7 has a configuration similar to that of the light receiving unit 7 according to the first embodiment, a description thereof is omitted here. Also, the relative positional information outputting means 2004 is connected to the light receiving unit 7. The light receiving unit 7 outputs interference signals acquired by a first light receiving element 31, a second light receiving element 32, a third light receiving element 33, and a fourth light receiving element 34 to the relative positional information outputting means 2004.

Next, a relationship between the first diffraction grating 11 and the second diffraction grating 12 having the above described configurations will be described with reference to FIG. 21.

As illustrated in FIG. 21, a first light flux L1 enters the first diffraction grating 11 vertically in the third direction Z. Note that a grating vector direction S1 of the first diffraction grating 11 is in parallel with a first direction X as illustrated in FIG. 2. Then, the first diffraction grating 11 performs diffraction at a diffraction angle θ. Here, when it is assumed that a wavelength of the first light flux L1 is λ and a grating pitch of the first diffraction grating 11 is $d_R$, the diffraction angle θ of the first diffraction grating 11 can be calculated by the expressions 1 and 2 described above.

The first light flux L1 diffracted by the first diffraction grating 11 enters the second diffraction grating 12 and is diffracted by the second diffraction grating 12. A grating vector direction of the second diffraction grating 12 in this case is on a plane formed by the first direction X and the third direction Z. Also, the grating vector direction of the second diffraction grating 12 is inclined at an angle $θ_T$ with respect to an incident angle of the first light flux L1 to the first diffraction grating 11. That is, the grating vector direction of the second diffraction grating 12 is inclined at the angle $θ_T$ with respect to the third direction Z.

In a case where the first light flux L1 enters the second diffraction grating 12 at an angle φ, the second diffraction grating 12 diffracts the first light flux L1 at a diffraction angle φ when the second diffraction grating 12 satisfies the Bragg condition. Thus, in the Bragg condition, the grating pitch $d_T$ or the diffraction angle φ of the second diffraction grating 12 is set in such a manner as to satisfy the above-described expressions 3 and 4. Note that λ is a wavelength of the first light flux L1.

When the second diffraction grating 12 satisfies the Bragg condition, it is possible to acquire extremely high diffraction efficiency, for example, by using a second diffraction grating 12M of the transmission-type volume hologram described above (see FIG. 5A). However, there is limitation in designing of an incident angle φ to the second diffraction grating 12, and the grating pitch $d_T$. Thus, a thin transmission-type diffraction grating may be used as the second diffraction grating 12 instead of the volume hologram. By using a thin transmission-type diffraction grating, it is possible to leave a degree of freedom in selection of an incident angle and a diffraction angle.

In a case where the second diffraction grating 12 satisfies the Bragg condition, the first light flux L1 diffracted for the second time by the second diffraction grating 12 (first diffraction is by first diffraction grating 11) is reflected by the object mirror 15 and enters the second diffraction grating 12 again. Note that as illustrated in FIG. 20 and FIG. 21, in a case where the measured member 2 is not displaced in the third direction Z, a position of an incident point Q at which the first light flux L1 enters the second diffraction grating 12 is not changed. Also, even when the measured member 2 is displaced in the first direction X or a second direction Y, a position of the incident point Q at which the first light flux L1 enters the second diffraction grating 12 is not changed. Then, the first light flux L1 that is diffracted for the third time by the second diffraction grating 12 passes through the light flux parallel branch unit 40, enters the first diffraction grating 11, and is diffracted for the fourth time by the first diffraction grating 11.

Here, an example in which the measured member 2, that is, the first diffraction grating 11 is moved for a length $\Delta Z$ in the third direction Z will be described.

As illustrated in FIG. 21, when the first diffraction grating 11 is moved for the length $\Delta Z$ to an upper side in the third direction Z, that is, a direction of getting closer to the head 2003, an optical path length of the first light flux L1 becomes shorter for the length $\Delta Z$ at a time point of entrance to an incident point P21 on the first diffraction grating 11.

Note that the first light flux L1 vertically enters the measured surface 2a of the measured member 2, that is, the first diffraction grating 11. Thus, even when the measured member 2 is displaced in the third direction Z, positions of the incident points P11 and P21 of the first light flux L1 that enters the first diffraction grating 11 are not changed on the first diffraction grating 11.

When the first diffraction grating 11 is moved for the length $\Delta Z$ to the upper side in the third direction Z, that is, the direction of getting closer to the head 2003, a position where the first light flux L1 enters the second diffraction grating 12 is changed from an incident point Q1 to an incident point Q2.

Also, an optical path length of the first light flux L1 in the light flux parallel branch unit 40 is not changed even when the first diffraction grating 11 is moved in the first direction X or the third direction Z. Thus, an optical path length from the incident point P21 on the first diffraction grating 11 to the incident point Q2 on the second diffraction grating 12 through the light flux parallel branch unit 40 becomes longer for a length M1 than an optical path length from the incident point P11 on the first diffraction grating 11 to the incident point Q1 on the second diffraction grating 12 through the light flux parallel branch unit 40 of when the first diffraction grating 11 is not moved in the third direction Z. Moreover, a distance from the incident point Q2 on the second diffraction grating 12 to the object mirror 15 becomes longer for a length M2 than an optical path length from the incident point Q1 on the second diffraction grating 12 to the object mirror 15 of when the first diffraction grating 11 is not moved in the third direction Z.

Thus, when $\Delta Z = M1 + M2$ is satisfied, an optical path length of the first light flux L1 becomes constant even in a case where the first diffraction grating 11 is moved in the third direction Z. Also, a condition satisfying $\Delta Z = M1 + M2$ is expressed by the following expression 15 from the diffraction angle $\theta$ of the first diffraction grating 11 and the diffraction angle $\varphi$ of the second diffraction grating 12.

$$-\cos(\varphi+\theta)/\cos\varphi + \{\sin(\varphi+\theta) - \cos(\varphi+\theta)\tan\varphi\}\sin\varphi = 1 \quad [\text{Expression 15}]$$

Thus, each of the diffraction angle $\theta$ of the first diffraction grating 11 and the diffraction angle $\varphi$ of the second diffraction grating 12 is set to be a value satisfying the above expression 15. Accordingly, it is possible to make the optical path length of the first light flux L1 constant even when the first diffraction grating 11 is moved in the third direction Z.

Note that application to an optical path in which the first light flux L1 is reflected by the object mirror 15, passes through the light flux parallel branch unit 40, and enters the first diffraction grating 11 again is possible. Moreover, an optical path length of the first light flux L1 in the light flux parallel branch unit 40 is not changed even when the first diffraction grating 11 is moved in the first direction X or the third direction Z. Thus, it is possible to constantly make an optical path length of an incoming optical path of the first light flux L1 constant.

As described above, even when the measured member 2 is displaced in the first direction X or the second direction Y, a position of the incident point Q at which the first light flux L1 enters the second diffraction grating 12 is not changed. Thus, it is possible to keep the optical path length of the first light flux L1 constant. As a result, since the optical path length of the first light flux L1 is not changed even when the first diffraction grating 11 is moved in the first direction X, the second direction Y, and the third direction Z, it is possible to constantly keep the optical path length of the first light flux L1 and the optical path length of the second light flux L2 constant.

For example, in a case where a wavelength $\lambda$ of the light source 6 is 790 nm, a grating pitch $d_R$ of the first diffraction grating 11 is 1 an incident angle of the first light flux L1 to the first diffraction grating 11 is 0 degrees, and a grating pitch of the second diffraction grating 12 is $d_T$, the diffraction angle $\theta$ of the first diffraction grating 11 $\approx 52.2°$ and the diffraction angle $\varphi$ of the second diffraction grating 12 $\approx 45.9°$.

Next, an operation example of the displacement detecting device 2001 having the above-described configuration will be described.

As illustrated in FIG. 20, light L emitted from the light source 6 is collimated by the lens 16 and becomes parallel light. The parallel light L collimated by the lens 16 enters the light flux dividing unit 2013. The light that enters the light flux dividing unit 2013 is divided into a first light flux L1 and a second light flux L2.

The second light flux L2 reflected by the light flux dividing unit 2013 enters the light flux combining unit 50. The second light flux L2 is changed into p-polarized light by the polarization adjustment phase plate 52 of the light flux combining unit 50. The second light flux L2 changed into p-polarized light enters the polarization beam splitter 53 of the light flux combining unit 50.

As described above, the polarization beam splitter 53 reflects s-polarized light and transmits p-polarized light among pieces of light. Thus, the second light flux L2 that enters the polarization beam splitter 53 is transmitted through the polarization beam splitter 53.

The second light flux L2 passes through the light flux combining unit 50 and is emitted to the second phase plate 18. Since the second light flux L2 is p-polarized light, the second light flux L2 is changed into circularly polarized light that rotates in a first direction with an advancing direction as a center axis when passing through the second phase plate 18. The second light flux L2 passing through the second phase plate 18 is emitted to the reference mirror 14.

The second light flux L2 emitted to the reference mirror 14 is reflected by the reference mirror 14 and emitted again to the second phase plate 18. A polarization direction of the second light flux L2 here is circularly polarized light rotating in the first direction with the advancing direction as the center axis. Thus, the second light flux L2 is changed by the second phase plate 18 into s-polarized light orthogonal to p-polarized light that is in an outgoing polarization direction.

The second light flux L2 passing through the second phase plate 18 enters the polarization beam splitter 53 of the light flux combining unit 50. Since the polarization direction of the second light flux L2 is s-polarized light, the second light flux L2 is reflected by the polarization beam splitter 53 of the light flux combining unit 50.

On the other hand, the first light flux L1 transmitted through the light flux dividing unit 2013 vertically enters the measured surface 2a of the measured member 2, that is, the incident point P11 of the first diffraction grating 11. Then, as illustrated in FIG. 3, the first light flux L1 is diffracted at the diffraction angle θ by the first diffraction grating 11. The first light flux L1 diffracted for the first time enters the light flux parallel branch unit 40.

A polarization state of the first light flux L1 is changed by the polarization adjustment phase plate 42 of the light flux parallel branch unit 40 into s-polarized light. The first light flux L1 changed into the s-polarized light is reflected by the reflection mirror 43 and enters the polarization beam splitter 44. Since being the s-polarized light, the first light flux L1 is reflected by the polarization beam splitter 44.

The first light flux L1 reflected by the polarization beam splitter 44 of the light flux parallel branch unit 40 enters the incident point Q (see FIG. 20) on the second diffraction grating 12 at the incident angle φ. As described above, since the second diffraction grating 12 satisfies the Bragg condition, the first light flux L1 is diffracted at the diffraction angle φ by the second diffraction grating 12.

The first light flux L1 diffracted by the second diffraction grating 12 vertically enters the object mirror 15. Then, the first light flux L1 is reflected by the object mirror 15 toward the second diffraction grating 12 again. The first light flux L1 enters the second diffraction grating 12 at the incident angle φ. Here, the first light flux L1 enters the incident point Q on the second diffraction grating 12 which point is the same with that in the outgoing optical path. Then, third diffraction is performed by the second diffraction grating 12 and the first light flux L1 enters the polarization beam splitter 44 of the light flux parallel branch unit 40.

Also, the first phase plate 17 is arranged between the second diffraction grating 12 and the object mirror 15. Thus, since being s-polarized light, the first light flux L1 passing through the second diffraction grating 12 is changed by the first phase plate 17 into circularly polarized light that rotates in a second direction with an advancing direction as a center axis. Also, the first light flux L1 reflected by the object mirror 15 is changed from the circularly polarized light rotating in the second direction into p-polarized light when passing through the first phase plate 17 again.

Since a polarization direction of the first light flux L1 that enters the light flux parallel branch unit 40 again is changed by the first phase plate 17 into p-polarized light, the first light flux L1 is transmitted through the polarization beam splitter 44 of the light flux parallel branch unit 40.

Also, the light flux parallel branch unit 40 moves an outgoing optical path and an incoming optical path in parallel in such a manner that the outgoing optical path and the incoming optical path of the first light flux L1 do not become identical. Thus, the first light flux L1 passes through the light flux parallel branch unit 40 and enters an incident point P12, which is different from an incident point P11 in the outgoing optical path, at an incident angle θ on the first diffraction grating 11.

In such a manner, since the incident point P11 in the outgoing optical path and the incident point P12 in the incoming optical path with respect to the first diffraction grating 11 are at different positions, it is possible to reduce an influence of when dust is attached to the first diffraction grating 11.

Next, the first light flux L1 is diffracted for the fourth time by the first diffraction grating 11 and emitted to the light flux combining unit 50. Since a polarization direction of the first light flux L1 here is p-polarized light, the first light flux L1 is transmitted through the polarization beam splitter 53 of the light flux combining unit 50. Then, a light flux in which the linearly polarized first light flux L1 and second light flux L2 that are superposed by the light flux combining unit 50 and that are orthogonal to each other are superposed is emitted to the light receiving unit 7.

The light flux is collected by a condenser lens 21 and emitted to a semitransparent mirror 22. The semitransparent mirror 22 divides the light flux into two pieces of light. A light flux transmitted through the semitransparent mirror 22 enters a first polarization beam splitter 24.

Here, the first polarization beam splitter 24 is arranged in an inclined manner in such a manner that polarization directions of a first light flux L1 and a second light flux L2 polarization directions of which are different from each other by 90 degrees are inclined by 45 degrees with respect to an incident surface of the first polarization beam splitter 24. Accordingly, the first light flux L1 and the second light flux L2 respectively have a p polarization component and an s polarization component with respect to the first polarization beam splitter 24. Thus, in the first light flux L1 and the second light flux L2 transmitted through the first polarization beam splitter 24, pieces of polarized light having the same polarization direction interfere with each other. Thus, it is possible to make the first light flux L1 and the second light flux L2 interfere with each other by the first polarization beam splitter 24.

Similarly, in the first light flux L1 and the second light flux L2 reflected by the first polarization beam splitter 24, pieces of polarized light having the same polarization direction with respect to the first polarization beam splitter 24 interfere with each other. Thus, it is possible to make these light fluxes interfere with each other by the first polarization beam splitter 24.

The interference light between the first light flux L1 and the second light flux L2 transmitted through the first polarization beam splitter 24 is received by the first light receiving element 31. Also, the interference light between the first light flux L1 and the second light flux L2 reflected by the first polarization beam splitter 24 is received by the second light receiving element 32. Here, interference signals photoelectrically converted by the first light receiving element 31 and the second light receiving element 32 become signals with phases different from each other by 180 degrees.

Then, as the interference signals acquired by the first light receiving element 31 and the second light receiving element 32, interference signals of $A \times \cos(2 \times K1 \times x + 2 \times B \times K2 \times z + \delta)$ are acquired. Here, A is amplitude of interference, and K1 is a wave number of the first diffraction grating 11 which number is expressed by $2\pi/d_R$. Also, x indicates a movement amount of the first diffraction grating 11, that is, a relative displacement amount in the first direction X of the head 2003 and the measured member 2. On the other hand, K2 is a wave number of the second diffraction grating 12 which number is expressed by $2\pi/d_T$. z indicates a movement amount, in a grating vector direction of the second diffraction grating 12, in the first light flux L1 that enters the second diffraction grating 12. Note that $d_R$ is a grating pitch of the first diffraction grating 11, and $d_T$ is a grating pitch of the second diffraction grating 12. Also, δ indicates an initial phase.

Moreover, B is a coefficient associated with inclination of the grating vector direction of the second diffraction grating 12 at an inclination angle $\theta_T$ in the third direction Z. Then, in a case where an incident angle to the second diffraction grating 12 (diffraction angle is the same in Bragg condition) is φ, B can be expressed by B=cos $\theta_T$+sin $\theta_T$×tan φ.

Here, when the head 2003 and the measured member 2 are relatively moved for x/2 in the first direction X, an incident point of the first light flux L1 emitted to the first diffraction grating 11 is moved for x/2 in the first direction X. That is, the first light flux L1 is moved for x/2 in the first direction X on the first diffraction grating 11. Thus, a phase of K1x is added to the first light flux L1, and interference light in which lightness/darkness of light in one cycle is generated is received by the first light receiving element 31 and the second light receiving element 32.

Note that even when the head 2003 and the measured member 2 are relatively moved in the first direction X, an incident point of the first light flux L1 on the second diffraction grating 12 is not changed. Thus, only a phase diffracted by the first diffraction grating 11 is added to the first light flux L1.

Also, when the head 2003 and the measured member 2 are relatively moved for Z/(2×B) in the third direction Z, the incident point of the first light flux L1 emitted to the second diffraction grating 12 is moved for Z/2 in the grating vector direction on the second diffraction grating 12. That is, the first light flux L1 is moved for Z/2 in the grating vector direction on the second diffraction grating 12. Thus, a phase of K2z is added to the first light flux L1, and interference light in which lightness/darkness of light in one cycle is generated is received by the first light receiving element 31 and the second light receiving element 32.

Note that as described above, the first light flux L1 enters the first diffraction grating 11 in parallel with the third direction Z. Thus, the first light flux L1 vertically enters the first diffraction grating 11. Thus, even when the head 2003 and the measured member 2 are relatively moved in the third direction Z, the incident point of the first light flux L1 on the first diffraction grating 11 is not changed. Thus, only a phase diffracted by the second diffraction grating 12 is added to the first light flux L1.

Moreover, each of the diffraction angle θ of the first diffraction grating 11 and the diffraction angle φ of the second diffraction grating 12 is set to be a value satisfying the above expression 15. Thus, even when the head 2003 and the measured member 2 are relatively moved for ΔZ in the third direction Z, ΔZ and the sum of M1+M2 illustrated in FIG. 21 constantly become 0. As a result, an optical path length of the first light flux L1 is not changed. Even when the head 2003 and the measured member 2 are relatively moved for ΔZ in the third direction Z, only an incident position of the first light flux L1 on the second diffraction grating 12 is changed.

Here, as described above, the interference signals acquired by the first light receiving element 31 and the second light receiving element 32 do not have a component related to a wavelength of the light source 6. Thus, even when a wavelength of the light source varies due to a variation in atmospheric pressure, humidity, or temperature, interference intensity is not influenced.

On the other hand, as illustrated in FIG. 20, a light flux reflected by the semitransparent mirror 22 enters a light receiving-side phase plate 23. By being transmitted through the light receiving-side phase plate 23, a light flux including the first light flux L1 and the second light flux L2 that are linearly-polarized light with polarization directions being different from each other by 90 degrees becomes pieces of circularly polarized light that rotate reversely. Then, since being on the same optical path, the pieces of circularly polarized light rotating reversely are superposed with each other, become linearly polarized light, and enter the second polarization beam splitter 25.

An s polarization component of this linearly polarized light is reflected by the second polarization beam splitter 25 and received by the third light receiving element 33. Also, a p polarization component is transmitted through the second polarization beam splitter 25 and received by the fourth light receiving element 34.

As described above, the linearly polarized light that enters the second polarization beam splitter 25 is generated by superposition of the pieces of circularly polarized light rotating reversely. Then, a polarization direction of the linearly-polarized light that enters the second polarization beam splitter 25 is rotated for ½ when the head 2003 and the measured member 2 are relatively moved for $d_R$/2 in the first direction X. Also, when the head 2003 and the measured member 2 are relatively moved for $d_T$/(2×B) in the first direction X, the polarization direction of the linearly-polarized light that enters the second polarization beam splitter 25 is rotated for ½.

Thus, similarly to the first light receiving element 31 and the second light receiving element 32, interference signals of A×cos (2×K1x+2×B×K2z+δ') are acquired in the third light receiving element 33 and the fourth light receiving element 34. δ' is an initial phase.

Also, the signals photoelectrically converted in the third light receiving element 33 and the fourth light receiving element 34 have phases different from each other by 180 degrees.

Note that in the present embodiment, the second polarization beam splitter 25 that divides light fluxes received by the third light receiving element 33 and the fourth light receiving element 34 is arranged in such a manner as to be inclined by 45 degrees with respect to the first polarization beam splitter 24. Thus, signals acquired in the third light receiving element 33 and the fourth light receiving element 34 have phases deviated by 90 degrees from those of the signals acquired in the first light receiving element 31 and the second light receiving element 32.

Thus, for example, it is possible to acquire a Lissajous signal by using the signals acquired in the first light receiving element 31 and the second light receiving element 32 as sin signals and the signals acquired in the third light receiving element 33 and the fourth light receiving element 34 as cos signals.

The signals acquired by these light receiving elements are calculated by the relative positional information outputting means 2004, and a relative displacement amount of the head 2003 and the measured member 2 is counted. Accordingly, it is possible to detect a relative displacement amount of the head 2003 and the measured member 2.

In the displacement detecting device 2001 according to the eighth embodiment, an interference signal acquired in the light receiving unit 7 of the displacement detecting unit 2005 includes displacement information in the first direction X and the third direction Z similarly to the displacement detecting device 1 according to the first embodiment. Thus, application to a device that detects relative displacement in the first direction X of the head 2003 and the measured member 2 of a case where the head 2003 and the measured member 2 are relatively moved only in the first direction X is possible. Also, application to a device that detects relative displacement in the third direction Z of the head 2003 or the measured member 2 of a case where the head 2003 and the measured member 2 are relatively moved only in the third direction Z is possible. That is, the displacement detecting device 2001 according to the eighth embodiment has two usages in one device similarly to the displacement detecting device 1 according to the first embodiment.

9. Ninth Embodiment

Next, a displacement detecting device according to the ninth embodiment will be described with reference to FIG. 22.

Figure 22:
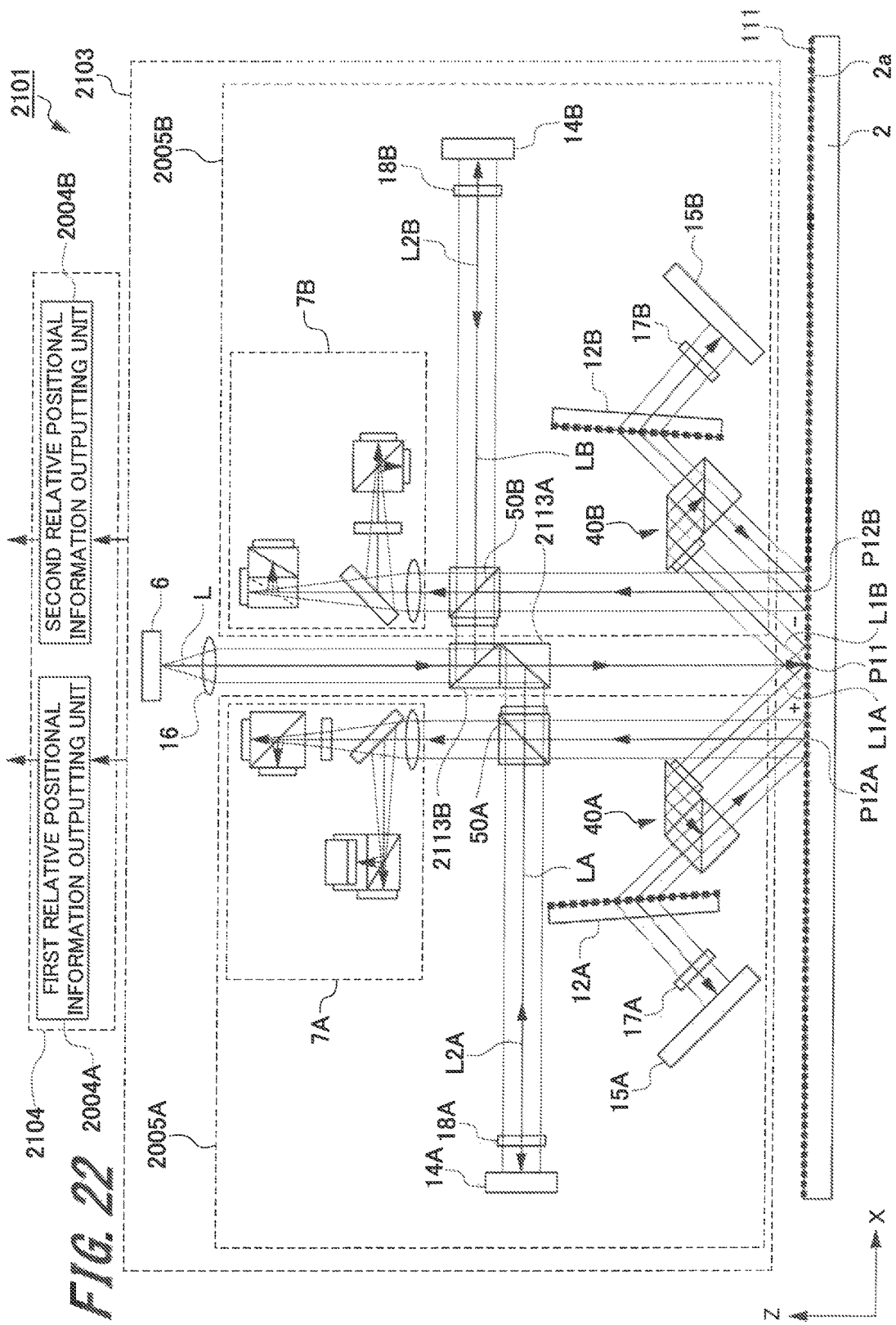
FIG. 22 is a schematic configuration view illustrating a configuration of a displacement detecting device according to a ninth embodiment of the present invention.

FIG. 22 is a schematic configuration view illustrating a configuration of the displacement detecting device according to the ninth embodiment.

Similarly to the displacement detecting device 101 according to the second embodiment, a displacement detecting device 2101 according to the ninth embodiment is a displacement detecting device that can output two-dimensional displacement information in a first direction X and a third direction Z Then, here, the same sign is assigned to a common part with the displacement detecting device 2001 according to the eighth embodiment, and an overlapped description is omitted.

As illustrated in FIG. 22, the displacement detecting device 2101 includes a measured member 2 in which a first diffraction grating 111 is provided, a head 2103, and a relative positional information outputting means 2104. The head 2103 and the measured member 2 are configured in a manner relatively movable in two directions that are the first direction X and the third direction Z.

The head 2103 includes a first displacement detecting unit 2005A, a second displacement detecting unit 2005B, a light source 6, a lens 16, a first light flux dividing unit 2113A, and a second light flux dividing unit 2113B. The first displacement detecting unit 2005A is arranged on one side in the first direction X of the head 2103 and the second displacement detecting unit 2005B is arranged on the other side in the first direction X of the head 2103.

Then, the light source 6, the lens 16, the first light flux dividing unit 2113A, and the second light flux dividing unit 2113B are arranged in the first direction X between the first displacement detecting unit 2005A and the second displacement detecting unit 2005B.

Each of the first light flux dividing unit 2113A and the second light flux dividing unit 2113B includes a semitransparent mirror or a beam splitter. The first light flux dividing unit 2113A is arranged on a side of the measured member 2 in the third direction Z of the second light flux dividing unit 2113B. That is, the second light flux dividing unit 2113B is arranged on a side of the light source 6 of the first light flux dividing unit 2113A. Each of the first light flux dividing unit 2113A and the second light flux dividing unit 2113B divides incident light into two that are reflected light and transmitted light.

Light L emitted from the light source 6 enters the second light flux dividing unit 2113B. A light flux reflected by the second light flux dividing unit 2113B becomes a second light flux L2B that is reference light used by the second displacement detecting unit 2005B. The second light flux L2B reflected by the second light flux dividing unit 2113B is emitted to the other side in the first direction X. Note that a light flux combining unit 50B and a reference mirror 14B of the second displacement detecting unit 2005B (described later) are arranged on the other side in the first direction X of the second light flux dividing unit 2113B. Thus, the second light flux L2B is emitted toward the light flux combining unit 50B and the reference mirror 14B of the second displacement detecting unit 2005B (described later). Also, light transmitted through the second light flux dividing unit 2113B enters the first light flux dividing unit 2113A.

A light flux reflected by the first light flux dividing unit 2113A becomes a second light flux L2A that is reference light used in the first displacement detecting unit 2005A. The second light flux L2A reflected by the first light flux dividing unit 2113A is emitted toward one side in the first direction X. Note that a light flux combining unit 50A and a reference mirror 14A of the first displacement detecting unit 2005A (described later) are arranged on the one side in the first direction X of the first light flux dividing unit 2113A. Thus, the second light flux L2A is emitted toward the light flux combining unit 50A and the reference mirror 14A of the first displacement detecting unit 2005A (described later). Also, a first light flux L1 transmitted through the first light flux dividing unit 2113A vertically enters a measured member 2, that is, an incident point P11 on the first diffraction grating 111.

The first light flux L1 that enters the incident point P11 on the first diffraction grating 111 is divided by the first diffraction grating 111 into two light fluxes L1A and L1B respectively having positive and negative orders in the first direction X. Here, diffracted light that is diffracted in a positive direction (one side) in a grating vector direction of the first diffraction grating 111 is diffracted light having a positive order, and diffracted light that is diffracted in a negative direction (other side) is diffracted light having a negative order. Then, the diffracted light having a positive order becomes object light used in the first displacement detecting unit 2005A, and the diffracted light having a negative order becomes object light used in the second displacement detecting unit 2005B.

A first light flux L1A having a positive order in the first light flux L1 diffracted by the first diffraction grating 111 enters a light flux parallel branch unit 40A of the first displacement detecting unit 2005A (described later). Also, a first light flux L1B having a negative order in the first light flux L1 diffracted by the first diffraction grating 111 enters a light flux parallel branch unit 40B of the second displacement detecting unit 2005B (described later).

The first displacement detecting unit 2005A includes a light receiving unit 7A, a second diffraction grating 12A, a reference mirror 14A, an object mirror 15A, a first phase plate 17A, a second phase plate 18A, a light flux parallel branch unit 40A, and a light flux combining unit 50A. The light receiving unit 7A is connected to a first relative positional information outputting unit 2004A of the relative positional information outputting means 2104. Then, the light receiving unit 7A transmits an acquired interference signal to the first relative positional information outputting unit 2004A.

The light flux parallel branch unit 40A of the first displacement detecting unit 2005A makes a first light flux L1A, which is reflected by the object mirror 15A and passes through the second diffraction grating 12A, enter an incident point P12A different from an incident point P11 that is a first incident position on the first diffraction grating 111. Note that the incident point P11 that is a first incident position and the incident point P12A that is a second emission position are placed in the first direction X on the measured member 2. Also, the light flux parallel branch unit 40A moves an outgoing optical path of the first light flux L1A from the incident point P11 to the light flux parallel branch unit 40A and an incoming optical path thereof from the light flux parallel branch unit 40A to the incident point P12A on the first diffraction grating 111 in parallel in the first direction X in such a manner that these paths do not become identical.

The first light flux L1A that enters the incident point P12A on the first diffraction grating 111 is diffracted by the first diffraction grating 111, superposed with the second light flux L2A by the light flux combining unit 50A, and enters the light receiving unit 7A. The light receiving unit 7A of the first displacement detecting unit 2005A acquires an interference signal expressed in the following expression 16. Here, A1 is amplitude of interference.

$$A1 \times \cos(2K1x + 2 \times B \times K2z + \delta) \quad \text{[Expression 16]}$$

The second displacement detecting unit 2005B includes a light receiving unit 7B, a second diffraction grating 12B, a reference mirror 14B, an object mirror 15B, a first phase plate 17B, a second phase plate 18B, a light flux parallel branch unit 40B, and a light flux combining unit 50B. The light receiving unit 7B is connected to a second relative positional information outputting unit 2004B of the relative positional information outputting means 2104. Then, the light receiving unit 7B transmits an acquired interference signal to the second relative positional information outputting unit 2004B.

Also, the second diffraction grating 12B, the reference mirror 14B, the object mirror 15B, the first phase plate 17B, the second phase plate 18B, the light flux parallel branch unit 40B, and the light flux combining unit 50B included in the second displacement detecting unit 2005B are arranged in a manner reversed in the first direction X from those of the first displacement detecting unit 2005A.

The light flux parallel branch unit 40B of the second displacement detecting unit 2005B makes a first light flux L1B, which is reflected by the object mirror 15B and passes through the second diffraction grating 12B, enter an incident point P12B different from an incident point P11 that is a first incident position on the first diffraction grating 111. Note that the incident point P11 that is a first incident position and the incident point P12B that is a second emission position are placed in the first direction X on the measured member 2. Also, the light flux parallel branch unit 40B moves an outgoing optical path of the first light flux L1B from the incident point P11 to the light flux parallel branch unit 40B and an incoming optical path thereof from the light flux parallel branch unit 40B to the incident point P12B on the first diffraction grating 111 in parallel in the first direction X in such a manner that these path do not become identical.

The first light flux L1B that enters the incident point P12B on the first diffraction grating 111 is diffracted by the first diffraction grating 111, superposed with the second light flux L2B by the light flux combining unit 50B, and enters the light receiving unit 7B. The light receiving unit 7B of the second displacement detecting unit 2005B acquires an interference signal expressed in the following expression 17. Here, A2 is amplitude of interference.

$$A2 \times \cos(-2K1x + 2 \times B \times K2z + \delta) \quad \text{[Expression 17]}$$

As expressed in the above expression 16 and expression 17, a positive/negative of displacement information in the first direction X in the interference signals acquired by the light receiving unit 7A of the first displacement detecting unit 2005A and the light receiving unit 7B of the second displacement detecting unit 2005B is different.

The relative positional information outputting means 2104 includes a first relative positional information outputting unit 2004A, a second relative positional information outputting unit 2004B, and an arithmetic unit. Also, since the relative positional information outputting means 2104 has a configuration similar to that of the relative positional information outputting means 104 according to the second embodiment, a description thereof is omitted. As described above, a positive/negative of displacement information in the first direction X in the interference signals acquired by the light receiving unit 7A of the first displacement detecting unit 2005A and the light receiving unit 7B of the second displacement detecting unit 2005B is different.

Thus, it is possible to extract only displacement information in the third direction Z by adding displacement information A from the first relative positional information outputting unit 2004A and displacement information B from the second relative positional information outputting unit 2004B. Also, it is possible to extract only displacement information in the first direction X by subtracting the displacement information B of the second relative positional information outputting unit 2004B from the displacement information A of the first relative positional information outputting unit 2004A.

Then, the arithmetic unit calculates displacement information of a relative position in the third direction Z of the head 2103 and the measured member 2 by adding the displacement information A from the first relative positional information outputting unit 2004A and the displacement information B from the second relative positional information outputting unit 2004B and dividing this by two. Also, the arithmetic unit calculates displacement information in the first direction X of the head 2103 and the measured member 2 by subtracting the displacement information B of the second relative positional information outputting unit 2004B from the displacement information A of the first relative positional information outputting unit 2004A and dividing this by two.

Thus, according to the displacement detecting device 2101 of the ninth embodiment, it is possible to output two-dimensional displacement information in the first direction X and the third direction Z similarly to the displacement detecting device 101 according to the second embodiment.

Since the other configurations are similar to those of the displacement detecting device 2001 according to the eighth embodiment, a description thereof is omitted. According to the displacement detecting device 2101 having such a configuration, it is also possible to acquire an effect similar to that of the displacement detecting device 2001 according to the eighth embodiment described above.

Moreover, according to the displacement detecting device 2101 of the ninth embodiment, diffracted light having a positive order in diffracted light diffracted by the first diffraction grating 111 is used in the first displacement detecting unit 2005A, and diffracted light having a negative order is used in the second displacement detecting unit 2005B. Accordingly, it is possible to increase output amplitude of an interference signal acquired by the relative positional information outputting means 2104.

10. Tenth Embodiment

Next, a displacement detecting device according to the tenth embodiment will be described with reference to FIG. 23 to FIG. 25.

Figure 23:
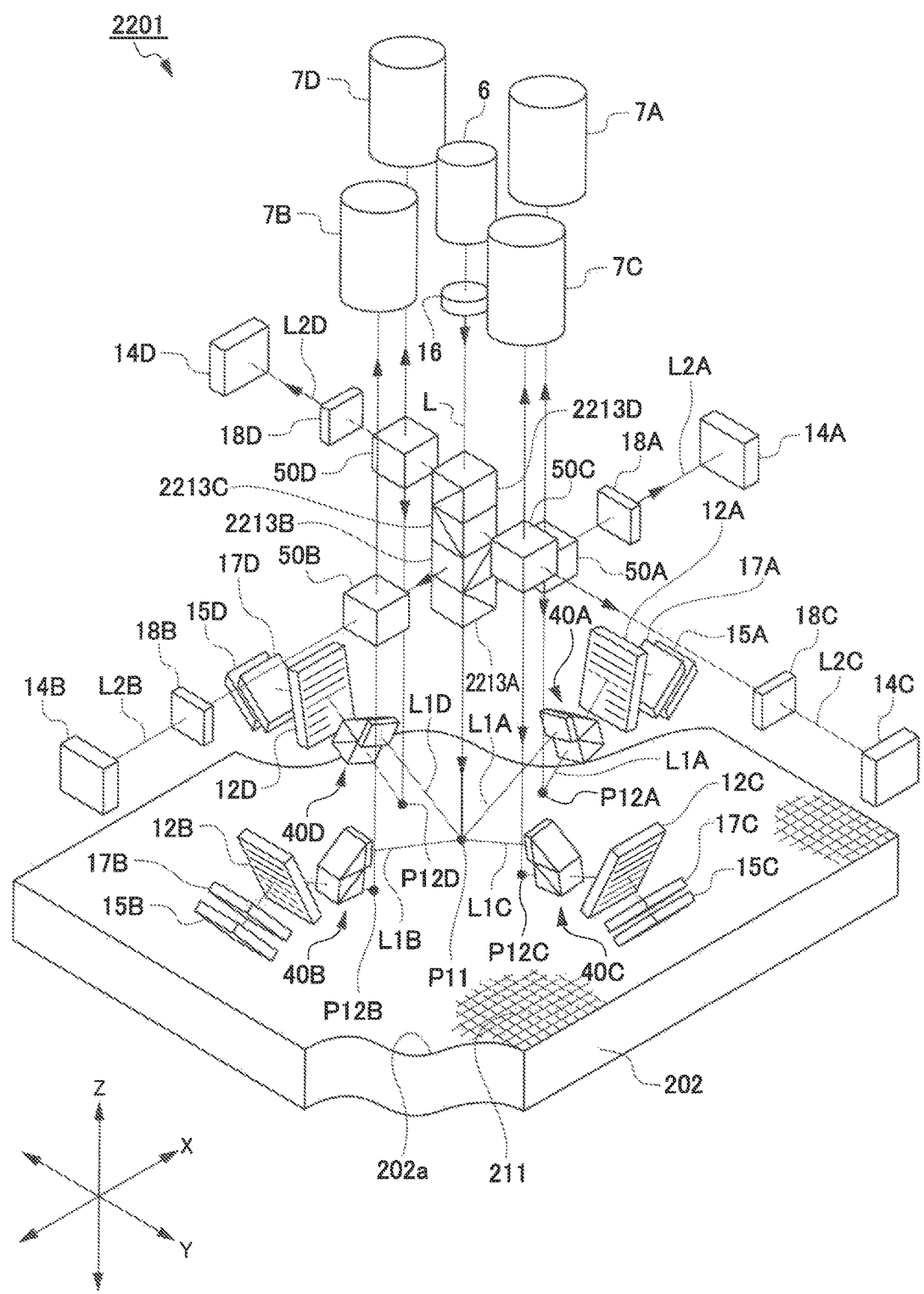
FIG. 23 is a schematic configuration view illustrating a configuration of a displacement detecting device according to a tenth embodiment of the present invention.

FIG. 23 is a schematic configuration view illustrating a configuration of the displacement detecting device according to the tenth embodiment. FIG. 24 is a schematic configuration view illustrating a configuration of a first displacement detecting unit and a second displacement detecting unit in the displacement detecting device according to the tenth embodiment. FIG. 25 is a schematic view illustrating a configuration of a third displacement detecting unit and a fourth displacement detecting unit in the displacement detecting device according to the tenth embodiment.

Similarly to the displacement detecting device 201 according to the third embodiment, a displacement detecting device 2201 according to the tenth embodiment is a displacement detecting device that can output three-dimensional displacement information in a first direction X, a third direction Z, and a second direction Y orthogonal to the first direction X and the third direction Z. Then, here, the same sign is assigned to a common part with the displacement detecting device 2001 according to the eighth embodiment, and an overlapped description is omitted.

Figure 24:
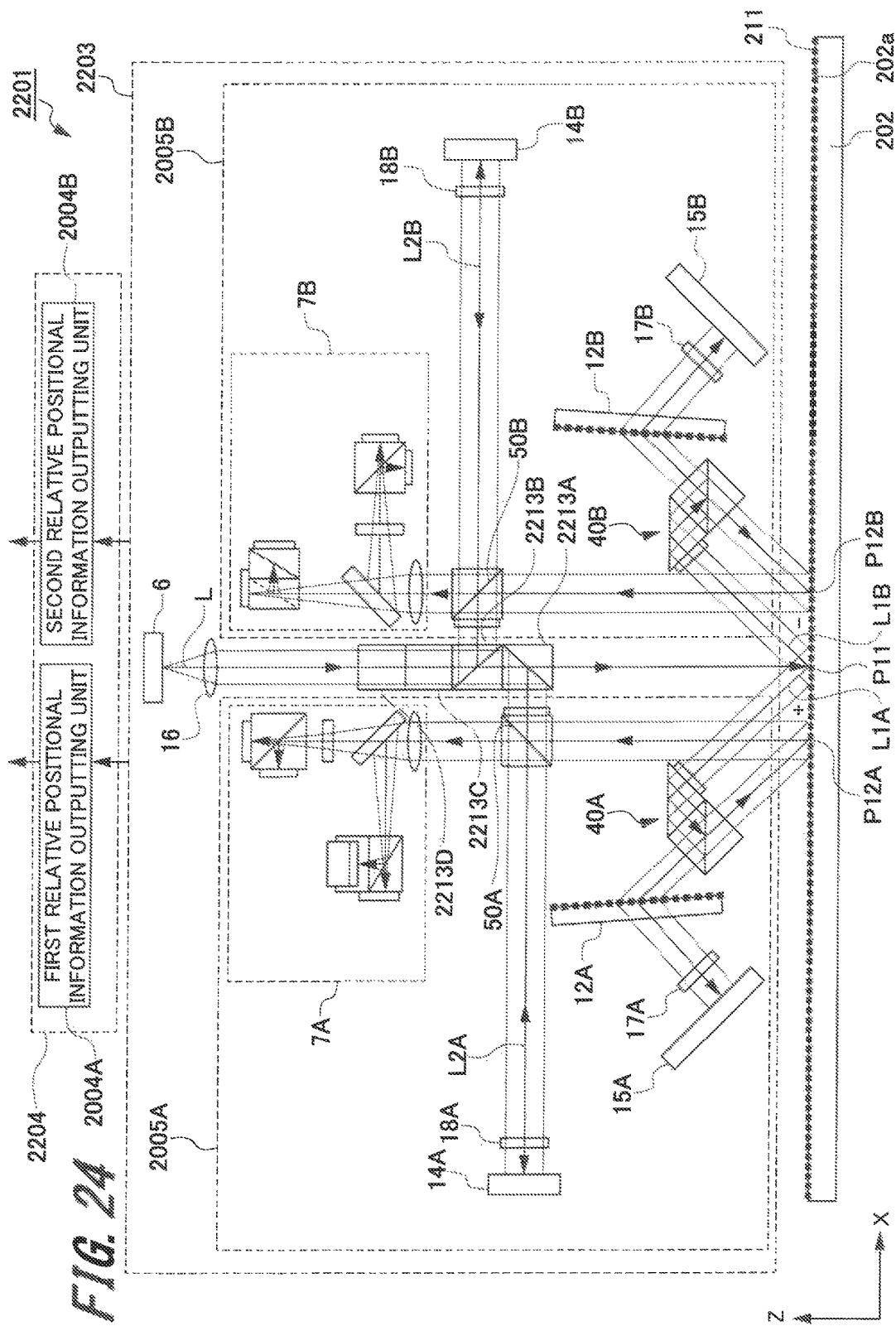
FIG. 24 is a schematic configuration view illustrating a configuration of a first displacement detecting unit and a second displacement detecting unit in the displacement detecting device according to the tenth embodiment of the present invention.
Figure 25:
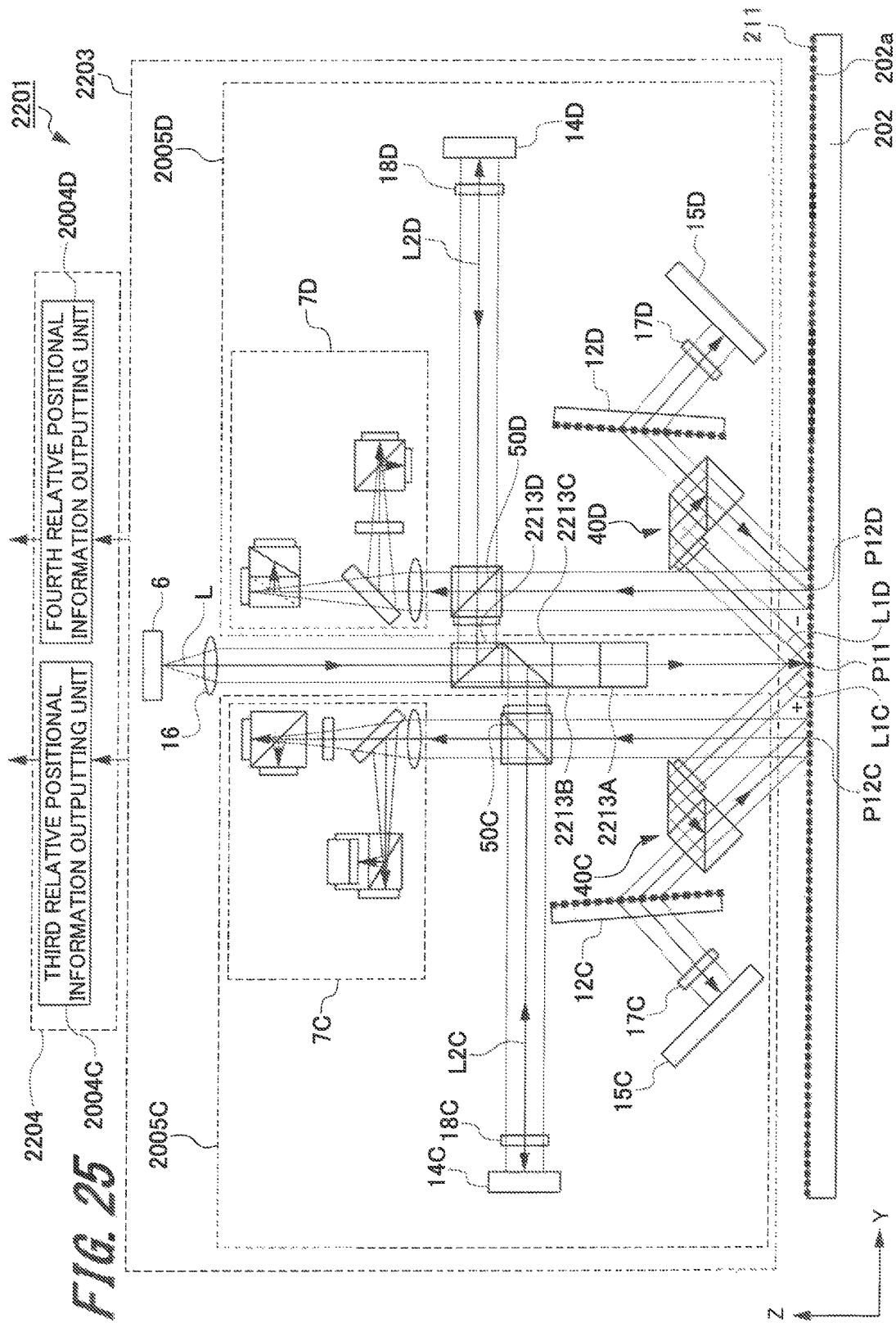
FIG. 25 is a schematic configuration view illustrating a configuration of a third displacement detecting unit and a fourth displacement detecting unit in the displacement detecting device according to the tenth embodiment of the present invention.

As illustrated in FIG. 23, FIG. 24, and FIG. 25, a displacement detecting device 2201 includes a measured member 202 in which a first diffraction grating 211 is provided, a head 2203, and a relative positional information outputting means 2204. The head 2203 and the measured member 202 are configured in a manner relatively movable in three directions that are a first direction X, a second direction Y, and a third direction Z.

Since the measured member 202 has a configuration similar to that of the measured member 202 according to the third embodiment, a description thereof is omitted here.

The head 2203 includes a first displacement detecting unit 2005A, a second displacement detecting unit 2005B, a third displacement detecting unit 2005C, a fourth displacement detecting unit 2005D, a light source 6, a lens 16, a first light flux dividing unit 2213A, a second light flux dividing unit 2213B, a third light flux dividing unit 2213C, and a fourth light flux dividing unit 2213D. The first displacement detecting unit 2005A is arranged on one side in the first direction X of the head 2203 and the second displacement detecting unit 2005B is arranged on the other side in the first direction X of the head 2203. Also, the third displacement detecting unit 2005C is arranged on one side in the second direction Y of the head 2203 and the fourth displacement detecting unit 2005D is arranged on the other side in the second direction Y of the head 2203.

The light source 6, the lens 16, the first light flux dividing unit 2213A, the second light flux dividing unit 2213B, the third light flux dividing unit 2213C, and the fourth light flux dividing unit 2213D are arranged between the first displacement detecting unit 2005A, the second displacement detecting unit 2005B, the third displacement detecting unit 2005C, and the fourth displacement detecting unit 2005D. That is, the light source 6, the lens 16, the first light flux dividing unit 2213A, the second light flux dividing unit 2213B, the third light flux dividing unit 2213C, and the fourth light flux dividing unit 2213D are arranged in a center part in the first direction X and the second direction Y in the head 2203.

Each of the first light flux dividing unit 2213A, the second light flux dividing unit 2213B, the third light flux dividing unit 2213C, and the fourth light flux dividing unit 2213D includes a semitransparent mirror or a beam splitter. Each of the first light flux dividing unit 2213A, the second light flux dividing unit 2213B, the third light flux dividing unit 2213C, and the fourth light flux dividing unit 2213D divides incident light into two that are reflected light and transmitted light.

The first light flux dividing unit 2213A, the second light flux dividing unit 2213B, the third light flux dividing unit 2213C, and the fourth light flux dividing unit 2213D are arranged in order of the first light flux dividing unit 2213A, the second light flux dividing unit 2213B, the third light flux dividing unit 2213C, and the fourth light flux dividing unit 2213D from a side of the measured member 202 in the third direction Z. That is, the fourth light flux dividing unit 2213D is arranged on a side of the light source 6.

Light L emitted from the light source 6 enters the fourth light flux dividing unit 2213D. A light flux reflected by the fourth light flux dividing unit 2213D becomes a second light flux L2D that is reference light used in the fourth displacement detecting unit 2005D. The second light flux L2D reflected by the fourth light flux dividing unit 2213D is emitted toward the other side in the second direction Y. Note that a light flux combining unit 50D and a reference mirror 14D of the fourth displacement detecting unit 2005D (described later) are arranged on the other side in the second direction Y in the fourth light flux dividing unit 2213D. Thus, the second light flux L2D is emitted toward the light flux combining unit 50D and the reference mirror 14D of the fourth displacement detecting unit 2005D (described later). Also, light transmitted through the fourth light flux dividing unit 2213D enters the third light flux dividing unit 2213C.

A light flux reflected by the third light flux dividing unit 2213C becomes a second light flux L2C that is reference light used in the third displacement detecting unit 2005C. The second light flux L2C reflected by the third light flux dividing unit 2213C is emitted toward the one side in the second direction Y. Note that a light flux combining unit 50C and a reference mirror 14C of the third displacement detecting unit 2005C (described later) are arranged on the one side in the second direction Y in the third light flux dividing unit 2213C. Thus, the second light flux L2C is emitted toward the light flux combining unit 50C and the reference mirror 14C of the third displacement detecting unit 2005C (described later). Also, light transmitted through the third light flux dividing unit 2213C enters the second light flux dividing unit 2213B.

A light flux reflected by the second light flux dividing unit 2213B becomes a second light flux L2B that is reference light used in the second displacement detecting unit 2005B. The second light flux L2B reflected by the second light flux dividing unit 2213B is emitted toward the other side in the first direction X. Note that a light flux combining unit 50B and a reference mirror 14B of the second displacement detecting unit 2005B (described later) are arranged on the other side in the first direction X of the second light flux dividing unit 2213B. Thus, the second light flux L2B is emitted toward the light flux combining unit 50B and the reference mirror 14B of the second displacement detecting unit 2005B (described later). Also, light transmitted through the second light flux dividing unit 2213B enters the first light flux dividing unit 2213A.

A light flux reflected by the first light flux dividing unit 2213A becomes a second light flux L2A that is reference light used in the first displacement detecting unit 2005A. The second light flux L2A reflected by the first light flux dividing unit 2213A is emitted toward the one side in the first direction X. Note that a light flux combining unit 50A and a reference mirror 14A of the first displacement detecting unit 2005A (described later) are arranged on the one side in the first direction X of the first light flux dividing unit 2213A. Thus, the second light flux L2A is emitted toward the light flux combining unit 50A and the reference mirror 14A of the first displacement detecting unit 2005A (described later). Also, a first light flux L1 transmitted through the first light flux dividing unit 2213A vertically enters the measured member 202, that is, an incident point P11 on the first diffraction grating 211.

The first light flux L1 that enters the incident point P11 on the first diffraction grating 211 is divided by the first diffraction grating 211 into two light fluxes L1A and L1B respectively having positive and negative orders in the first direction X and two light fluxes L1C and L1D respectively having positive and negative orders in the second direction Y. Here, diffracted light that is diffracted in a positive direction (one side) in a first grating vector direction of the first diffraction grating 211 is diffracted light having a positive order in the first direction X, and diffracted light that is diffracted in a negative direction (other side) is diffracted light having a negative order in the first direction X. Then, the diffracted light having the positive order in the first direction X becomes object light used in the first displacement detecting unit 2005A, and the diffracted light having the negative order in the first direction X becomes object light used in the second displacement detecting unit 2005B.

Also, diffracted light that is diffracted in a positive direction (one side) in a second grating vector direction of the first diffraction grating 211 is diffracted light having a positive order in the second direction Y, and diffracted light that is diffracted in a negative direction (other side) is diffracted light having a negative order in the second direction Y. Then, the diffracted light having the positive order in the second direction Y becomes object light used in the third displacement detecting unit 2005C, and the diffracted light having the negative order in the second direction Y becomes object light used in the fourth displacement detecting unit 2005D.

A first light flux L1A having a positive order in the first direction X in the first light flux L1 diffracted by the first diffraction grating 211 enters a light flux parallel branch unit 40A of the first displacement detecting unit 2005A. Also, a first light flux L1B having a negative order in the first direction X in the first light flux L1 diffracted by the first diffraction grating 211 enters a light flux parallel branch unit 40B of the second displacement detecting unit 2005B. Moreover, a first light flux L1C having a positive order in the second direction Yin the first light flux L1 diffracted by the first diffraction grating 211 enters a light flux parallel branch unit 40C of the third displacement detecting unit 2005C (described later). Also, a first light flux L1D having a negative order in the second direction Yin the first light flux L1 diffracted by the first diffraction grating 211 enters a light flux parallel branch unit 40D of the fourth displacement detecting unit 2005D.

Note that since the first displacement detecting unit 2005A and the second displacement detecting unit 2005B respectively have configurations similar to those of the first displacement detecting unit 2005A and the second displacement detecting unit 2005B according to the ninth embodiment, a description thereof is omitted.

Note that a light receiving unit 7A of the first displacement detecting unit 2005A acquires an interference signal expressed in the following expression 18. Here, A1 is amplitude of interference.

$$A1 \times \cos(2K1x + 2 \times B \times K2z + \delta) \qquad \text{[Expression 18]}$$

Also, a light receiving unit 7B of the second displacement detecting unit 2005B acquires an interference signal expressed in the following expression 19. Here, A2 is amplitude of interference.

$$A2 \times \cos(-2K1x + 2 \times B \times K2z + \delta) \qquad \text{[Expression 19]}$$

The third displacement detecting unit 2005C includes a light receiving unit 7C, a second diffraction grating 12C, a reference mirror 14C, an object mirror 15C, a first phase plate 17C, a second phase plate 18C, a light flux parallel branch unit 40C, and a light flux combining unit 50C. Also, a grating vector direction of the second diffraction grating 12C is on a plane formed by the second direction Y and the third direction Z. The light receiving unit 7C is connected to a third relative positional information outputting unit 2004C of the relative positional information outputting means 2204. Then, the light receiving unit 7C transmits an acquired interference signal to the third relative positional information outputting unit 2004C.

The light flux parallel branch unit 40C of the third displacement detecting unit 2005C makes a first light flux L1C, which is reflected by the object mirror 15C and passes through the second diffraction grating 12C, enter an incident point P12C different from an incident point P11 that is a first incident position on the first diffraction grating 211. Note that the incident point P11 that is a first incident position and the incident point P12C that is a second emission position are placed in the second direction Y on the measured member 202. Also, the light flux parallel branch unit 40C moves an outgoing optical path of the first light flux L1C from the incident point P11 to the light flux parallel branch unit 40C and an incoming optical path thereof from the light flux parallel branch unit 40C to the incident point P12C on the first diffraction grating 211 in parallel in the second direction Y in such a manner that these paths do not become identical.

The first light flux L1C that enters the incident point P12C on the first diffraction grating 211 is diffracted by the first diffraction grating 211, superposed with a second light flux L2C by the light flux combining unit 50C, and enters the light receiving unit 7C. The light receiving unit 7C of the third displacement detecting unit 2005C acquires an interference signal expressed in the following expression 20. Here, A3 is amplitude of interference. y indicates a movement amount of the first diffraction grating 211, that is, a relative displacement amount in the second direction Y of the head 2203 and the measured member 202.

$$A3 \times \cos(2K1y + 2 \times B \times K2z + \delta) \qquad \text{[Expression 20]}$$

The fourth displacement detecting unit 2005D includes a light receiving unit 7D, a second diffraction grating 12D, a reference mirror 14D, an object mirror 15D, a first phase plate 17D, a second phase plate 18D, a light flux parallel branch unit 40D, and a light flux combining unit 50D. Also, a grating vector direction of the second diffraction grating 12D is on a plane formed by the second direction Y and the third direction Z. The light receiving unit 7D is connected to a fourth relative positional information outputting unit 2004D of the relative positional information outputting means 2204. Then, the light receiving unit 7D transmits an acquired interference signal to the fourth relative positional information outputting unit 2004D.

Also, the second diffraction grating 12D, the reference mirror 14D, the object mirror 15D, the first phase plate 17D, the second phase plate 18D, the light flux parallel branch unit 40D, and the light flux combining unit 50D that are included in the fourth displacement detecting unit 2005D are arranged in a manner reversed in the second direction Y from those of the third displacement detecting unit 2005C.

The light flux parallel branch unit 40D of the fourth displacement detecting unit 2005D makes a first light flux L1D, which is reflected by the object mirror 15D and passes through the second diffraction grating 12D, enter an incident point P12D different from an incident point P11 that is a first incident position on the first diffraction grating 211. Note that the incident point P11 that is a first incident position and the incident point P12D that is a second emission position are placed in the second direction Y on the measured member 202. Also, the light flux parallel branch unit 40D moves an outgoing optical path of the first light flux L1D from the incident point P11 to the light flux parallel branch unit 40D and an incoming optical path thereof from the light flux parallel branch unit 40D to the incident point P12D on the first diffraction grating 211 in parallel in the second direction Y in such a manner that these paths do not become identical.

The first light flux L1D that enters the incident point P12D on the first diffraction grating 211 is diffracted by the first diffraction grating 211, superposed with a second light flux L2D by the light flux combining unit 50D, and enters the light receiving unit 7D. The light receiving unit 7D of the fourth displacement detecting unit 2005D acquires an interference signal expressed in the following expression 21. Here, A4 is amplitude of interference.

$$A4 \times \cos(-2K1y + 2 \times B \times K2z + \delta) \quad \text{[Expression 21]}$$

The relative positional information outputting means 2204 includes a first relative positional information outputting unit 2004A, a second relative positional information outputting unit 2004B, a third relative positional information outputting unit 2004C, a fourth relative positional information outputting unit 2004D, and an arithmetic unit. Since the relative positional information outputting means 2204 has a configuration similar to that of the relative positional information outputting means 204 according to the third embodiment, a description thereof is omitted.

As described above, a positive/negative of displacement information in the first direction X in the interference signals acquired by the light receiving unit 7A of the first displacement detecting unit 2005A and the light receiving unit 7B of the second displacement detecting unit 2005B is different. Also, a positive/negative of displacement information in the second direction Y in the interference signals acquired by the light receiving unit 7C of the third displacement detecting unit 2005C and the light receiving unit 7D of the fourth displacement detecting unit 2005D is different.

Thus, it is possible to extract only displacement information in the first direction X by subtracting displacement information B of the second relative positional information outputting unit 2004B from displacement information A of the first relative positional information outputting unit 2004A. Also, it is possible to extract only displacement information in the second direction Y by subtracting displacement information D of the fourth relative positional information outputting unit 2004D from displacement information C of the third relative positional information outputting unit 2004C. Then, it is possible to extract only displacement information in the third direction Z by adding the displacement information A, B, C, and D of all of the first relative positional information outputting unit 2004A, the second relative positional information outputting unit 2004B, the third relative positional information outputting unit 2004C, and the fourth relative positional information outputting unit 2004D.

Then, the arithmetic unit calculates displacement information of a relative position in the third direction Z of the head 2203 and the measured member 202 by adding the displacement information A, B, C, and D of all of the first relative positional information outputting unit 2004A, the second relative positional information outputting unit 2004B, the third relative positional information outputting unit 2004C, and the fourth relative positional information outputting unit 2004D and dividing this by four.

Also, the arithmetic unit calculates displacement information in the first direction X of the head 2203 and the measured member 202 by subtracting the displacement information B of the second relative positional information outputting unit 2004B from the displacement information A of the first relative positional information outputting unit 2004A and dividing this by two. The arithmetic unit calculates displacement information in the second direction Y of the head 2203 and the measured member 202 by subtracting the displacement information D of the fourth relative positional information outputting unit 2004D from the displacement information C of the third relative positional information outputting unit 2004C and dividing this by two.

Thus, according to the displacement detecting device 2201 of the tenth embodiment, it is possible to output three-dimensional displacement information in the first direction X, the second direction Y, and the third direction Z.

Since the other configurations are similar to those of the displacement detecting device 2001 according to the eighth embodiment, a description thereof is omitted. According to the displacement detecting device 2201 having such a configuration, it is also possible to acquire an effect similar to that of the displacement detecting device 2001 according to the eighth embodiment described above.

Also, in the tenth embodiment, an example in which the first grating vector direction and the second grating vector direction of the first diffraction grating 211 are orthogonal to each other has been described. However, this is not the limitation. A first grating vector direction and a second grating vector direction may not be orthogonal to each other and only need to intersect with each other on a measured surface 202a of the measured member 202. Then, the first displacement detecting unit 2005A and the second displacement detecting unit 2005B are arranged in the first grating vector direction, and the third displacement detecting unit 2005C and the fourth displacement detecting unit 2005D are arranged in the second grating vector direction.

Moreover, according to the displacement detecting device 2201 of the tenth embodiment, not only diffracted light having a positive order in the first direction X in diffracted light, which is diffracted by the first diffraction grating 211, but also diffracted light having a negative order in the first direction X are used. Moreover, diffracted light having a positive order and diffracted light having a negative order in the second direction Y are used. Accordingly, it is possible to increase output amplitude of an interference signal acquired by the relative positional information outputting means 2204.

11. Eleventh Embodiment

Next, a displacement detecting device according to the eleventh embodiment will be described with reference to FIG. 26 and FIG. 27.

Figure 26:
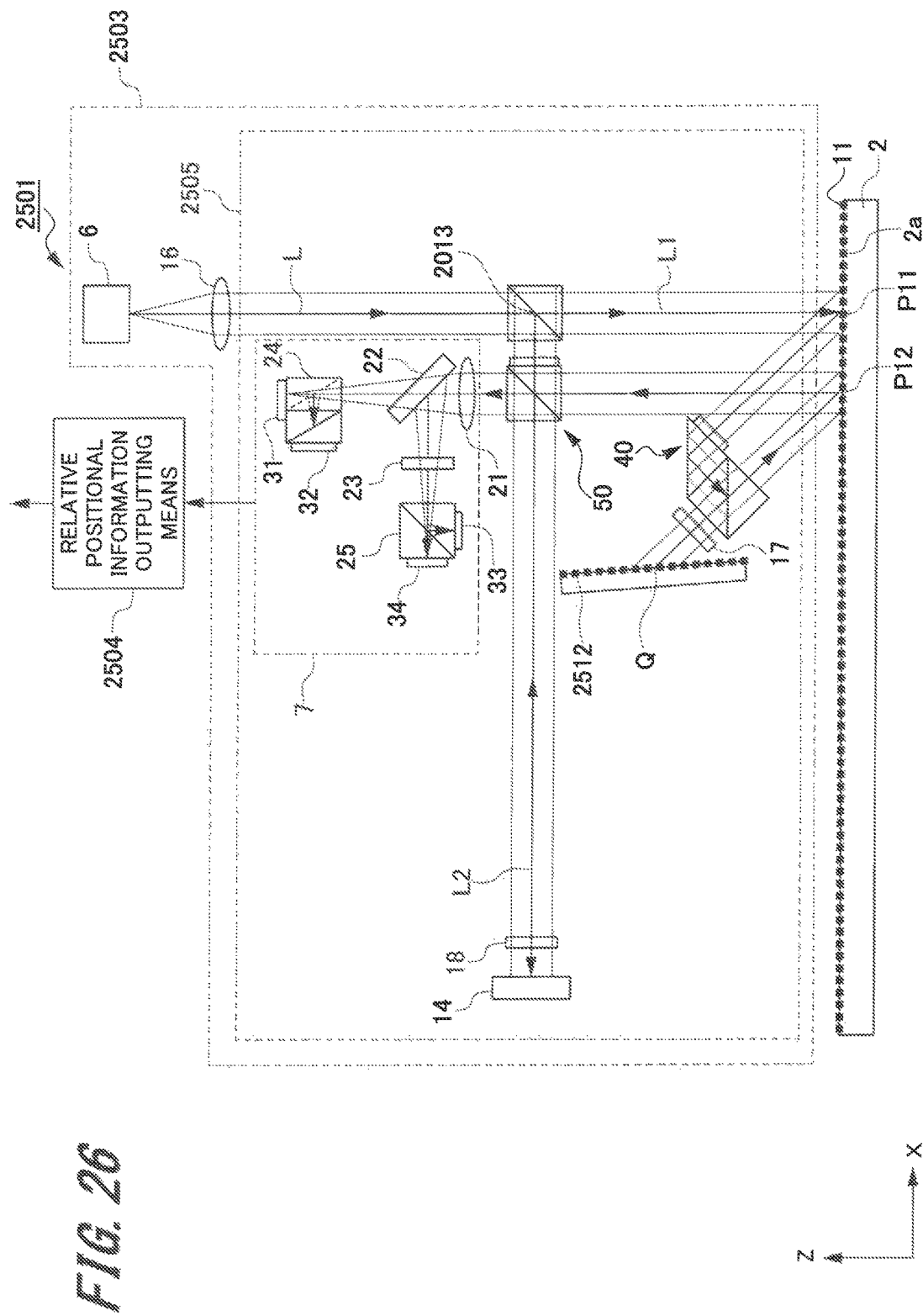
FIG. 26 is a schematic configuration view illustrating a configuration of a displacement detecting device according to an eleventh embodiment of the present invention.
Figure 27:
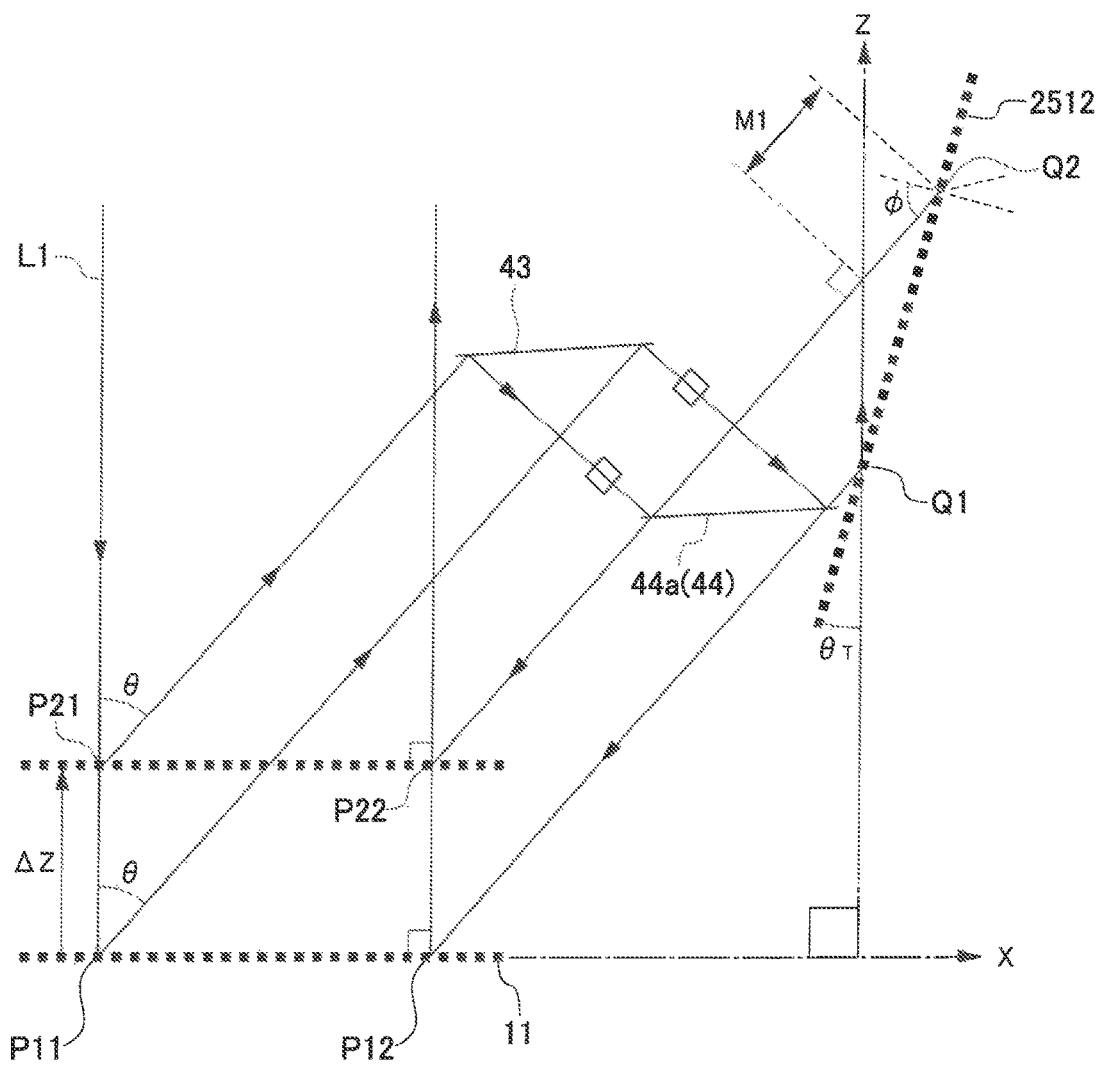
FIG. 27 is a view for describing a relationship between incident angles and diffraction angles of a first diffraction grating and a second diffraction grating in the displacement detecting device according to the eleventh embodiment of the present invention.

FIG. 26 is a schematic configuration view illustrating a configuration of the displacement detecting device according to the eleventh embodiment, and FIG. 27 is a view for describing a relationship between incident angles and diffraction angles of a first diffraction grating and a second diffraction grating in the displacement detecting device according to the eleventh embodiment.

Similarly to the displacement detecting device 501 according to the sixth embodiment, a reflection-type diffraction grating is used as a second diffraction grating in a displacement detecting device 2501 according to the eleventh embodiment. Then, the displacement detecting device 2501 according to the eleventh embodiment is different from the displacement detecting device 2001 according to the eighth embodiment in a point that a reflection-type diffraction grating is used as a second diffraction grating. Thus, here, the same sign is assigned to a common part with the displacement detecting device 2001 according to the eighth embodiment, and an overlapped description is omitted.

As illustrated in FIG. 26, the displacement detecting device 2501 includes a head 2503, a measured member 2 in which a first diffraction grating 11 is provided, and a relative positional information outputting means 2504. The head 2503 includes a displacement detecting unit 2505, a light source 6, and a light receiving unit 7 provided in the displacement detecting unit 2505.

Also, the displacement detecting unit 2505 includes a second diffraction grating 2512, a light flux dividing unit 2013, a first phase plate 17, a second phase plate 18, a reference mirror 14, a light flux parallel branch unit 40, and a light flux combining unit 50. Note that since the light flux dividing unit 2013, the reference mirror 14, the first phase plate 17, the second phase plate 18, the light flux parallel branch unit 40, and the light flux combining unit 50 have configurations similar to those of the displacement detecting device 2001 according to the eighth embodiment, a description thereof is omitted. Note that the first phase plate 17 is arranged between the light flux parallel branch unit 40 and the second diffraction grating 2512.

The second diffraction grating 2512 is a reflection-type diffraction grating that reflects and diffracts an incident first light flux L1. Then, the second diffraction grating 2512 reflects and diffracts a first light flux L1, which is diffracted by the first diffraction grating 11, toward the first diffraction grating 11 through the light flux parallel branch unit 40 again. Thus, in the displacement detecting device 2501 according to the eleventh embodiment, the second diffraction grating 2512 functions as an object light reflecting member. As a result, it becomes unnecessary to newly provide a mirror, a prism, or the like as an object light reflecting member and it is possible to reduce the number of components.

Next, a relationship between a diffraction angle θ of the first diffraction grating 11, and an incident angle φ and a diffraction angle φ of the second diffraction grating 2512 will be described with reference to FIG. 27.

As illustrated in FIG. 27, when the first diffraction grating 11 is moved for a length ΔZ to an upper side in a third direction Z, that is, in a direction of getting closer to the head, a position where the first light flux L1 enters the first diffraction grating 11 is changed from an incident point P11 to an incident point P21. Thus, at a time point at which the first light flux L1 enters the first diffraction grating 11, an optical path length of the first light flux L1 becomes short for a length ΔM.

Also, when the first diffraction grating 11 is moved for the length ΔZ to the upper side in the third direction Z, that is, in the direction of getting closer to the head, a position where the first light flux L1 enters the second diffraction grating 2512 is changed from an incident point Q1 to an incident point Q2. Then, an optical path length from the incident point P21 on the first diffraction grating 11 to the incident point Q2 on the second diffraction grating 2512 through the light flux parallel branch unit 40 becomes longer for a length M1 than an optical path length from the incident point P11 on the first diffraction grating 11 to the incident point Q1 on the second diffraction grating 2512 through the light flux parallel branch unit 40 of when the first diffraction grating 11 is not moved in the third direction Z.

Thus, when ΔM=M1 is satisfied, an optical path length of the first light flux L1 becomes constant even in a case where the first diffraction grating 11 is moved in the third direction Z. Accordingly, it is possible to make the optical path length of the first light flux L1 constant even when the first diffraction grating 11 is moved in the third direction Z.

Since the other configurations are similar to those of the displacement detecting device 2001 according to the eighth embodiment, a description thereof is omitted. According to the displacement detecting device 2501 having such a configuration, it is also possible to acquire an effect similar to that of the displacement detecting device 2001 according to the eighth embodiment described above.

12. Twelfth Embodiment

Next, a displacement detecting device according to the twelfth embodiment will be described with reference to FIG. 28 and FIG. 29.

Figure 28:
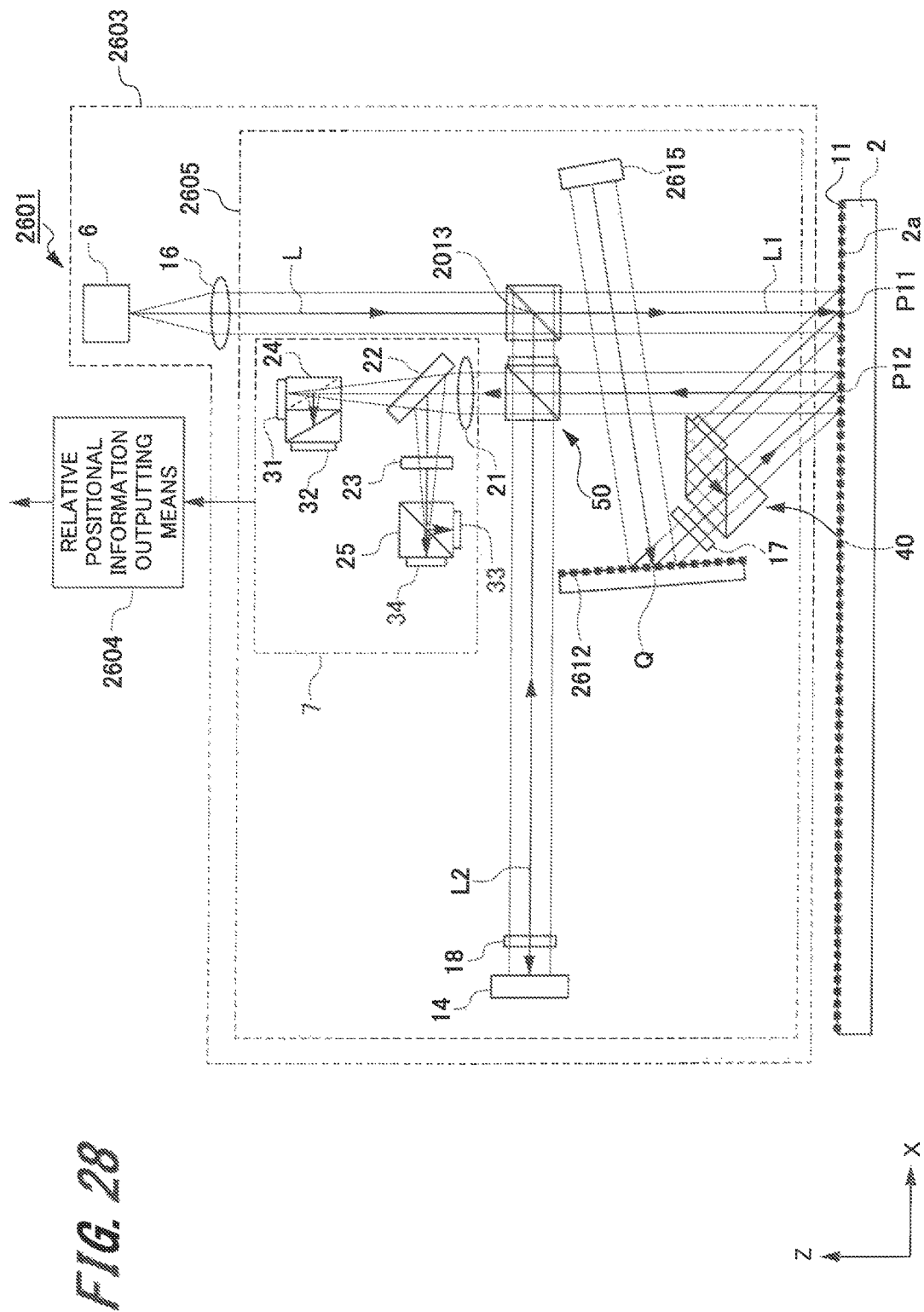
FIG. 28 is a schematic configuration view illustrating a configuration of a displacement detecting device according to a twelfth embodiment of the present invention.
Figure 29:
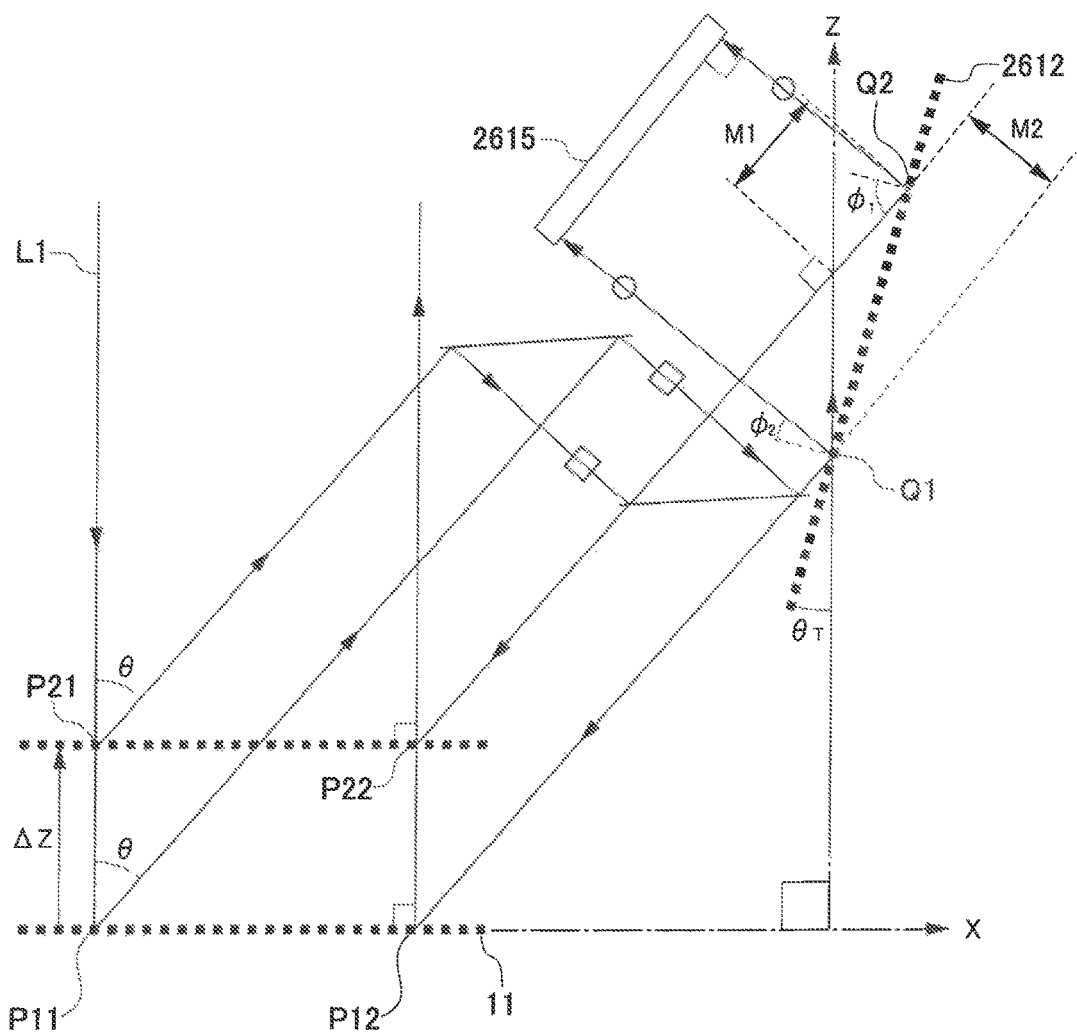
FIG. 29 is a view for describing a relationship between incident angles and diffraction angles of a first diffraction grating and a second diffraction grating in the displacement detecting device according to the twelfth embodiment of the present invention.

FIG. 28 is a schematic configuration view illustrating a configuration of the displacement detecting device according to the twelfth embodiment, and FIG. 29 is a view for describing a relationship between incident angles and diffraction angles of a first diffraction grating and a second diffraction grating in the displacement detecting device according to the twelfth embodiment.

Similarly to the displacement detecting device 2501 according to the eleventh embodiment, a reflection-type diffraction grating is used as a second diffraction grating in a displacement detecting device 2601 according to the twelfth embodiment. Thus, here, the same sign is assigned to a common part with the displacement detecting device 2001 according to the eighth embodiment, and an overlapped description is omitted.

As illustrated in FIG. 28, the displacement detecting device 2601 includes a head 2603, a measured member 2 in which a first diffraction grating 11 is provided, and a relative positional information outputting means 2604. The head 2603 includes a displacement detecting unit 2605, a light source 6, and a light receiving unit 7 provided in the displacement detecting unit 2605.

Also, the displacement detecting unit 2605 includes a second diffraction grating 2612, a light flux dividing unit 2013, a first phase plate 17, a second phase plate 18, a reference mirror 14, a light flux parallel branch unit 40, a light flux combining unit 50, and an object mirror 2615. Note that since the light flux dividing unit 2013, the reference mirror 14, the first phase plate 17, the second phase plate 18, the light flux parallel branch unit 40, and the light flux combining unit 50 have configurations similar to those of the displacement detecting device 2001 according to the eighth embodiment, a description thereof is omitted. Note that the first phase plate 17 is arranged between the light flux parallel branch unit 40 and the second diffraction grating 2612 or between the second diffraction grating 2612 and the object mirror 2615.

The second diffraction grating 2612 is a reflection-type diffraction grating that reflects and diffracts an incident first light flux L1. Then, the second diffraction grating 2612 reflects and diffracts the first light flux L1, which is diffracted by the first diffraction grating 11, toward the object mirror 2615. The object mirror 2615 reflects the incident first light flux L1 toward the second diffraction grating 2612 again.

In the displacement detecting device 2601 according to the twelfth embodiment, the object mirror 2615 is added to the displacement detecting device 2501 according to the eleventh embodiment. However, by providing the object mirror 2615, it is possible to easily perform operation of making an optical path length of a first light flux L1 and an optical path length of a second light flux L2 identical.

Next, a relationship between a diffraction angle θ of the first diffraction grating 11, and an incident angle $\varphi_1$ and a diffraction angle $\varphi_2$ of the second diffraction grating 2612 will be described with reference to FIG. 29.

As illustrated in FIG. 29, when the first diffraction grating 11 is moved for a length ΔZ to an upper side in a third direction Z, that is, in a direction of getting closer to the head, a position where the first light flux L1 enters the first diffraction grating 11 is changed from an incident point P11 to an incident point P21. Thus, at a time point at which the first light flux L1 enters the first diffraction grating 11, an optical path length of the first light flux L1 becomes short for a length ΔM.

Also, when the first diffraction grating 11 is moved for the length ΔZ to the upper side in the third direction Z, that is, in the direction of getting closer to the head, a position where the first light flux L1 enters the second diffraction grating 2612 is changed from an incident point Q1 to an incident point Q2. Then, an optical path length from the incident point P21 on the first diffraction grating 11 to the incident point Q2 on the second diffraction grating 2612 through the light flux parallel branch unit 40 becomes longer for a length M1 than an optical path length from the incident point P11 on the first diffraction grating 11 to the incident point Q1 on the second diffraction grating 2612 through the light flux parallel branch unit 40 of when the first diffraction grating 11 is not moved in the third direction Z. Moreover, a distance from the incident point Q2 on the second diffraction grating 2612 to the object mirror 2615 becomes longer for a length M2 than an optical path length from the incident point Q1 on the second diffraction grating 2612 to the object mirror 2615 of when the first diffraction grating 11 is not moved in the third direction Z.

Thus, when ΔZ=M1+M2 is satisfied, an optical path length of the first light flux L1 becomes constant even in a case where the first diffraction grating 11 is moved in the third direction Z. Also, a condition satisfying ΔZ=M1+M2 becomes a condition expressed in the following expression 22 from the diffraction angle θ of the first diffraction grating 11, the incident angle $\varphi_1$ to the second diffraction grating 2612, and the diffraction angle $\varphi_2$ of the second diffraction grating 2612.

$$-\cos(\varphi_1+\theta)/\cos \varphi_1+\{\sin(\varphi_1+\theta)-\cos(\varphi_1+\theta)\tan \varphi_1\} \sin \varphi_2=1 \quad \text{[Expression 22]}$$

Thus, each of the diffraction angle θ of the first diffraction grating 11 and the diffraction angle $\varphi_2$ of the second diffraction grating 2612 is set to be a value satisfying the above expression 22. Accordingly, it is possible to make the optical path length of the first light flux L1 constant even when the first diffraction grating 11 is moved in the third direction Z. Also, in a case where the second diffraction grating 2612 satisfies the Bragg condition, $\varphi_1=\varphi_2$ and the above expression 22 is transformed into the above expression 15.

Note that as each of the second diffraction grating 2512 according to the eleventh embodiment and the second diffraction grating 2612 according to the twelfth embodiment, for example, a so-called blazed grating in which a sectional shape of a groove is formed in a serrated shape is preferably used. With this arrangement, it is possible to improve diffraction efficiency with respect to a specific wavelength.

Since the other configurations are similar to those of the displacement detecting device 2001 according to the eighth embodiment, a description thereof is omitted. According to the displacement detecting device 2601 having such a configuration, it is also possible to acquire an effect similar to that of the displacement detecting device 2001 according to the eighth embodiment described above.

13. Thirteenth Embodiment

Next, a displacement detecting device according to the thirteenth embodiment will be described with reference to FIG. 30.

Figure 30:
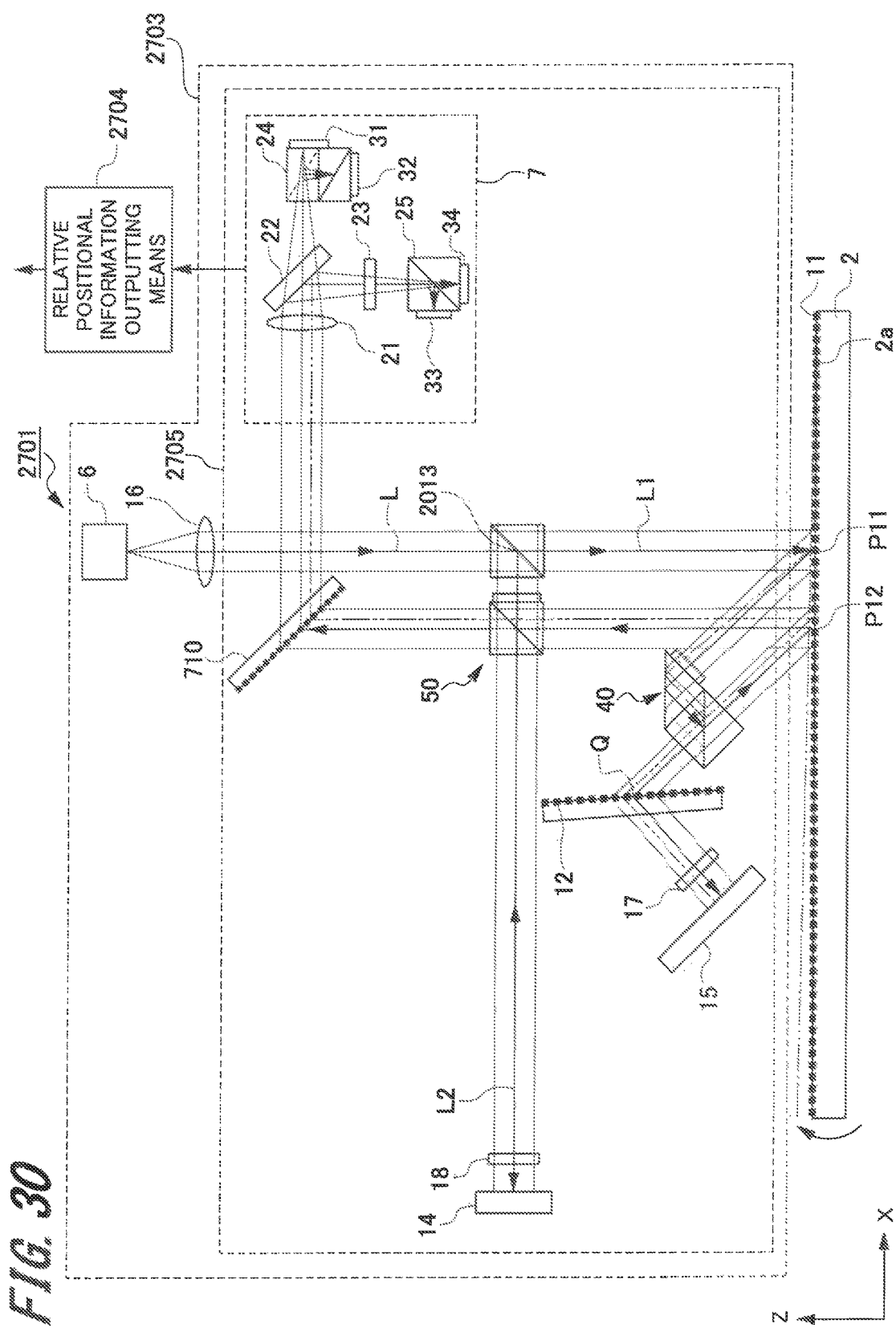
FIG. 30 is a schematic configuration view illustrating a configuration of a displacement detecting device according to a thirteenth embodiment of the present invention.

FIG. 30 is a schematic configuration view illustrating a configuration of the displacement detecting device according to the thirteenth embodiment.

A displacement detecting device 2701 according to the thirteenth embodiment is the displacement detecting device 2001 according to the eighth embodiment to which device an optical path correction member is provided. Thus, the same sign is assigned to a common part with the displacement detecting device 2001 according to the eighth embodiment, and an overlapped description is omitted.

As illustrated in FIG. 30, the displacement detecting device 2701 includes a head 2703, a measured member 2 in which a first diffraction grating 11 is provided, and a relative positional information outputting means 2704. The head 2703 includes a displacement detecting unit 2705, a light source 6, and a light receiving unit 7 provided in the displacement detecting unit 2705.

Also, the displacement detecting unit 2705 includes a second diffraction grating 12, a light flux dividing unit 2013, a reference mirror 14, an object mirror 15, a first phase plate 17, a second phase plate 18, a light flux parallel branch unit 40, a light flux combining unit 50, a correction diffraction grating 710 indicating an optical path correction member. Note that since the second diffraction grating 12, the light flux dividing unit 2013, the reference mirror 14, the object mirror 15, the first phase plate 17, the second phase plate 18, the light flux parallel branch unit 40, and the light flux combining unit 50 have configurations similar to those of the displacement detecting device 2001 according to the eighth embodiment, a description thereof is omitted.

The correction diffraction grating 710 is arranged between the light flux combining unit 50 and the light receiving unit 7. The correction diffraction grating 710 is a transmission-type diffraction grating that transmits light and diffracts the transmitted light. The correction diffraction grating 710 diffracts a first light flux L1 and a second light flux L2 that pass through the light flux combining unit 50 and that are superposed with each other by the light flux combining unit 50, and makes these enter the light receiving unit 7. The second diffraction grating 12 is arranged in such a manner that a plane thereof is inclined in the third direction Z. A grating vector direction of the correction diffraction grating 710 is on a plane formed by a first direction X and a third direction Z.

As illustrated in FIG. 30, in a case where the first diffraction grating 11 is tilted with a second direction Y as a rotation axis, a direction in which the first light flux L1 is diffracted for the first time by the first diffraction grating 11 is also tilted. Thus, a position where the first light flux L1 enters the second diffraction grating 12 through the light flux parallel branch unit 40 is also changed. Then, a position of incidence to the first diffraction grating 11 again through the light flux parallel branch unit 40 is changed from an incident point P12. As a result, an optical path length of the first light flux L1 from the light flux dividing unit 2013 to the light flux combining unit 50 is changed.

Then, when the optical path length of the first light flux L1 is changed, a position of incidence to the correction diffraction grating 710 is changed. Thus, the correction diffraction grating 710 diffracts the first light flux L1. In such a manner, it is possible to correct a change in the optical path length of the first light flux L1 by diffraction by the correction diffraction grating 710.

On the other hand, since the second light flux L2 is not influenced by a tilt of the first diffraction grating 11 and constantly follows a certain optical path, an optical path length thereof is not changed. Thus, a position where the second light flux L2 enters the correction diffraction grating 710 is not changed. As a result, the correction diffraction grating 710 does not influence the optical path length of the second light flux L2.

Thus, according to the displacement detecting device 2701 of the thirteenth embodiment, it is possible to correct the optical path length of the first light flux L1 by the correction diffraction grating 710 even when the measured member 2 in which the first diffraction grating 11 is provided is tilted. As a result, it is possible to perform highly accurate measurement even when the measured member 2 is tilted.

Since the other configurations are similar to those of the displacement detecting device 2001 according to the eighth embodiment, a description thereof is omitted. According to the displacement detecting device 2701 having such a configuration, it is also possible to acquire an effect similar to that of the displacement detecting device 2001 according to the eighth embodiment described above.

14. Fourteenth Embodiment

Next, a displacement detecting device according to the fourteenth embodiment will be described with reference to FIG. 31.

Figure 31:
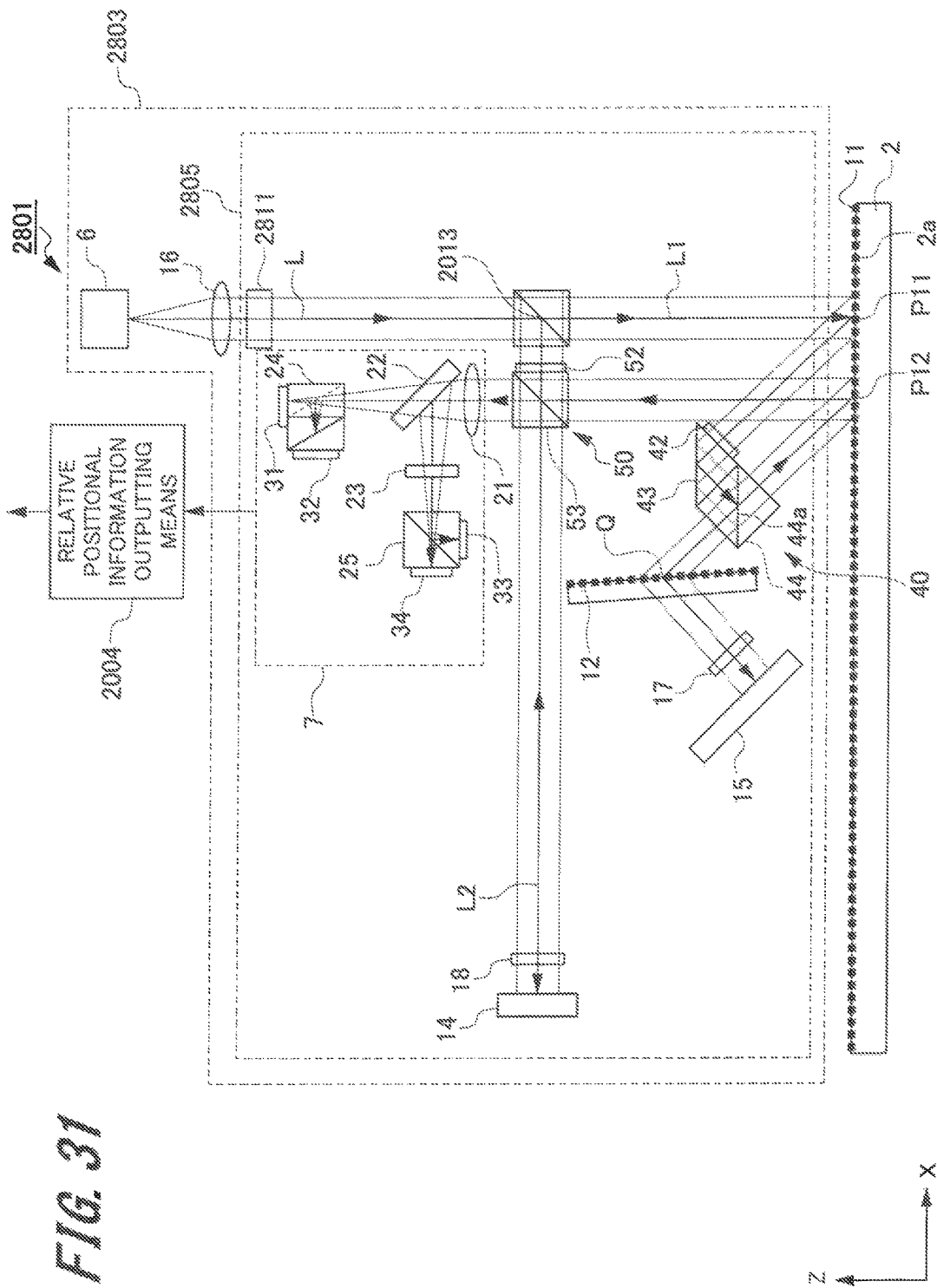
FIG. 31 is a schematic configuration view illustrating a configuration of a displacement detecting device according to a fourteenth embodiment of the present invention.

FIG. 31 is a schematic configuration view illustrating a configuration of the displacement detecting device according to the fourteenth embodiment.

A displacement detecting device 2801 according to the fourteenth embodiment is the displacement detecting device 2001 according to the eighth embodiment to which device an isolator is provided. Thus, the same sign is assigned to a common part with the displacement detecting device 2001 according to the eighth embodiment, and an overlapped description is omitted.

As illustrated in FIG. 31, the displacement detecting device 2801 includes a head 2803, a measured member 2 in which a first diffraction grating 11 is provided, and a relative positional information outputting means 2004. The head 2803 includes a displacement detecting unit 2805, a light source 6, and a light receiving unit 7 provided in the displacement detecting unit 2805.

An isolator 2811 is provided in the displacement detecting unit 2805. Note that since the other configurations of the displacement detecting unit 2805 are similar to those of the displacement detecting unit 2005 according to the eighth embodiment, a description thereof is omitted.

The isolator 2811 is arranged between the lens 16 and the light flux dividing unit 2013 between the light source 6 and the light flux dividing unit 2013. The isolator 2811 is an optical element that passes light in one direction and that bocks light in the other direction. In a case where light L emitted from the light source 6 is linearly-polarized light, a direction of the linearly-polarized light is changed by the isolator 2811. Then, the light L the direction of which is changed by the isolator 2811 is preferably distributed at 1:1 by the light flux dividing unit 2013.

Accordingly, it is possible to control, by the isolator 2811, zero order light in diffracted light diffracted by the first diffraction grating 11 not to return to the light source 6. As a result, it is possible to reduce generation of mode hopping, that is, a wavelength jump due to unnecessary light from the light source 6.

Since the other configurations are similar to those of the displacement detecting device 2001 according to the eighth embodiment, a description thereof is omitted. According to the displacement detecting device 2801 having such a configuration, it is also possible to acquire an effect similar to that of the displacement detecting device 2001 according to the eighth embodiment described above.

Note that the present invention is not limited to the embodiments illustrated and described above, and various modifications can be made within the spirit and the scope of the invention described in claims. In the above-descried embodiments, light emitted from a light source may be supplied through a space not only in gas but also in liquid or a vacuum.

Note that in the present description, words such as "parallel" and "orthogonal" are used. However, these does not necessarily mean "parallel" and "orthogonal" strictly and may include states of being "substantially parallel" and "substantially orthogonal" in a range in which a function thereof can be performed.

REFERENCE SIGNS LIST

1 displacement detecting device
2 measured member
2a measured surface
3 head
4 relative positional information outputting means
5 displacement detecting unit
6 light source
7 light receiving unit
11 first diffraction grating
12 second diffraction grating
13 light flux dividing unit (light flux combining unit)
14 reference mirror (reference reflecting member)
15 object mirror (object reflecting member)
17 first phase plate
18 second phase plate
L1 first light flux
L2 second light flux

What is claimed is:
1. A displacement detecting device comprising:
a first diffraction grating provided in a measured surface of a measured member; and
a head arranged in such a manner as to face the measured surface of the measured member,
wherein the head and the measured member are relatively movable at least in one of a direction in parallel with the measured surface and a direction orthogonal to the measured surface,
the head includes
a light source that emits light,
a displacement detecting unit that divides the light emitted from the light source into a first light flux and a second light flux and that emits the first light flux toward the first diffraction grating, and a light receiving unit that receives the second light flux, and the first light flux that returns from the first diffraction grating through the displacement detecting unit, the displacement detecting unit includes, as configuration elements:
- a light flux dividing unit that divides the light into the first light flux and the second light flux and that emits the divided first light flux toward the first diffraction grating,
- a second diffraction grating that diffracts the first light flux divided by the light flux dividing unit and diffracted by the first diffraction grating and that emits the first light flux to the first diffraction grating again,
- a reference reflecting member that reflects the second light flux divided by the light flux dividing unit, and
- a light flux combining unit that superposes the first light flux diffracted by the first diffraction grating and the second diffraction grating and the second light flux reflected by the reference reflecting member, and that performs emission thereof to the light receiving unit, and
- an incident angle of the first light flux to the first diffraction grating, a diffraction angle of the first diffraction grating, an incident angle of the first light flux to the second diffraction grating, and a diffraction angle of the second diffraction grating are angles at which a displacement amount in an optical path length of the first light flux from the light flux dividing unit to the first diffraction grating and a displacement amount in an optical path length of the first light flux from the first diffraction grating to the second diffraction grating become equal in a case where at least one of the head and the measured member is displaced in the direction orthogonal to the measured surface.

2. The displacement detecting device according to claim 1,
wherein in the displacement detecting unit, an optical path length of the first light flux from the light flux dividing unit to the light flux combining unit through the first diffraction grating and an optical path length of the second light flux from the light flux dividing unit to the light flux combining unit through the reference reflecting member become equal.

3. The displacement detecting device according to claim 1,
wherein an incident angle $\theta_R$ of the first light flux to the first diffraction grating, a diffraction angle $\theta$ of the first diffraction grating, an incident angle $\theta_1$ of the first light flux to the second diffraction grating, and a diffraction angle $\theta_2$ of the second diffraction grating satisfy the following expression $$-\cos(\theta_1+\theta+\theta_R)/\cos\theta_1+\{\sin(\theta_1+\theta+\theta_R)-\cos(\theta_1+\theta+\theta_R)\tan\theta_1\}\sin\theta_2=1 \quad \text{[Expression]}$$

4. The displacement detecting device according to claim 1,
wherein the displacement detecting unit makes the first light flux, which is divided by the light flux dividing unit, vertically enter the first diffraction grating.

5. The displacement detecting device according to claim 1,
wherein diffraction by the second diffraction grating satisfies a Bragg condition.

6. The displacement detecting device according to claim 1,
wherein the head includes
- a first displacement detecting unit that includes the displacement detecting unit and that is arranged on one side in a grating vector direction of the first diffraction grating,
- a second displacement detecting unit that is arranged on the other side in the grating vector direction of the first diffraction grating with respect to the first displacement detecting unit and that includes same configuration elements as the first displacement detecting unit, and
- an optical distributor that distributes the light emitted from the light source into light emitted to the first displacement detecting unit and light emitted to the second displacement detecting unit, and
- the configuration elements of the second displacement detecting unit are arranged in a manner reversed in the grating vector direction of the first diffraction grating from the configuration elements of the first displacement detecting unit.

7. The displacement detecting device according to claim 1,
wherein the first diffraction grating has a first grating vector direction in parallel with the measured surface, and
a second grating vector direction that is in parallel with the measured surface and that intersects with the first grating vector direction,
the head includes
- a first displacement detecting unit that includes the displacement detecting unit and that is arranged on one side in the first grating vector direction of the first diffraction grating,
- a second displacement detecting unit that is arranged on the other side in the first grating vector direction of the first diffraction grating with respect to the first displacement detecting unit and that includes same configuration elements as the first displacement detecting unit,
- a third displacement detecting unit that is arranged on one side in the second grating vector direction of the first diffraction grating and that includes same configuration elements as the first displacement detecting unit,
- a fourth displacement detecting unit that is arranged on an opposite side in the second grating vector direction of the first diffraction grating with respect to the third displacement detecting unit and that includes same configuration elements as the first displacement detecting unit, and
- an optical distributor that distributes the light emitted from the light source into light emitted to the first displacement detecting unit, light emitted to the second displacement detecting unit, light emitted to the third displacement detecting unit, and light emitted to the fourth displacement detecting unit,
- the configuration elements of the second displacement detecting unit are arranged in a manner reversed in the first grating vector direction of the first diffraction grating from the configuration elements of the first displacement detecting unit,
- the configuration elements of the third displacement detecting unit are arranged in the second grating vector direction, and
- the configuration elements of the fourth displacement detecting unit are arranged in a manner reversed in the second grating vector direction of the first diffraction grating from the configuration elements of the third displacement detecting unit.

8. The displacement detecting device according to claim 1,
wherein the displacement detecting unit includes
a re-reflection unit that emits, toward the first diffraction grating again, the first light flux that is emitted to the first diffraction grating again by the second diffraction grating and that returns by being diffracted by the first diffraction grating, and
a third diffraction grating that diffracts the first light flux emitted to the first diffraction grating by the re-reflection unit and diffracted by the first diffraction grating and that emits the first light flux to the first diffraction grating again, and
the third diffraction grating is arranged in a manner reversed in a grating vector direction of the first diffraction grating from the second diffraction grating.

9. A displacement detecting device comprising:
a first diffraction grating provided in a measured surface of a measured member; and
a head arranged in such a manner as to face the measured surface of the measured member,
wherein the head and the measured member are relatively movable at least in one of a direction in parallel with the measured surface and a direction orthogonal to the measured surface,
the head includes
a light source that emits light,
a displacement detecting unit that divides the light emitted from the light source into a first light flux and a second light flux and that emits the first light flux toward the first diffraction grating, and
a light receiving unit that receives the second light flux, and the first light flux that returns from the first diffraction grating through the displacement detecting unit,
the displacement detecting unit includes, as configuration elements:
a light flux dividing unit that divides the light into the first light flux and the second light flux and that emits the divided first light flux toward the first diffraction grating,
a second diffraction grating that diffracts the first light flux divided by the light flux dividing unit and diffracted by the first diffraction grating and that emits the first light flux to the first diffraction grating again,
a light flux parallel branch unit that is arranged between the first diffraction grating and the second diffraction grating and that makes the first light flux enter a position different from a first emission position on the first diffraction grating when making the first light flux diffracted by the second diffraction grating enter the first diffraction grating again,
a reference light reflecting member that reflects the second light flux divided by the light flux dividing unit, and
a light flux combining unit that superposes the first light flux diffracted by the first diffraction grating and the second diffraction grating and the second light flux reflected by the reference light reflecting member and that performs emission thereof to the light receiving unit,
the head makes the light emitted from the light source enter the first diffraction grating vertically,
the light flux parallel branch unit moves an optical path of the first light flux, which path is from the light flux parallel branch unit to the first diffraction grating, in parallel with an optical path of the first light flux from the first diffraction grating to the light flux parallel branch unit, and
a diffraction angle of the first diffraction grating, an incident angle of the first light flux to the second diffraction grating, and a diffraction angle of the second diffraction grating are angles at which a displacement amount in an optical path length of the first light flux from the light flux dividing unit to the first diffraction grating and a displacement amount in an optical path length of the first light flux from the first diffraction grating to the second diffraction grating become equal in a case where at least one of the head and the measured member is displaced in a direction orthogonal to the measured surface.

10. The displacement detecting device according to claim 9,
wherein in the displacement detecting unit, an optical path length of the first light flux from the light flux dividing unit to the light flux combining unit through the first diffraction grating and an optical path length of the second light flux from the light flux dividing unit to the light flux combining unit through the reference light reflecting member become equal.

11. The displacement detecting device according to claim 9,
wherein a diffraction angle $\theta$ of the first diffraction grating, an incident angle $\varphi_1$ of the first light flux to the second diffraction grating, and a diffraction angle $\varphi_2$ of the second diffraction grating satisfy the following expression $$-\cos(\varphi_1+\theta)/\cos\varphi_1+\{\sin(\varphi_1+\theta)-\cos(\varphi_1+\theta)\tan\varphi_1\}\sin\varphi_2=1 \qquad \text{[Expression]}$$

12. The displacement detecting device according to claim 9,
wherein diffraction by the second diffraction grating satisfies a Bragg condition.

13. The displacement detecting device according to claim 9,
wherein the head includes
a first displacement detecting unit that includes the displacement detecting unit and that is arranged on one side in a grating vector direction of the first diffraction grating, and
a second displacement detecting unit that is arranged on the other side in the grating vector direction of the first diffraction grating with respect to the first displacement detecting unit and that includes same configuration elements as the first displacement detecting unit,
the configuration elements of the second displacement detecting unit are arranged in a manner reversed in the grating vector direction of the first diffraction grating from the configuration elements of the first displacement detecting unit,
diffracted light, which is diffracted toward the one side in the grating vector direction of the first diffraction grating and which has a positive order in the grating vector direction, in the first light flux enters the first displacement detecting unit when the first light flux enters the first diffraction grating for the first time, and
diffracted light, which is diffracted toward the other side in the grating vector direction of the first diffraction grating and which has a negative order in the grating vector direction, in the first light flux enters the second displacement detecting unit when the first light flux enters the first diffraction grating for the first time.

14. The displacement detecting device according to claim 9, wherein the first diffraction grating has a first grating vector direction in parallel with the measured surface, and a second grating vector direction that is in parallel with the measured surface and that intersects with the first grating vector direction, the head includes a first displacement detecting unit that includes the displacement detecting unit and that is arranged on one side in the first grating vector direction of the first diffraction grating, a second displacement detecting unit that is arranged on the other side in the first grating vector direction of the first diffraction grating with respect to the first displacement detecting unit and that includes same configuration elements as the first displacement detecting unit, a third displacement detecting unit that is arranged on one side in the second grating vector direction of the first diffraction grating and that includes same configuration elements as the first displacement detecting unit, and a fourth displacement detecting unit that is arranged on an opposite side in the second grating vector direction of the first diffraction grating with respect to the third displacement detecting unit and that includes same configuration elements as the first displacement detecting unit, the configuration elements of the second displacement detecting unit are arranged in a manner reversed in the first grating vector direction of the first diffraction grating from the configuration elements of the first displacement detecting unit, the configuration elements of the third displacement detecting unit are arranged in the second grating vector direction, the configuration elements of the fourth displacement detecting unit are arranged in a manner reversed in the second grating vector direction of the first diffraction grating from the configuration elements of the third displacement detecting unit, diffracted light, which is diffracted toward the one side in the first grating vector direction of the first diffraction grating and which has a positive order in the first grating vector direction, in the first light flux enters the first displacement detecting unit when the first light flux enters the first diffraction grating for the first time, diffracted light, which is diffracted toward the other side in the first grating vector direction of the first diffraction grating and which has a negative order in the first grating vector direction, in the first light flux enters the second displacement detecting unit when the first light flux enters the first diffraction grating for the first time, diffracted light, which is diffracted toward the one side in the second grating vector direction of the first diffraction grating and which has a positive order in the second grating vector direction, in the first light flux enters the third displacement detecting unit when the first light flux enters the first diffraction grating for the first time, and diffracted light, which is diffracted toward the other side in the second grating vector direction of the first diffraction grating and which has a negative order in the second grating vector direction, in the first light flux enters the fourth displacement detecting unit when the first light flux enters the first diffraction grating for the first time.

15. The displacement detecting device according to claim 9, wherein the light flux parallel branch unit includes a polarization adjustment phase plate that adjusts a polarization state of the first light flux, a reflection mirror that reflects the first light flux the polarization state of which is adjusted by the polarization adjustment phase plate, and a polarization beam splitter that reflects the first light flux reflected by the reflection mirror and that transmits the first light flux diffracted by the second diffraction grating.

16. The displacement detecting device according to claim 15, wherein a reflection surface of the reflection mirror and a reflection/transmission surface, which reflects and transmits the first light flux, of the polarization beam splitter are arranged in parallel with each other.

17. The displacement detecting device according to claim 9, wherein the displacement detecting unit further includes a correction diffraction grating that is arranged between the light receiving unit and the light flux combining unit and that diffracts the first light flux.

18. The displacement detecting device according to claim 9, wherein an isolator is arranged between the light source and the light flux dividing unit.

* * * * *